(12) United States Patent
Xue et al.

(10) Patent No.: US 11,038,239 B2
(45) Date of Patent: Jun. 15, 2021

(54) ELECTROCHEMICALLY ACTIVE MULTIFUNCTIONAL INTERLAYER FOR A LI-S BATTERY

(71) Applicant: Massachusetts Institute of Technology, Cambridge, MA (US)

(72) Inventors: Weijiang Xue, Cambridge, MA (US); Liumin Suo, Cambridge, MA (US); Ju Li, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 97 days.

(21) Appl. No.: 16/390,647

(22) Filed: Apr. 22, 2019

(65) Prior Publication Data

US 2019/0326576 A1    Oct. 24, 2019

Related U.S. Application Data

(60) Provisional application No. 62/810,662, filed on Feb. 26, 2019, provisional application No. 62/660,607, filed on Apr. 20, 2018.

(51) Int. Cl.
*H01M 50/409* (2021.01)
*H01M 4/36* (2006.01)
(Continued)

(52) U.S. Cl.
CPC ....... *H01M 50/409* (2021.01); *H01M 4/0459* (2013.01); *H01M 4/133* (2013.01);
(Continued)

(58) Field of Classification Search
CPC .......... H01M 2/14; H01M 2/145; H01M 2/16; H01M 4/364; H01M 4/5815;
(Continued)

(56) References Cited

U.S. PATENT DOCUMENTS

2005/0220699 A1* 10/2005 Gofer ............... H01M 4/581
423/561.1
2012/0064404 A1* 3/2012 Carlson ............. H01M 10/4235
429/211
(Continued)

OTHER PUBLICATIONS

Nagao et al. "(High Rate Performance, Wide Temperature Operation and Long Cyclability of All-Solid-State Rechargeable Lithium Batteries Using Mo-S Chevrel-Phase Compounds"; 3 J. Electrochem. Soc. 160; pp. A819-A823 (Year: 2013).*
(Continued)

*Primary Examiner* — Gregg Cantelmo
(74) *Attorney, Agent, or Firm* — Smith Baluch LLP

(57) ABSTRACT

An interlayer for a lithium-sulfur (Li—S) battery may include a separator coated with an intercalation compound. The intercalation compound may intrinsically exhibit and/or be modified to have a higher affinity for lithium polysulfides (LiPS), thus reducing the global sulfur mobility and the shuttling effect. Additionally, the intercalation compound may also reduce the formation of a $Li_2S$ clogging layer, which thus increases the battery lifetime by reducing active material loss and maintaining the rate performance of the Li—S battery. Unlike conventional inactive interlayer materials, the intercalation compound may also contribute to the capacity of the battery, thereby increasing the volumetric and gravimetric energy densities. In one example, an interlayer for the Li—S battery may be disposed between a cathode and an anode and may include a separator and a coating disposed on the separator. The coating may include an intercalation compound, such as Chevrel-phase $Mo_6S_8$, to reduce the global sulfur mobility.

23 Claims, 41 Drawing Sheets

(51) Int. Cl.
| | |
|---|---|
| H01M 10/052 | (2010.01) |
| H01M 4/04 | (2006.01) |
| H01M 4/133 | (2010.01) |
| H01M 4/1393 | (2010.01) |
| H01M 4/58 | (2010.01) |
| H01M 4/583 | (2010.01) |
| H01M 50/403 | (2021.01) |
| H01M 50/417 | (2021.01) |
| H01M 50/426 | (2021.01) |
| H01M 50/431 | (2021.01) |
| H01M 50/451 | (2021.01) |
| H01M 4/38 | (2006.01) |
| H01M 4/62 | (2006.01) |

(52) U.S. Cl.
CPC ......... *H01M 4/1393* (2013.01); *H01M 4/364* (2013.01); *H01M 4/38* (2013.01); *H01M 4/583* (2013.01); *H01M 4/5815* (2013.01); *H01M 4/625* (2013.01); *H01M 10/052* (2013.01); *H01M 50/403* (2021.01); *H01M 50/417* (2021.01); *H01M 50/426* (2021.01); *H01M 50/431* (2021.01); *H01M 50/451* (2021.01)

(58) Field of Classification Search
CPC .. H01M 10/052; H01M 4/0459; H01M 4/133; H01M 4/1393; H01M 4/38; H01M 4/583; H01M 4/625; H01M 50/403; H01M 50/409; H01M 50/417; H01M 50/426; H01M 50/431; H01M 50/451
See application file for complete search history.

(56) References Cited

U.S. PATENT DOCUMENTS

| | | | | |
|---|---|---|---|---|
| 2016/0082395 | A1* | 3/2016 | Boulanger ......... | B01D 67/0002 204/520 |
| 2016/0346737 | A1* | 12/2016 | Liang .................... | C02F 1/4693 |
| 2018/0123134 | A1* | 5/2018 | Gan ...................... | H01M 4/622 |

OTHER PUBLICATIONS

Rajput et al., Elucidating the Solvation Structure and Dynamics of Lithium Polysulfides Resulting from Competitive Salt and Solvent Interactions. Chemistry of Materials 29, 3375-3379 (2017).
Saha et al., A convenient approach to Mo6S8 chevrel phase cathode for rechargeable magnesium battery. Journal of the Electrochemical Society 161, A593-A598 (2014), 6 pages.
Sergent et al., Sur de nouvelles phases séléniées ternaires du molybdène. Journal of Solid State Chemistry 6, 433-437(1973), 5 pages.
Su et al., Lithium-sulphur batteries with a microporous carbon paper as a bifunctional interlayer. Nature communications 3, 1166 (2012), 6 pages.
Su et al., Sulfur/lithium-insertion compound composite cathodes for Li-S batteries. Journal of Power Sources 270, 101-105 (2014).
Sun et al., Conductive porous vanadium nitride/graphene composite as chemical anchor of polysulfides for lithium-sulfur batteries. Nature communications 8, 14627 (2017), 8 pages.
Sun et al., Entrapment of polysulfides by a black-phosphorus-modified separator for lithium-sulfur batteries. Advanced materials 28, 9797-9803 (2016).
Suo et al., "Water-in-salt" electrolyte enables high-voltage aqueous lithium-ion chemistries. Science 350, 938-943 (2015).
Tan et al., Burning lithium in CS2 for high-performing compact Li2S-graphene nanocapsules for Li-S batteries. Nature Energy 2, 17090 (2017), 10 pages.
Tao et al., Balancing surface adsorption and diffusion of lithium-polysulfides on nonconductive oxides for lithium-sulfur battery design. Nature communications 7, 11203 (2016), 9 pages.
Tao et al., Strong sulfur binding with conducting Magneli-phase Ti(n)O2(n-1) nanomaterials for improving lithium-sulfur batteries. Nano letters 14, 5288-5294 (2014).
Tarascon et al., New superconducting ternary molybdenum chalcogenides in Mo6Se8, T1Mo6S8, and T1Mo6Se8. Physical Review B 29, 172 (1984), 9 pages.
Thangavel et al., A Microstructurally Resolved Model for Li-S Batteries Assessing the Impact of the Cathode Design on the Discharge Performance. Journal of the Electrochemical Society 163, A2817-A2829 (2016), 13 pages.
Tkatchenko et al., Accurate molecular van der Waals interactions from ground-state electron density and free-atom reference data. Physical review letters 102, 073005 (2009), 4 pages.
Wan et al., Mg desolvation and intercalation mechanism at the Mo6S8 Chevrel phase surface. Chemistry of Materials 27, 5932-5940 (2015).
Wang et al., Structural and chemical synergistic encapsulation of polysulfides enables ultralong-life lithium-sulfur batteries. Energy Environ Sci 9, 2533-2538 (2016).
Wang et al., Tailored Reaction Route by Micropore Confinement for Li-S Batteries Operating under Lean Electrolyte Conditions. Advanced Energy Materials, 1800590 (2018), 9 pages.
Wei et al,. Sulphur-TiO2 yolk-shell nanoarchitecture with internal void space for long- cycle lithium-sulphur batteries. Nature communications 4, 1331 (2013), 6 pages.
Xu et al., Absorption mechanism of carbon-nanotube paper-titanium dioxide as a multifunctional barrier material for lithium-sulfur batteries. Nano Research 8, 3066-3074 (2015).
Xue et al., "Gravimetric and volumetric energy densities of lithium-sulfur batteries." Current Opinion in Electrochemistry 6.1 (2017): 92-99.
Xue et al., Double-oxide sulfur host for advanced lithium-sulfur batteries. Nano Energy 38, 12-18 (2017).
Yao et al., Improved lithium-sulfur batteries with a conductive coating on the separator to prevent the accumulation of inactive S-related species at the cathode-separator interface. Energy Environ Sci 7, 3381-3390 (2014).
Yim et al., Effective polysulfide rejection by dipole-aligned BaTiO3 coated separator in lithium-sulfur batteries. Advanced Functional Materials 26, 7817-7823 (2016).
Yoo et al., COF-Net on CNT-Net as a Molecularly Designed, Hierarchical Porous Chemical Trap for Polysulfides in Lithium-Sulfur Batteries. Nano letters 16, 3292-3300 (2016).
Yu et al., Atomic layer deposited TiO2 on a nitrogen-doped graphene/sulfur electrode for high performance lithium-sulfur batteries. Energy Environ Sci 9, 1495-1503 (2016).
Yu et al., Polymer lithium-sulfur batteries with a Nafion membrane and an advanced sulfur electrode. Journal of Materials Chemistry A 3, 15683-15691 (2015).
Yuan et al., Powering lithium-sulfur battery performance by propelling polysulfide redox at sulfiphilic hosts. Nano letters 16, 519-527 (2016).
Zang et al., Hollow-in-hollow carbon spheres with hollow foam-like cores for lithium-sulfur batteries. Nano Research 8, 2663-2675 (2015).
Zhang et al., Electrochemomechanical Degradation of High-Capacity Battery Electrode Materials. Progress in Materials Science 89, 479-521 (2017).
Zhang et al., Al2O3-coated porous separator for enhanced electrochemical performance of lithium sulfur batteries. Electrochimica Acta 129, 55-61 (2014).
Zhang et al., Sulfur encapsulated in graphitic carbon nanocages for high-rate and long-cycle lithium-sulfur batteries. Advanced materials 28, 9539-9544 (2016).
Zhang et al., Understanding the Anchoring Effect of Two- Dimensional Layered Materials for Lithium-Sulfur Batteries. Nano letters 15, 3780-3786 (2015).
Zhao et al., Interphases in Lithium-Sulfur Batteries: Toward Deployable Devices with Competitive Energy Density and Stability. ACS Energy Letters 3, 2104-2113 (2018).

(56) References Cited

OTHER PUBLICATIONS

Zhou et al., A flexible sulfur-graphene-polypropylene separator integrated electrode for advanced Li-S batteries. Advanced materials 27, 641-647 (2015).
Zhou et al., A graphene foam electrode with high sulfur loading for flexible and high energy Li-S batteries. Nano Energy 11, 356-365 (2015).
Zhou et al., A graphene-pure-sulfur sandwich structure for ultrafast, long-life lithium-sulfur batteries. Advanced materials 26, 625-631, 664 (2014).
Zhou et al., Catalytic oxidation of Li2S on the surface of metal sulfides for Li-S batteries. Proceedings of the National Academy of Sciences of the United States of America 114, 840-845 (2017).
Zhou et al., Free-standing TiO2 nanowire-embedded graphene hybrid membrane for advanced Li/dissolved polysulfide batteries. Nano Energy 12, 240-249 (2015).
Bai et al., Metal-organic framework-based separator for lithium-sulfur batteries. Nature Energy 1, 16094 (2016), 6 pages.
Balach et al., Functional mesoporous carbon-coated separator for long-life, high-energy lithium-sulfur batteries. Advanced Functional Materials 25, 5285-5291 (2015), 7 pages.
Bizuneh et al., "LaLiO2-Based Multi-Functional Interlayer for Enhanced Performance of Li-S Batteries." Journal of the Electrochemical Society 166.2 (2019): A68-A73.
Blöchl, Projector augmented-wave method. Physical review B 50, 17953 (1994), 27 pages.
Cañas et al., Experimental and theoretical analysis of products and reaction intermediates of lithium-sulfur batteries. The Journal of Physical Chemistry C 118, 12106-12114 (2014), 9 pages.
Cañas et al., Investigations of lithium-sulfur batteries using electrochemical impedance spectroscopy. Electrochimica Acta 97, 42-51 (2013).
Chang et al., Effective stabilization of a high-loading sulfur cathode and a lithium-metal anode in Li-S batteries utilizing SWCNT-modulated separators. Small 12, 174-179 (2016).
Chen et al., A new type of multifunctional polar binder: toward practical application of high energy lithium sulfur batteries. Advanced materials 29, 1605160 (2017), 7 pages.
Chung et al., A polyethylene glycol-supported microporous carbon coating as a polysulfide trap for utilizing pure sulfur cathodes in lithium-sulfur batteries. Advanced materials 26, 7352-7357 (2014).
Chung et al., Bifunctional separator with a light-weight carbon-coating for dynamically and statically stable lithium-sulfur batteries. Advanced Functional Materials 24, 5299-5306 (2014).
Chung et al., Designing Lithium-Sulfur Cells with Practically Necessary Parameters. Joule 2, 710-724 (2018).
Chung et al., Rational Design of Statically and Dynamically Stable Lithium-Sulfur Batteries with High Sulfur Loading and Low Electrolyte/Sulfur Ratio. Advanced materials 30, 1705951 (2018), 9 pages.
Eroglu et al., Critical link between materials chemistry and cell-level design for high energy density and low cost lithium-sulfur transportation battery. Journal of the Electrochemical Society 162, A982-A990 (2015), 9 pages.
Fan et al., Solvent Effects on Polysulfide Redox Kinetics and Ionic Conductivity in Lithium- Sulfur Batteries. Journal of the Electrochemical Society 163, A3111-A3116 (2016), 6 pages.
Geng et al., Reversible Electrochemical Intercalation of Aluminum in Mo6S8. Chemistry of Materials 27, 4926-4929 (2015).
Ghazi et al., Efficient polysulfide chemisorption in covalent organic frameworks for high-performance lithium-sulfur batteries. Advanced Energy Materials, 1601250 (2016), 6 pages.
Ghazi et al., MoS2/celgard separator as efficient polysulfide barrier for long-life lithium-sulfur batteries. Advanced materials, 1606817 (2017), 6 pages.
Hagen M et al., Lithium-Sulfur Cells: The Gap between the State-of-the-Art and the Requirements for High Energy Battery Cells. Advanced Energy Materials 5, 1401986 (2015), 11 pages.
Huang et al., Permselective graphene oxide membrane for highly stable and anti-self-discharge lithium-sulfur batteries. ACS Nano 9, 3002-3011 (2015).

Ji et al., Stabilizing lithium-sulphur cathodes using polysulphide reservoirs. Nature communications 2, 325 (2011), 7 pages.
Kresse et al., Efficient iterative schemes for ab initio total-energy calculations using a plane-wave basis set. Physical review B 54, 11169 (1996), 18 pages.
Lei et al., Multi-functional layered WS2 nanosheets for enhancing the performance of lithium-sulfur batteries. Advanced Energy Materials, 1601843 (2016), 8 pages.
Levi et al., Kinetic and thermodynamic studies of Mg2+ and Li+ ion insertion into the Mo6S8 chevrel phase. Journal of the Electrochemical Society 151, A1044 (2004), 8 pages.
Li et al., A sulfur host based on titanium monoxide@carbon hollow spheres for advanced lithium-sulfur batteries. Nature communications 7, 13065 (2016), 11 pages.
Li et al., Chemisorption of polysulfides through redox reactions with organic molecules for lithium-sulfur batteries. Nature communications 9, 705 (2018), 10 pages.
Li et al., Hollow Carbon Nanofibers Filled with MnO2 Nanosheets as Efficient Sulfur Hosts for Lithium-Sulfur Batteries. Angewandte Chemie 54, 12886-12890 (2015).
Li et al., Pie-like electrode design for high-energy density lithium-sulfur batteries. Nature communications 6, 8850 (2015), 8 pages.
Li et al., Rational designs and engineering of hollow micro-/nanostructures as sulfur hosts for advanced lithium-sulfur batteries. Energy Environ Sci 9, 3061-3070 (2016).
Liang et al., A highly efficient polysulfide mediator for lithium-sulfur batteries. Nature communications 6, 5682 (2015), 8 pages.
Liang et al., In situ reactive assembly of scalable core-shell sulfur-MnO2 composite cathodes. ACS Nano 10, 4192-4198 (2016).
Lin et al., Aligning academia and industry for unified battery performance metrics. Nature communications 9, 5262 (2018), 5 pages.
Liu et al., "Nanostructured metal oxides and sulfides for lithium-sulfur batteries." Advanced materials 29.20 (2017): 1601759, 25 pages.
Ma et al., Hybrid cathode architectures for lithium batteries based on TiS2 and sulfur. J Mater Chem A 3, 19857-19866 (2015).
Manthiram et al., Rechargeable lithium-sulfur batteries. Chemical reviews 114, 11751-11787 (2014).
Mao et al., Foldable interpenetrated metal-organic frameworks/carbon nanotubes thin film for lithium-sulfur batteries. Nature communications 8, 14628 (2017), 8 pages.
McCloskey, Attainable gravimetric and volumetric energy density of Li-S and li ion battery cells with solid separator protected Li metal anodes. The Journal of Physical Chemistry Letters 6, 4581-4588 (2015).
Mei et al., Chevrel Phase Mo6 T8 (T = S, Se) as Electrodes for Advanced Energy Storage. Small 13, (2017), 11 pages.
Pan et al., Addressing Passivation in Lithium-Sulfur Battery Under Lean Electrolyte Condition. Advanced Functional Materials, 1707234 (2018), 7 pages.
Pan et al., Enhanced superconductivity in restacked TaS2 nanosheets. Journal of the American Chemical Society 139, 4623-4626 (2017).
Pan et al., Non-encapsulation approach for high-performance Li-S batteries through controlled nucleation and growth. Nature Energy, (2017), 8 pages.
Pang et al., A comprehensive approach toward stable lithium-sulfur batteries with high volumetric energy density. Advanced Energy Materials 7, 1601630 (2016), 9 pages.
Pang et al., A graphene-like metallic cathode host for long-life and high-loading lithium-sulfur batteries. Mater Horiz 3, 130-136 (2016).
Pang et al., Advances in lithium-sulfur batteries based on multi-functional cathodes and electrolytes. Nature Energy 1, 16132 (2016), 11 pages.
Pang et al., Surface-enhanced redox chemistry of polysulphides on a metallic and polar host for lithium-sulphur batteries. Nature communications 5, 4759 (2014), 8 pages.
Park et al., Trapping lithium polysulfides of a Li-S battery by forming lithium bonds in a polymer matrix. Energy Environ Sci 8, 2389-2395 (2015).
Peng et al., Healing High-Loading Sulfur Electrodes with Unprecedented Long Cycling Life: Spatial Heterogeneity Control. J Am Chem Soc 139, 8458 (2017), 9 pages.

(56) References Cited

OTHER PUBLICATIONS

Peng et al., Review on high-loading and high-energy lithium-sulfur batteries. Advanced Energy Materials 7, 1700260 (2017), 54 pages.
Perdew et al., Generalized gradient approximation made simple. Physical review letters 77, 3865 (1996), 4 pages.
Pope et al., Structural design of cathodes for Li-S batteries. Advanced Energy Materials 5, 1500124 (2015), 22 pages.
Qie et al., A high energy lithium-sulfur battery with ultrahigh-loading lithium polysulfide cathode and its failure mechanism. Advanced Energy Materials 6, 1502459 (2016), 7 pages.

\* cited by examiner

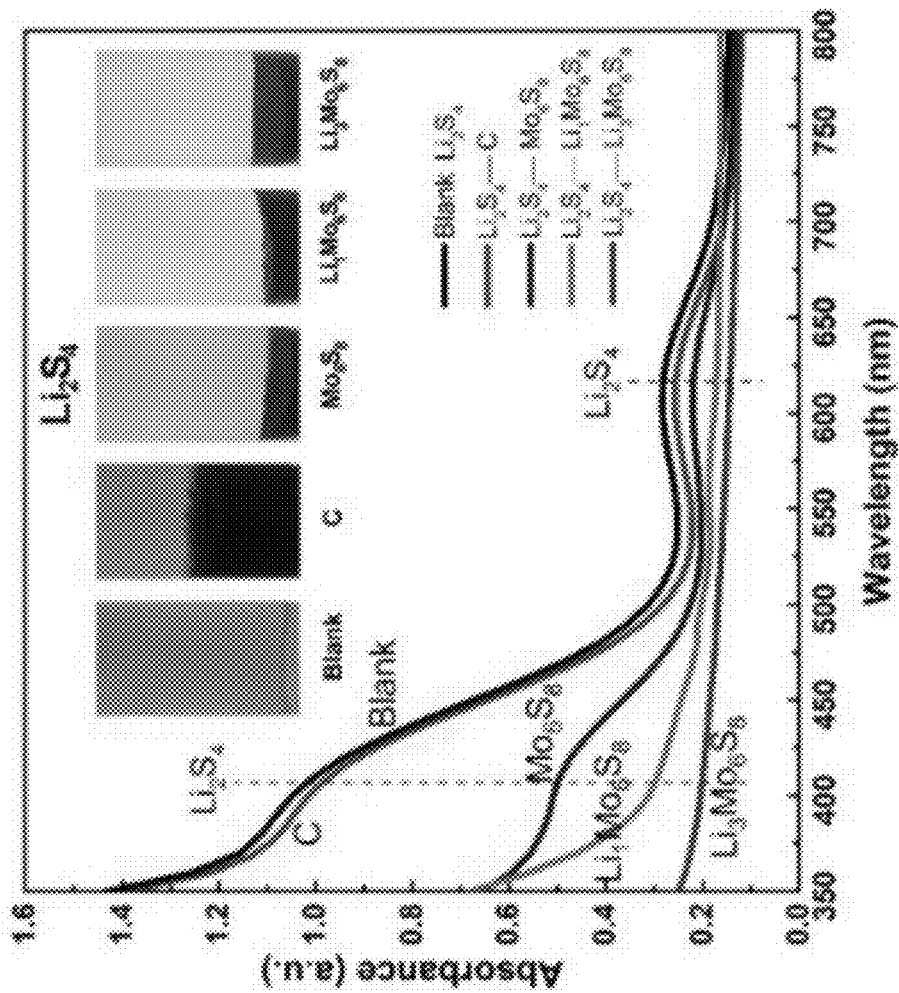
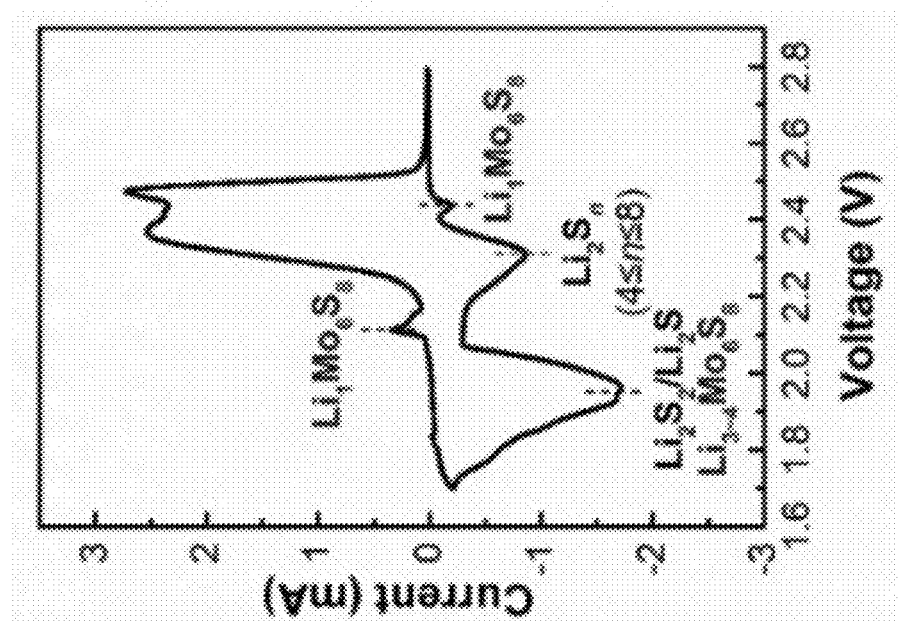
FIG. 2B
FIG. 2A

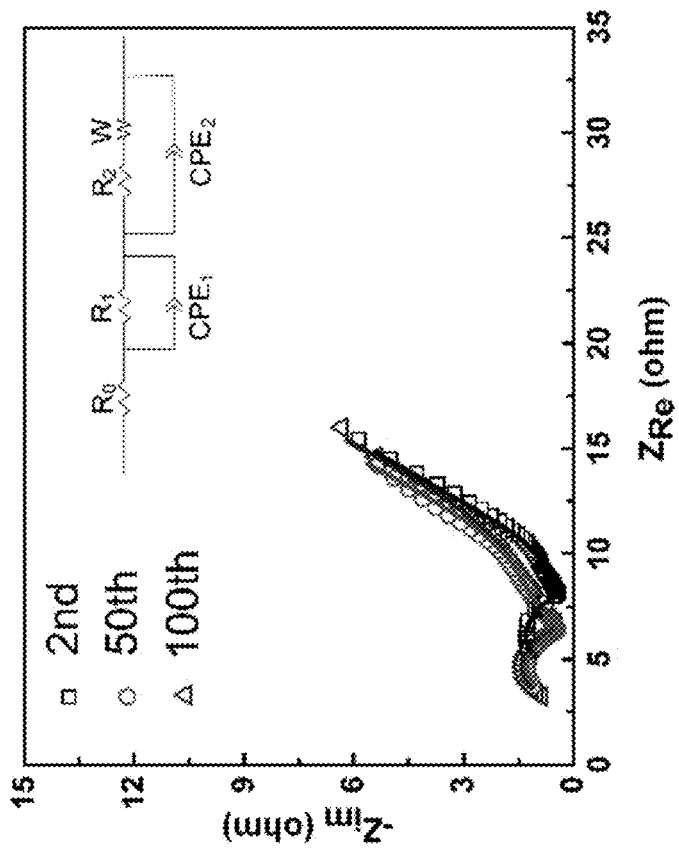
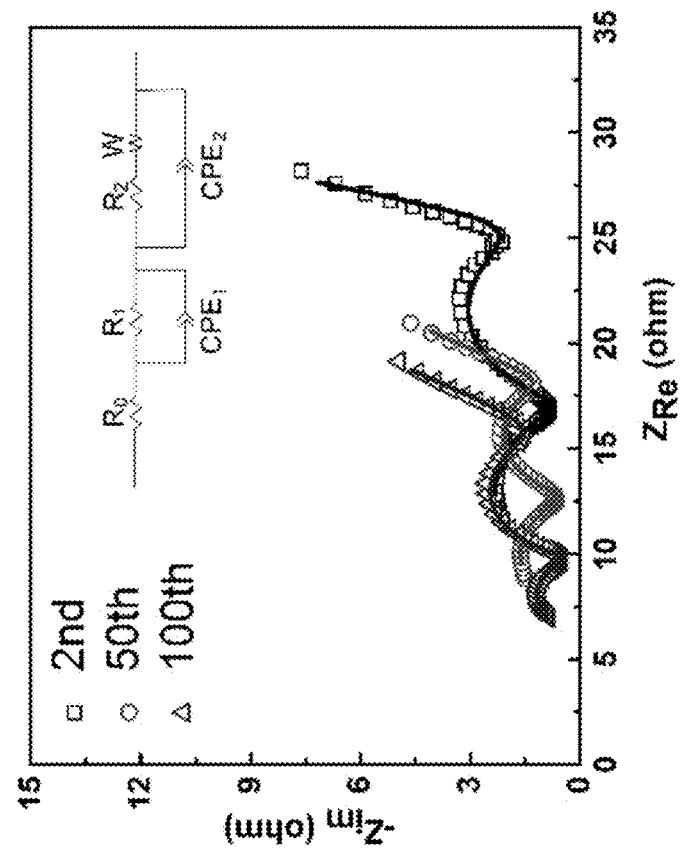
FIG. 15B
FIG. 15A

ELECTROCHEMICALLY ACTIVE MULTIFUNCTIONAL INTERLAYER FOR A LI-S BATTERY

CROSS-REFERENCE TO RELATED PATENT APPLICATION

This application claims priority, under 35 U.S.C. § 119(e), to U.S. Application No. 62/810,662, filed on Feb. 26, 2019, entitled "Intercalation-Conversion Hybrid Cathode For Li—S Battery," and U.S. Application No. 62/660,607, filed on Apr. 20, 2018, entitled "Electrochemically Active Multifunctional LixMo6S8 Interlayer for High-Performance Li—S Batteries," each of which applications is incorporated herein by reference in its entirety.

BACKGROUND

A lithium-sulfur (Li—S) battery is a type of rechargeable battery with a theoretical capacity and energy density substantially greater than that of a conventional lithium-ion battery (LIB). The anion-redox of Li—S is described by the following reaction: $S_8 + 16e^- + 16Li^+ = 8Li_2S$ where $e^-$ is the free electron and $Li^+$ is the Li ion. This reaction chemistry is reversible and exhibits a theoretical cathode energy density of 2600 $Wh \cdot kg^{-1}$ based on the weight of elemental sulfur. This energy density is nearly five times greater than a conventional LIB using a transition metal (TM) cation-redox intercalation reaction. The higher energy density of the Li—S battery is due, in part, to each sulfur atom being able to host two Li atoms (thus releasing two electrons) whereas conventional metal oxide cathodes are only able to host less than one Li atom on average (thus releasing less than one electron on average). Furthermore, sulfur is substantially cheaper than the metals use in conventional metal oxide cathodes.

SUMMARY

The Inventors have recognized and appreciated that a Li—S battery may theoretically provide a storage capacity and energy densities substantially greater than a conventional LIB at lower costs. However, the Inventors have also recognized the performance of conventional Li—S batteries are susceptible to degradation over time/cycles due to (1) the shuttling effect, which is caused by the transport of sulfur ions from the cathode to the anode, and (2) the formation of a $Li_2S$ clogging layer, which may cause progressive active material loss in the battery over time.

The present disclosure is thus directed towards various inventive implementations of an interlayer for a Li—S battery, Li—S batteries having an interlayer disposed between a cathode and a separator, and methods for making the interlayer. In one aspect, the interlayer may be designed to suppress global sulfur mobility, thus reducing the shuttling effect. In another aspect, the interlayer may have a greater electrical conductivity and ionic conductivity (for fast Li diffusion) sufficient to substantially reduce and, in some instances, prevent the formation of a $Li_2S$ clogging layer.

In one exemplary implementation, an interlayer is used in a lithium sulfur battery and disposed on a separator between a cathode and an anode of the lithium sulfur battery. The interlayer includes a coating disposed on the separator where the coating comprises Chevrel-phase $Mo_6S_8$.

The separator may include polypropylene. A lithium sulfur battery may include the combination of the interlayer and the separator. The interlayer may be used to suppress global sulfur mobility in the lithium sulfur battery. The coating may have a thickness substantially equal to or less than 10 μm. The coating may have an area weight substantially equal to or less than 1 $mg \cdot cm^{-2}$. The coating may be configured to transform to $LiMo_6S_8$ during lithiation. The coating may be configured to reduce formation of $Li_2S$ on at least one of a surface of the cathode or an interface between the coating and the separator In another exemplary implementation, a method of fabricating an interlayer for a lithium sulfur battery includes the following steps: (1) forming a slurry by mixing $Mo_6S_8$ power powder, conductive carbon, and polyvinylidene fluoride (PVDF) with N-methylpyrrolidinone (NMP), and (2) casting the slurry onto a separator to form a coating disposed on the separator.

In this exemplary method, the coating may have a thickness substantially equal to or less than 10 μm. The coating may have an area weight substantially equal to or less than 1 $mg \cdot cm^{-2}$. The slurry may include about 80 wt % of the $Mo_6S_8$ powder, 10 wt % of the conductive carbon, and about 10 wt % of the PVDF.

In yet another exemplary implementation, a lithium sulfur battery includes an anode, a cathode comprising carbon, sulfur, and a first intercalation compound, a separator disposed between the anode and the cathode, and an interlayer comprising a coating disposed on the separator, the coating comprising a second intercalation compound.

The coating in the battery may suppress global sulfur mobility in the battery. The separator may include polypropylene. The coating of the interlayer may have a thickness substantially equal to or less than 10 μm and an area weight substantially equal to or less than 1 $mg \cdot cm^{-2}$. The first intercalation compound and/or the second intercalation compound may include Chevrel-phase $Mo_6S_8$. The coating may be configured to transform to $LiMo_6S_8$ during lithiation. The battery may further include a conductive foil and a slurry disposed on the conductive foil where the slurry includes the carbon, the sulfur, and the $Mo_6S_8$. In the slurry, the sulfur may have a loading substantially equal to or greater than 10 $mg \cdot cm^{-2}$, $Mo_6S_8$ has a loading substantially equal to or greater than 10 $mg \cdot cm^{-2}$, and the carbon has a weight percentage substantially equal to or less than 10 wt % in the slurry.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a schematic illustration of the multifunctional Li$_x$Mo$_6$S$_8$ interlayer suppressing LiPS shuttling, contributing additional capacity, and preventing Li$_2$S clogging. FIG. 1B shows the surface and cross-sectional (inset) SEM observations of the PP@Li$_x$Mo$_6$S$_8$, scale bars, 1 µm, 5 µm (inset). FIG. 1C shows a cyclic voltammogram (CV) profile for the battery with PP@Li$_x$Mo$_6$S$_8$ with 1M LiTFSI in DOL/DME (1, 3-dioxolane/dimethoxyethane) electrolyte at the scanning rate of 0.2 mV·s$^{-1}$ in the voltage range of 1.7 V~2.8 V. FIGS. 1D and 1E show an SEM micrograph and an elements distribution, respectively, of the PP@Li$_x$Mo$_6$S$_8$ after cycling for 300 cycles at a fully charged state. FIGS. 1F and 1G show a measured electrical impedance and ionic conductivity, respectively, of the PP@Mo$_6$S$_8$, PP@Li$_1$Mo$_6$S$_8$, PP@Li$_3$Mo$_6$S$_8$ and PP@Li$_4$Mo$_6$S$_8$.

FIGS. 2A-2C illustrate the interaction between Li$_x$Mo$_6$S$_8$ and LiPS. FIG. 2A shows a CV plot of the battery using the PP@Mo$_6$S$_8$, sulfur cathode, and Li anode. FIG. 2B shows visual discrimination (inset) and UV-vis spectra of the Li$_2$S$_4$ solutions after exposure to C, Mo$_6$S$_8$, Li$_1$Mo$_6$S$_8$, Li$_3$Mo$_6$S$_8$ and Li$_4$Mo$_6$S$_8$. FIG. 2C shows in-situ XRD measurements of a Li—S cell using the sulfur cathode//PP@Mo$_6$S$_8$//Li anode.

FIG. 3A shows voltage profiles at various rates from 0.2 C to 4 C with the PP@Li$_x$Mo$_6$S$_8$. FIGS. 3B and 3C show polarizations and rate performances, respectively, at various rates from 0.2 C to 4 C with the PP@Li$_x$Mo$_6$S$_8$, PP@C and pristine PP. FIGS. 3D and 3E show electrochemical impedance spectra of Li—S batteries at fully charged and fully discharged states, respectively, for the first cycle. FIG. 3F shows electrochemical impedance spectroscopy (EIS) plots of the interface contact resistance R$_{int}$ at a fully charged state and the interface contact resistance originating from the solid Li$_2$S film R$_{sl}$ at fully discharged state using the PP@Li$_x$Mo$_6$S$_8$ and PP@C for 100 cycles.

FIG. 4A shows cycling performance at a rate of 1 C over 400 cycles with PP@LiMo$_6$S$_8$, PP@C and pristine PP separators. FIG. 4B shows areal capacity at current densities of 0.25 and 1 mA·cm$^{-2}$ of the Li—S battery with the PP@Li$_x$Mo$_6$S$_8$ at a high sulfur mass loading of 4.02 mg·cm$^{-2}$.

FIG. 4C shows E$_V$ values of rolled and unrolled cathodes by employing PP@Li$_x$Mo$_6$S$_8$ and pristine PP separator at 0.25 and 1 mA cm$^{-2}$. FIG. 4D shows SEM figures of C/S electrodes before (105 µm) and after rolling (85 µm). FIG. 4E shows areal capacities upon 100 cycles of the batteries using rolled or unrolled C/S cathodes paired with the pristine PP separator and PP@Li$_x$Mo$_6$S$_8$.

FIG. 6A shows that PP@C cannot prevent Li$_2$S clogging. FIG. 6B illustrates the ability of the PP@Li$_x$Mo$_6$S$_8$ interlayer to successfully prevent Li$_2$S clogging due to its high LiPS adsorption capability and good ionic and electronic conductivities. SEM images of the surface of the carbon interlayer and Li$_x$Mo$_6$S$_8$ interlayer attached to the Celgard PP separator at a fully discharged state are included, with 5 µm scale bars.

FIG. 10A shows the reduction peaks in the CV profile. FIG. 10B shows the 1$^{st}$-5$^{th}$ CV profiles, indicating good reversibility and stability.

FIGS. 15A and 15B illustrate the electrochemical impedance spectra of the Li—S cells over the 2$^{nd}$, 50$^{th}$ and 100$^{th}$ cycles using the PP@C separator at fully charged states and fully discharged states, respectively.

DETAILED DESCRIPTION

Figure 1A:
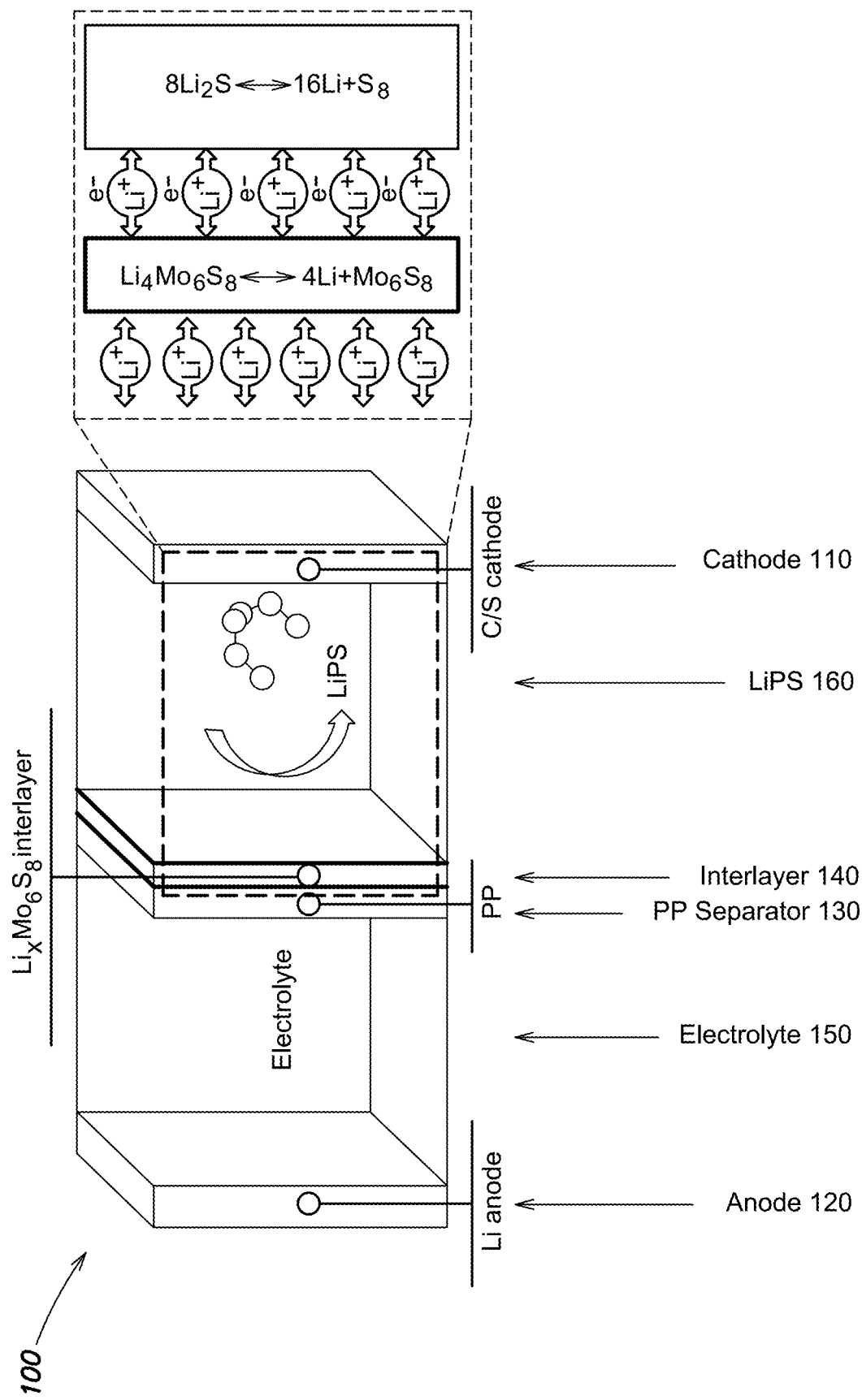
FIGS. 1A-1G show a schematic illustration and the characterization of an exemplary PP@Li$_x$Mo$_6$S$_8$ in a Li—S battery.
Figure 1C:
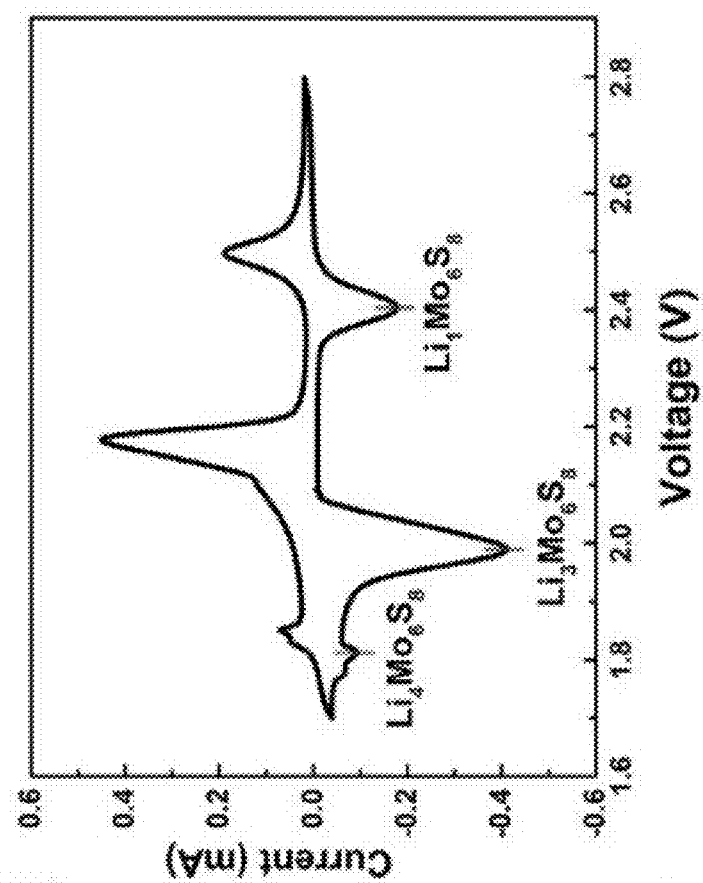

A Li—S battery is typically comprised of a S cathode, a Li anode, and a separator between the S cathode and the Li anode. The sulfur cathode (e.g., $S_8$) is a conversion-type material that undergoes a chemical reaction to produce new chemical species (e.g., $Li_2S$) when the battery discharges. The reaction chemistry ($S_8 + 16e^- + 16Li^+ \leftrightarrow 8Li_2S$) is reversible, hence, the $Li_2S$ species is converted back to $S_8$ when the battery charges. Li—S batteries are theoretically predicted to exhibit a capacity (1,672 $mAh \cdot g^{-1}$) based on the weight of elemental sulfur and energy density substantially greater than conventional LIB's due, in part, to each sulfur atom being able to host up to two Li atoms per sulfur atom, thus releasing up to two electrons. Compared to a conventional Li-ion battery (LIB) cathode based on transition metal (TM) cation-redox reactions, sulfur is naturally abundant, low cost, and environmentally friendly.

However, conventional Li—S batteries have been unable to approach theoretical predictions on performance let alone exceed the performance of conventional LIB's, in part, due to deficiencies in the cathode. On the cathode side, the ionic and electronic insulating nature of $S/Li_2S$ lead to sluggish redox reaction kinetics and limit the utilization of capacity. The $S_8$ phase and lithium sulfide ($Li_2S$) phase are usually electronically insulating (unlike, for example, $Li_xCoO_2$, with its high $Co^{3+} \leftrightarrow Co^{4+}$ polaron mobility). In addition, the polaron (i.e., free $e^-$) often does not have the ability to move to S. As a result, in conventional Li—S batteries, the S physically travels to the electron source in order for the anion-redox reaction $S^{\alpha-} \leftrightarrow S^{\beta-} + (\alpha-\beta)e^-$ to proceed, where $0 \leq \alpha, \beta \leq 2$ is the mean sulfur valence reflecting a mixture of ionic and covalent bonding (often in the physical form of $S_n^{2-}$, where $\alpha=2/n$).

The electron source is typically an electrocatalytical surface connected to chains of carbon black particles that support long-range electron transport. A feature of the Li—S cathode is "sulfur mobility," which stems from the dissolution of intermediate long-chain lithium polysulfide (LiPS). S goes to the electron source by physically dissolving into liquid electrolyte as $S_n^{2-}$ (electrolyte), and transforms to $S_m^{2-}$ (electrolyte) after contacting the electrocatalyst, and eventually redeposits somewhere else as various solid phases. This sulfur mobility in lieu of polaron mobility is a common characteristic of many Li—S batteries. Such sulfur mobility has several consequences on battery cycling.

First, since the mobility is enabled by liquid electrolyte, dissolution of lithium polysulfide intermediates (LiPS) in the liquid electrolyte is a preferred feature locally (i.e. the sulfur is able to move far enough to reach a local electron source). Even though LiPS is often written as $Li_2S_n$, it is understood that its solubilized form is $2Li^+$ (electrolyte) and $S_n^{2-}$ (electrolyte), with individual solvation shells.

Second, conventional Li—S batteries usually have a higher porosity and liquid electrolyte loading than typical LIB cathodes to enhance mobility. Conventional Li—S batteries also typically have a higher concentration of inactive materials (also referred to herein as "non-active materials"), such as plain carbon black, to provide a greater electrocatalytical surface area, thus enhancing the redox kinetics. Combining these features with the intrinsic mechanical softness of $S_8$ and $Li_2S$ phases results in a cathode composite that is accordingly (1) more mechanically soft and fragile compared to LIB cathodes and (2) more "fluid" and "organic." Although calendering has been shown to improve the performance of conventional LIB cathodes, the performance of sulfur cathodes tend to degrade when such processing is applied to the sulfur cathodes.

Third, the high sulfur mobility may lead to $S_n^{2-}$ (electrolyte) physically crossing over the separator into the Li metal anode during long-term cycling and storage of the Li—S battery. This causes active material loss and fast capacity fading on the cathode side, even without consideration of the ill effects such cross over may have on the anode. The fact that not just $Li^+$ (electrolyte) is transported across the electrolyte in a non-blocking manner (so called and "shuttling" of soluble redox mediators, SRMs) also makes the interpretation of the Coulombic efficiency (CE) more complex. To address these issues, the conventional strategies are to build up a good conductive matrix by electrical conductors and to confine LiPS on the cathode side by introducing adsorbing materials serving as sulfur hosts, electrode binders, inorganic/organic composite separators, interlayers, and current collectors.

Another harmful consequence of global sulfur mobility (GSM) is stratification. In Li—S batteries, the cathode may include a fragile, porous body, typically hundreds of microns thick. The initial composite may have a nearly uniform composition, but it is conceivable that with cycling, the composite may develop heterogeneous layering along the thickness, with gradients in volume fractions of $S_8$, $Li_2S$, and carbon phases. Since the $S_8 \leftrightarrow Li_2S$ transformation involves large volume changes, the initial porosity distribution, and the fragile carbon black chains that support percolating electronic transport, may be changing in this semi-fluid, semi-solid body. In particular, a "dead layer" of $Li_2S$ or $S_8$ may develop during discharging, leading to poor rate performance and capacity fading. Continuum-scale modeling shows that stratification and a dead layer of $Li_2S$ may indeed form near the separator.

A preferred Li—S battery should have high local sulfur mobility (LSM) within a nanoscopically local region of the cathode to enable fast redox, but low global sulfur mobility (GSM)—the worst kind of GSM being that of crossing over from cathode side to the anode side. One possible approach is to construct a membrane at the location of the traditional separator to eliminate cathode-to-anode GSM. This "smart" membrane at the location of the traditional separator should preferably prevent the formation of the $Li_2S$ clogging layer. In other words, this membrane should not only reduce cathode-to-anode GSM, but should also mitigate the effects of GSM within the cathode by being both electronically conductive and electrocatalytically active.

In previous efforts, carbonaceous interlayers have received considerable attention to address the dissolution of LiPS and slow redox reaction kinetics due to their large specific surface and high electrical conductivity. However, the weak interactions between the polar LiPS and non-polar carbon undermine their application as LiPS traps. In order to achieve stronger adsorption for LiPS, new materials with strong chemical binding with LiPS, such as metal oxides, metal sulfides, metal-organic frameworks (MOFs), and covalent organic frameworks (COFs) have been explored. However, the insulating nature of these materials impedes electron transport, resulting in low sulfur utilization and a large polarization.

The introduction of electronically conductive polar materials into Li—S batteries may be an effective approach to alleviate the shuttling effect and increasing the redox reaction kinetics. However, the materials that have been mentioned thus far are non-active. Therefore, such an approach may sacrifice the energy densities, especially the volumetric energy density ($E_V$). The low $E_V$ of Li—S batteries possibly precludes their use in various applications. Although calendering/pressurized rolling tends to improve the $E_v$ of most LIB cathodes, such processing degrades the performance of most sulfur cathodes. A more efficient construction strategy is needed to solve the challenges in Li—S batteries without compromising the Ev.

The present disclosure is thus directed to various inventive implementations of an interlayer designed to have a high local sulfur mobility (LSM) within a nanoscopically-sized local region within the cathode to provide fast redox kinetics and a low global sulfur mobility (GSM). The interlayer may also substantially reduce and, in some instances, prevent the formation of the $Li_2S$ clogging layer further increasing the battery lifetime and cyclability.

FIG. 1A shows an exemplary Li—S battery 100 (also referred to herein as "battery 100") that includes an interlayer 130. As shown, the battery 100 may include a cathode 110, an anode 120, and a separator 130 disposed between the cathode 110 and the anode 120. The separator 130 may be coupled to the anode 120 using electrolyte 150. The interlayer 140 may be disposed as a separate layer on the separator 130 such that the interlayer 140 is located between the separator 130 and the cathode 110. In some implementations, the battery 100 may also include region where LiPS 160 and electrons transport between the interlayer 140 and the cathode 110. The cathode 110 and the anode 120 may each respectively include a current collector (also referred to herein as an "electrode").

The anode 120 may be formed of lithium. In some implementations, the anode 120 has an excess amount of lithium, e.g., 2× excess Li. The cathode 110 may be formed of sulfur. In some implementations, the cathode 110 may also include inactive materials, such as carbon (carbon nanotubes, graphene, carbon black), and/or binder. The separator 130 may be formed of various materials including, but not limited to, polypropylene, polyethylene, and Celgard separators. The electrolyte 150 may be various types of electrolyte including, but not limited to ether-based electrolyte or any other electrolyte that is compatible with the desired operating voltage window of the battery 100.

The interlayer 140 may include an intercalation compound, inactive material (e.g., carbon), a binder (e.g., polyvinylidene fluoride (PVDF)), and/or a solvent (N-methylpyrrolidinone (NMP)). The intercalation compound (also referred to herein as the "intercalation-type material") is a type of material conventional used in LIB cathodes where Li ions are inserted into a host material in the cathode when discharging the battery and released from the host material when charging the battery. The intercalation compound is ionically and electrically conducting and may have a theoretical density higher than elemental sulfur.

The intercalation compound provides a similar function to conventional inactive interlayer materials by providing electrical pathways to transport polarons and/or Li ions. However, unlike conventional inactive interlayer materials, the intercalation compound is also electrochemically active and may thus contribute to the overall capacity and energy density of the battery 100.

The intercalation compound may be various types of intercalated materials including, but not limited to, a Chevrel-phase compound (e.g., $Mo_6S_8$), a layered compound (e.g., $Li_xCoO_2$), and an olivine compound (e.g., $LiFePO_4$). In some implementations, the intercalation compound may be a Chevrel-phase compound with a composition of $M_xM'_6X_{8-y}$ where: M may be lead (Pb), tin (Sn), barium (Ba), silver (Ag), copper (Cu), an alkali metal element, or a lanthanide series element; M' may be ruthenium (Ru), molybdenum (Mo), or rhenium (Rh); X may be sulfur (S), selenium (Se), or tellurium (Te); x may be an integer with a value of 0, 1, 2, 3, or 4; and y may be an integer with a value of 0, 1, or 2 (i.e., $0 \leq x \leq 4$, $0 \leq y \leq 2$).

As described above, the interlayer 140 may also include an inactive material, a binder, and/or a solvent in addition to the active material. The inactive material may be various types of electrochemically inactive, conducting materials including, but not limited to, conductive carbon, carbon black, carbon nanotubes, and graphene. The binder may be various materials including, but not limited to, styrene butadiene rubber (SBR), carboxymethyl cellulose (CMC), and PVDF. The solvent may be various solvents including, but not limited to NMP.

In some implementations, intercalation compound in the interlayer 140 may have a concentration ranging between about 70 wt % to about 90 wt %. The inactive material concentration may be about 5 wt % to about 15 wt %. The binder concentration may also be about 5 wt % to about 15 wt %. In some implementations, the intercalation compound may have a loading approximately 1 mg·cm$^{-2}$ or less.

In some implementations, the interlayer 140 may be configured to increase the capacity of the battery 100 within a voltage window similar to sulfur. For example, the intercalation compound may operate within a voltage window ranging between about 1.7 V and about 2.8 V. In another example, the intercalation compound may operate within a voltage window ranging between about 1.7 V and about 3.5 V.

Various methods may be used to form the interlayer 140. In one exemplary approach, the interlayer 140 may be coating deposited onto the separator 130 using a slurry coating method. The slurry may be formed by mixing the intercalation compound (e.g., as a powder), inactive materials (e.g., carbon nanotubes (CNT's), graphene, carbon black), binder, and solvent. The inactive materials may be chosen to facilitate formation of a 3D interconnected network of conductive pathways to increase the electrical and ionic conductivity of the interlayer 140. The resultant slurry may be cast onto at least one side of the separator 130 using, for example, a doctor blade. The separator 130 coated with the interlayer 140 may then be calendered/rolled. The thickness of the interlayer 140 on the separator 130 may range between about 5 μm and about 15 μm. The separator 130 coated with the interlayer 140 may then dried and cut into a desired shape for assembly of the battery 100. It should be appreciated this is one exemplary method of forming the cathode material 112. Other steps, processes, and methods may be used by one of ordinary skill in the art to produce a cathode material 112 with the desired composition and microstructure.

The following sections describe an exemplary implementation of the interlayer 140 using Chevrel-phase Mo$_6$S$_8$ as the intercalation compound. It should be appreciated that other intercalation compounds and interlayer 140 compositions may be manufactured using similar methods and integrated into various Li—S batteries 100.

An Exemplary Interlayer Using Chevrel-Phase Mo$_6$S$_8$

In one exemplary implementation, the interlayer 140 may include electrochemically-active Chevrel-phase Mo$_6$S$_8$ with fast lithium intercalation reactions and high tap density. The interlayer 140 may be disposed between the sulfur cathode 110 and the separator 130. This interlayer 140 not only has very good compatibility with sulfur and ether-based electrolyte 150, but also is able to contribute its own capacity within the same voltage window (1.7-2.8 V): 4Li$^+$+4e$^-$+Mo$_6$S$_8$↔Li$_4$Mo$_6$S$_8$. The reaction above is topotactic/intercalative and therefore has fast kinetics since Li$_x$Mo$_6$S$_8$ has high polaron mobility. Because the theoretical density (5.04 g·cm$^{-3}$) is much higher than that of sulfur (2.07 g·cm$^{-3}$), the volumetric capacity of Mo$_6$S$_8$ can be very high. Therefore, the mechanically "hard" Mo$_6$S$_8$ with fast Li-ion transport, and nearly zero volume change during charging-discharging, is a desirable backbone to immobilize "soft" sulfur species and "unlock" their high gravimetric capacity by increasing sulfur utilization.

In this example, an electrochemically active hybrid design, including both intercalation and conversion, is constructed by coating Chevrel-phase Mo$_6$S$_8$ on Celgard polypropylene (PP@Li$_x$Mo$_6$S$_8$, which is another reference to the combined the separator 130 and the interlayer 140), whose affinity for LiPS can be greatly enhanced via in-situ electrochemical lithiation of Mo$_6$S$_8$ to form Li$_x$Mo$_6$S$_8$ (see, FIG. 1A), thereby suppressing GSM and resulting in remarkable long-term cycling stability. Unlike non-active interlayer materials, Mo$_6$S$_8$ can act as a favorable secondary active material contributing additional capacity (see, FIG. 1A). Compared with metal oxides with poor electronic conductivity, Mo$_6$S$_8$ presents extremely low electrical resistance (0.102 Ω·sq$^{-1}$ by four-point probe method). Benefitting from the aforementioned unique properties, the pure sulfur cathode combined with the PP@Li$_x$Mo$_6$S$_8$ exhibits a high initial discharge capacity of 1,043 mAh·g$^{-1}$ at 1 C, and superior cycling stability with capacity retention of 69% over 400 cycles. Even for a high sulfur loading of 4.02 mg·cm$^{-2}$, the areal capacity can be stabilized at above 2.9 mAh·cm$^{-2}$ with an excellent capacity retention of 93.1% over 100 cycles. PP@Li$_x$Mo$_6$S$_8$ also successfully addresses the Li$_2$S clogging issue due to its superior LiPS blocking capability and high electronic/ionic conductivity, resulting in excellent rate performance up to 4 C. Importantly, the sulfur cathode 110 paired with the PP@Li$_x$Mo$_6$S$_8$ exhibits E$_v$ 1.21× and 5× that with the pristine PP separator 130 at 0.25 and 1 mA·cm$^2$, respectively.

Fabrication and Characterization of an Exemplary PP@Li$_x$Mo$_6$S$_8$ Separator 130/Interlayer 140

Chevrel phase Mo$_6$S$_8$ is a unique class of compounds that can accommodate multivalent and monovalent cations. The lattice structure includes clusters of distorted Mo$_6$-octahedra surrounded by S$_8$ cubes. Due to its unique open and stable structure, the Mo$_6$S$_8$ Chevrel phase features fast ion transport and good structural stability during lithiation/delithiation with a theoretical specific capacity of 128 mAh·g$^{-1}$. Within the operating voltage window of conventional Li—S batteries from 1.7 V to 2.8 V, the stoichiometry of Li insertion into Mo$_6$S$_8$ involves three stages, $$\text{Li}^+ + e^- + \text{Mo}_6\text{S}_8 \leftrightarrow \text{Li}_1\text{Mo}_6\text{S}_8 \quad (1)$$

$$2\text{Li}^+ + 2e^- + \text{Li}_1\text{Mo}_6\text{S}_8 \leftrightarrow \text{Li}_3\text{Mo}_6\text{S}_8 \quad (2)$$

$$\text{Li}^+ + e^- + \text{Li}_3\text{Mo}_6\text{S}_8 \leftrightarrow \text{Li}_4\text{Mo}_6\text{S}_8 \quad (3)$$

Figure 1B:
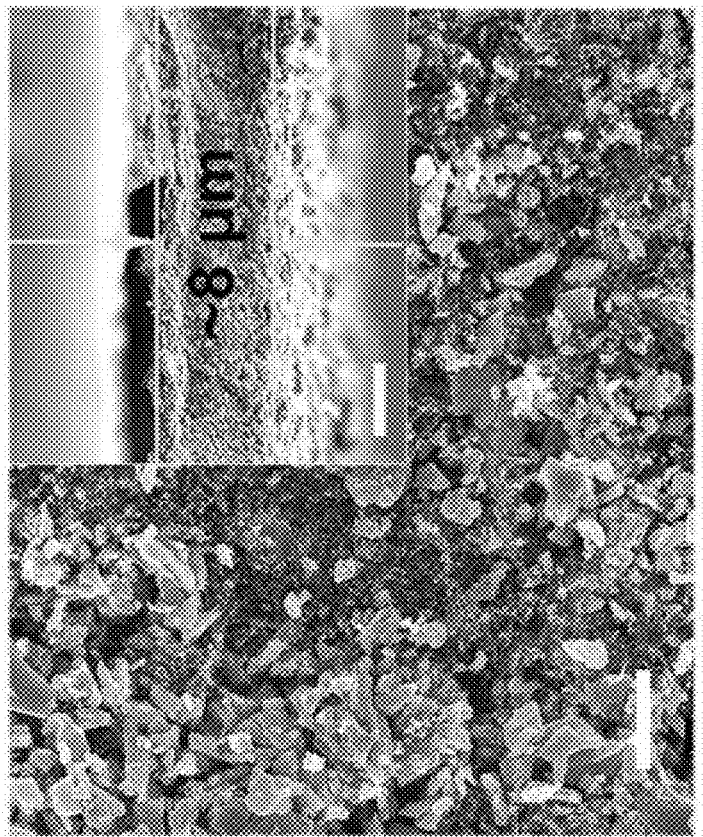
Figure 8B:
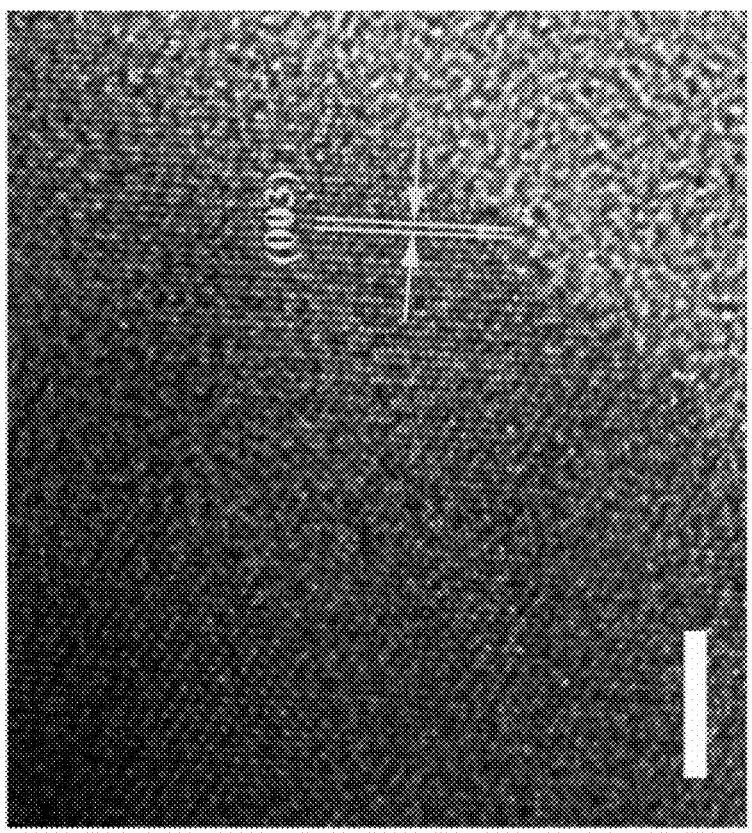
FIGS. 8A and 8B illustrate microstructures of the as-prepared Mo$_6$S$_8$ via SEM and TEM, respectively.
Figure 8A:
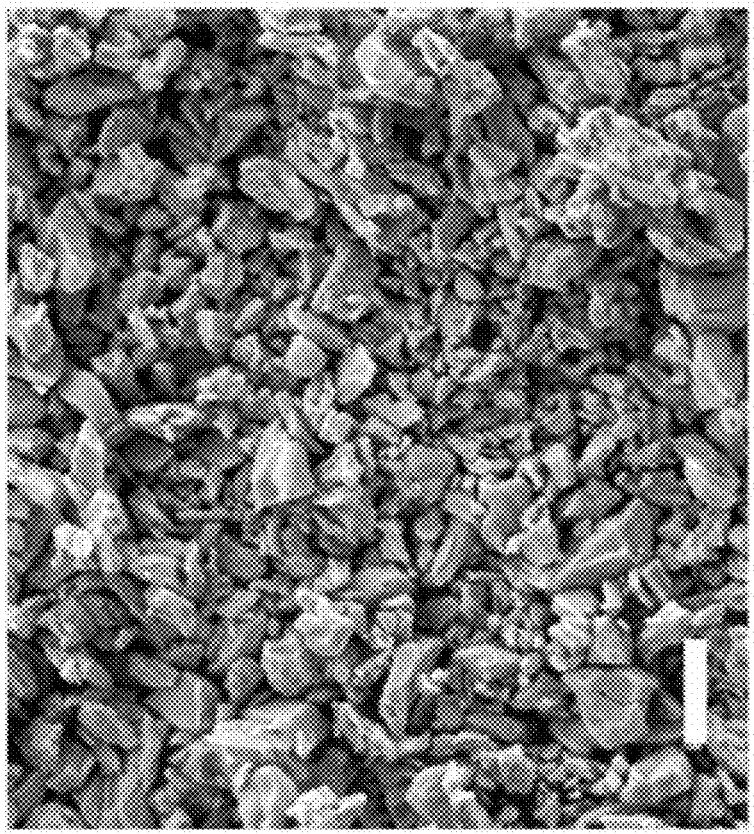
Figure 9:
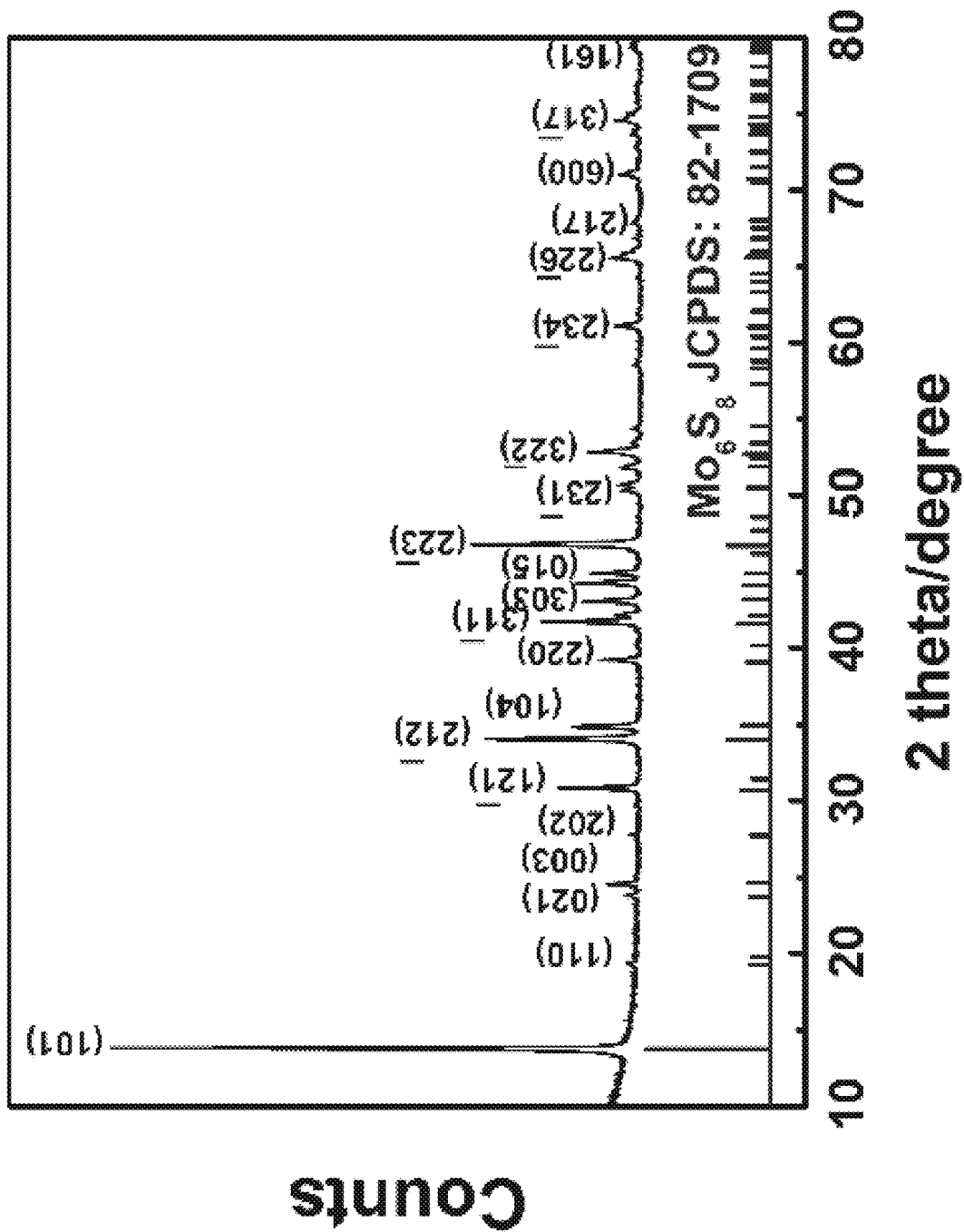
FIG. 9 shows the XRD pattern of the as-prepared Mo$_6$S$_8$.

Mo$_6$S$_8$ may be fabricated by leaching Cu from copper Chevrel powder Cu$_2$Mo$_6$S$_8$, synthesized by solid-state method. SEM micrograph in FIG. 8A reveals the irregular-shaped particles ranging from several hundred nanometers to several microns. A representative high-resolution TEM (HRTEM) image in FIG. 8B clearly shows lattice fringes with a spacing of 0.36 nm, corresponding to (003) plane of rhombohedral Mo$_6$S$_8$ (JCPDS: 82-1709) in accordance with the X-ray diffraction (XRD) result (see, FIG. 9). After coating a mixture of Mo$_6$S$_8$ and conductive carbon black, a uniform and dense layer forms on the surface of the PP separator 130 (see, FIG. 1B). For conventional non-active interlayers, the coating can have a small thickness and a light weight. In some examples, the thickness of the coating 140 can be about 10 μm or less (e.g., 8 μm was used in FIGS. 1A-1G). The weight of the coating 140 can be, for example, about 1 mg·cm$^{-2}$ or less (e.g., 0.4 mg·cm$^{-2}$ was used in FIGS. 1A-1G).

Figure 10A:
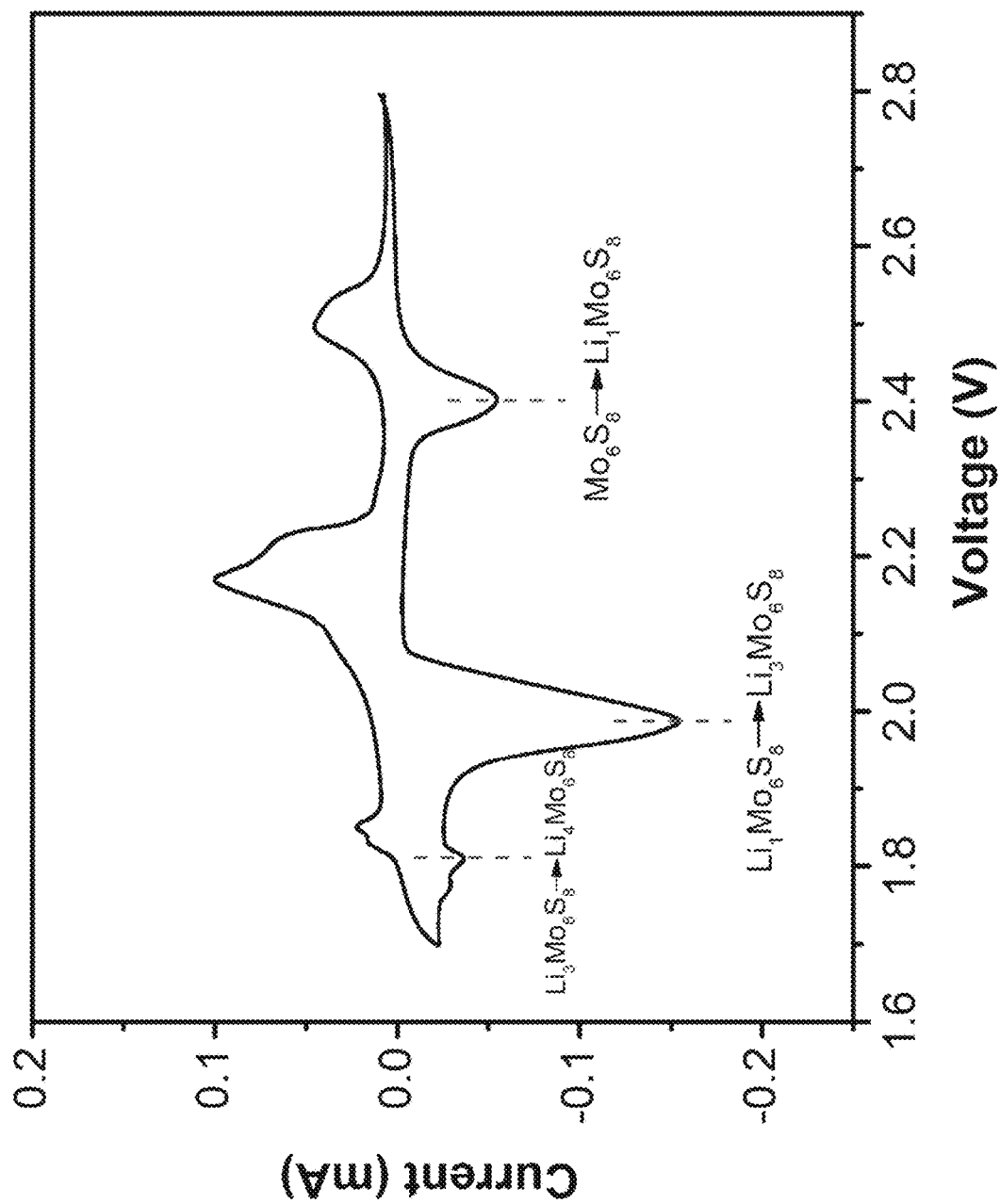
FIGS. 10A and 10B show the cyclic voltammogram (CV) profile for the Mo$_6$S$_8$ electrode with 1M LiTFSI in DOL-DME electrolyte at the scanning rate of 0.1 mV s$^1$ in the voltage range of 1.7 V~2.8 V.
Figure 10B:
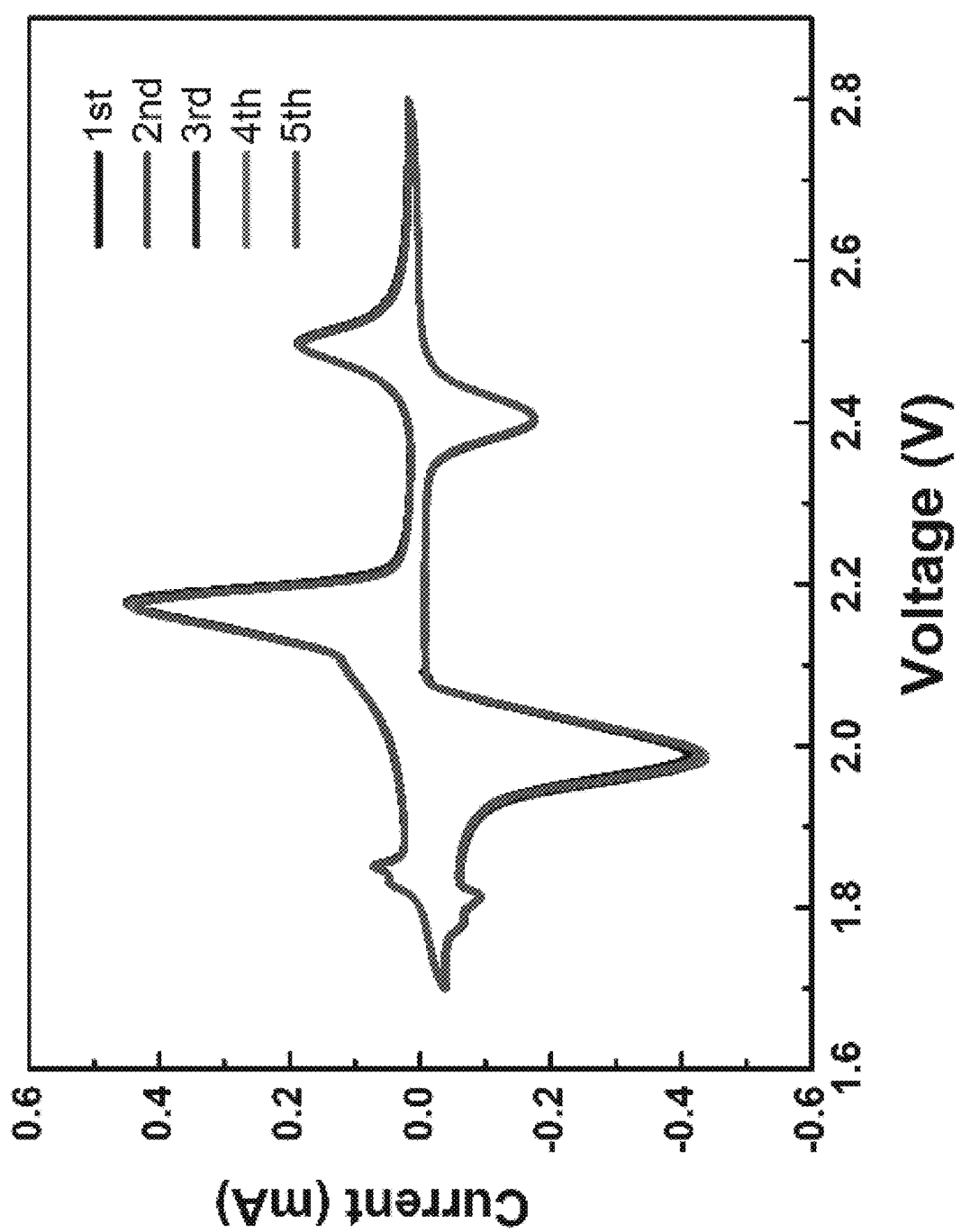
Figure 10C:
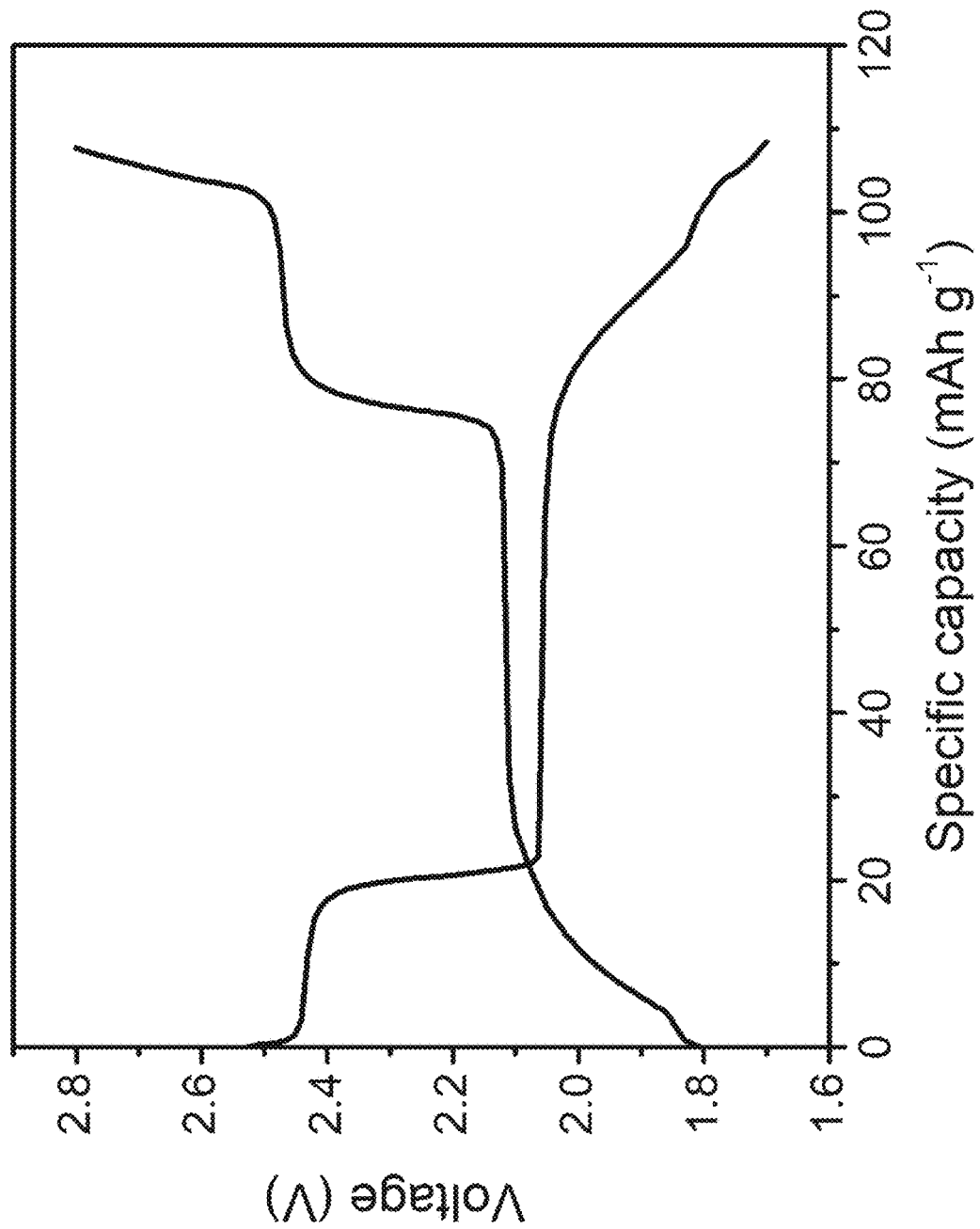
FIG. 10C shows the voltage profile of the Mo$_6$S$_8$ electrode with 1M LiTFSI in DOL/DME electrolyte at 0.5 C.

Although Mo$_6$S$_8$ has received much attention as cathode/anode materials for Mg batteries and high-voltage aqueous lithium-ion batteries, it has not been applied in Li—S batteries. It is a good choice as an interlayer 140 in Li—S batteries 100 due to very good compatibility and superior cycle stability in ether-based electrolyte 150, illustrated by the cyclic voltammetry (CV) (see, FIG. 1C). The typical CV profile shows three cathodic peaks and three anodic peaks corresponding to Equations (1)~(3) (see, FIG. 10A). The lack of obvious decay in peak intensities (see, e.g., FIG. 10B) indicates both good reversibility and stability of Mo$_6$S$_8$ in the Li—S battery electrolyte 150. A low overpotential is also observed from the charge-discharge voltage profiles (see, FIG. 10C) with a high specific capacity of 110 mAh·g$^{-1}$ compared to the theoretical value of 128 mAh·g$^{-1}$.

Figure 11B:
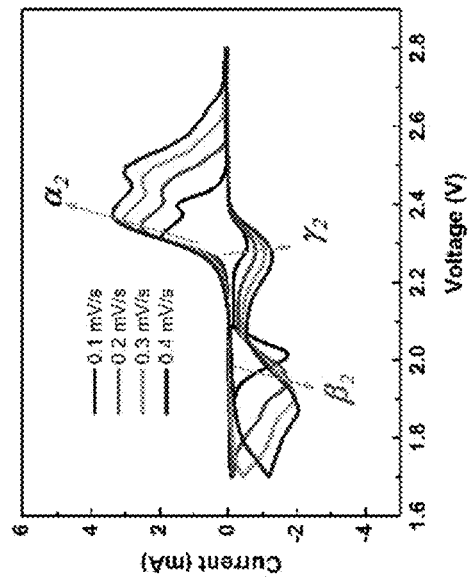
FIGS. 11A and 11B show CVs at different scan rates of Li—S batteries with PP@Li$_x$Mo$_6$S$_8$ and PP@C, respectively.
Figure 11A:
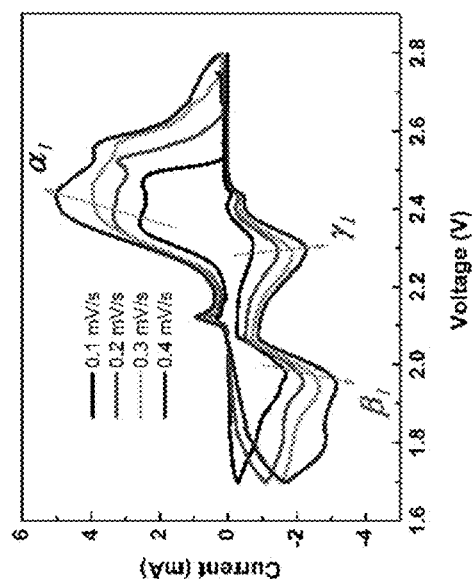
Figure 11C:
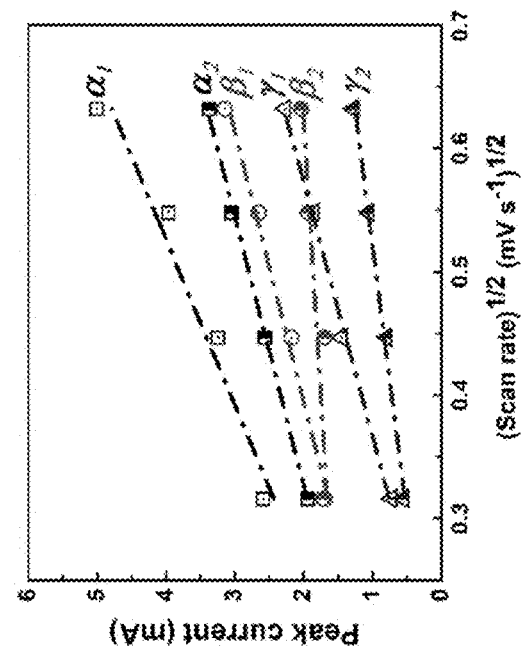
FIG. 11C shows linear fits of the CV peak currents for the batteries with PP@Li$_x$Mo$_6$S$_8$ ($\alpha_1$, $\beta_1$, $\gamma_1$) and with PP@C ($\alpha_2$, $\beta_2$, $\gamma_2$).

In addition, a series of electrochemical measurements were conducted to evaluate the influence of the Mo$_6$S$_8$ layer on separator 130 properties. Overall ionic conductivity was measured by electrochemical impedance spectroscopy (EIS) in symmetrical stainless steel (SS)/SS two-electrode device (see, FIG. 1F). The electrochemically-active features of interlayers 140 at different lithiation levels, namely, PP@Mo$_6$S$_8$, PP@Li$_1$Mo$_6$S$_8$, PP@Li$_3$Mo$_6$S$_8$ and PP@Li$_4$Mo$_6$S$_8$, were tested with the pristine PP separators 130 and carbon-coated PP (PP@C) for comparison. The corresponding ionic conductivities were also calculated based on EIS data (see, FIG. 1G). As understood in the art, the pristine separator 130 plus a conventional interlayer usually impedes lithium ion transport. In contrast, notably, with the lithiation of Mo$_6$S$_8$, its corresponding ionic conductivity increases from 0.19 to 0.39 mS·cm$^{-1}$, higher than that of the PP@C (0.25 mS·cm$^{-1}$) and slightly lower than the pristine PP separator 130 (0.51 mS·cm$^{-1}$). Furthermore, the lithium ion diffusion coefficients ($D_{Li}^+$) of batteries employing the PP@Li$_x$Mo$_6$S$_8$ and PP@C were calculated from a series of CVs at different scan rates (see, FIGS. 11A-11C and Table 2). The linear fit of the peak current at different scan rates (see, FIG. 11C) indicates a diffusion-controlled process. It is worth noting that $D_{Li}^+$ of the cell employing PP@Li$_x$Mo$_6$S$_8$ are higher than those using the PP@C and similar to those using a bare separator 130 ($D_{Li}^+$=2×10$^{-8}$ to 9×10$^{-9}$ cm$^2$·s$^{-1}$), suggesting the diffusion from the sulfur cathode 110 side to the anode 120 side without an impediment.

Figure 1E:
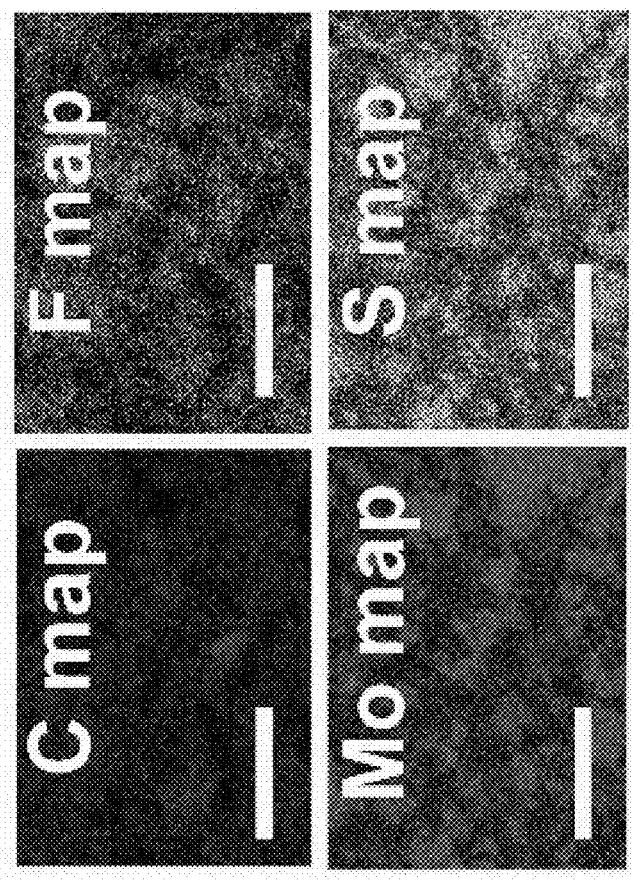
Figure 1D:
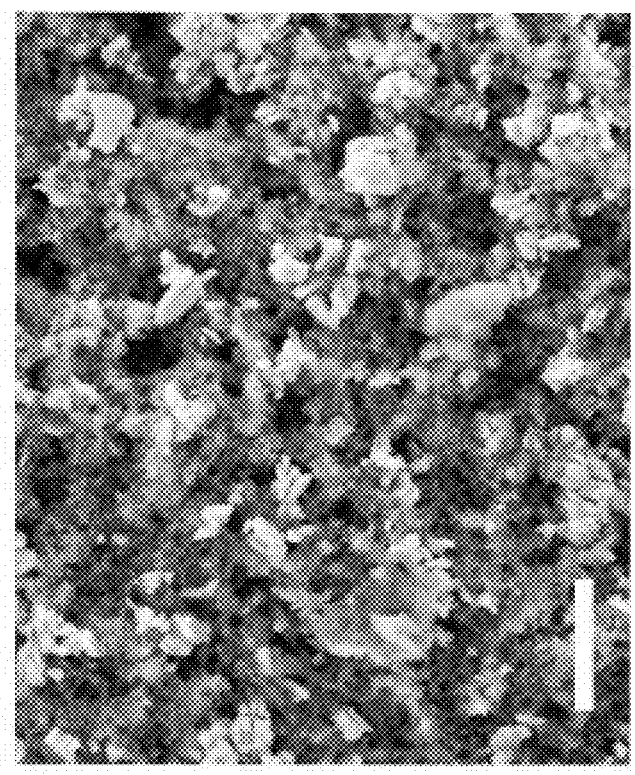
Figure 1G:
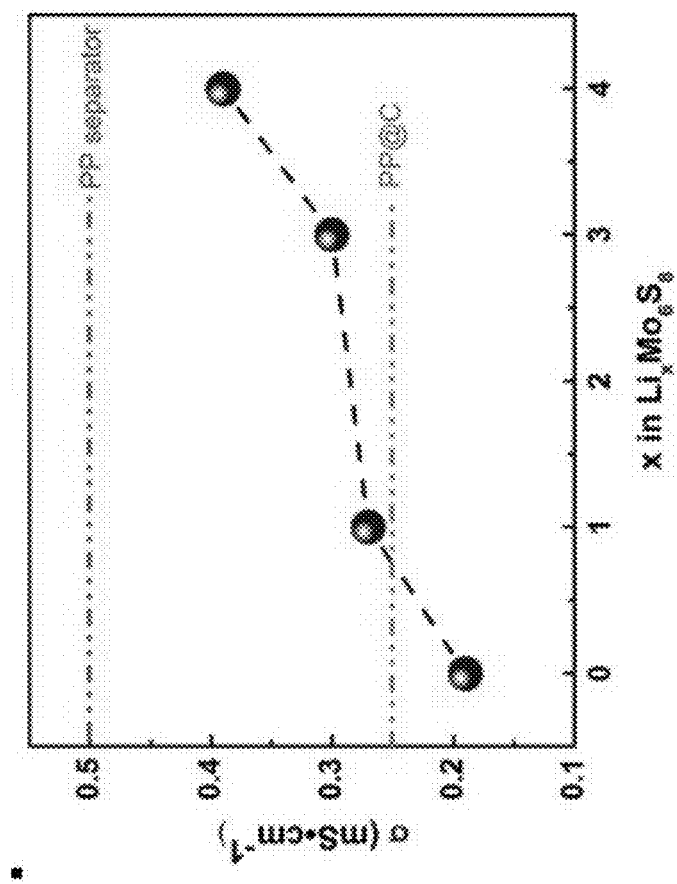
Figure 1F:
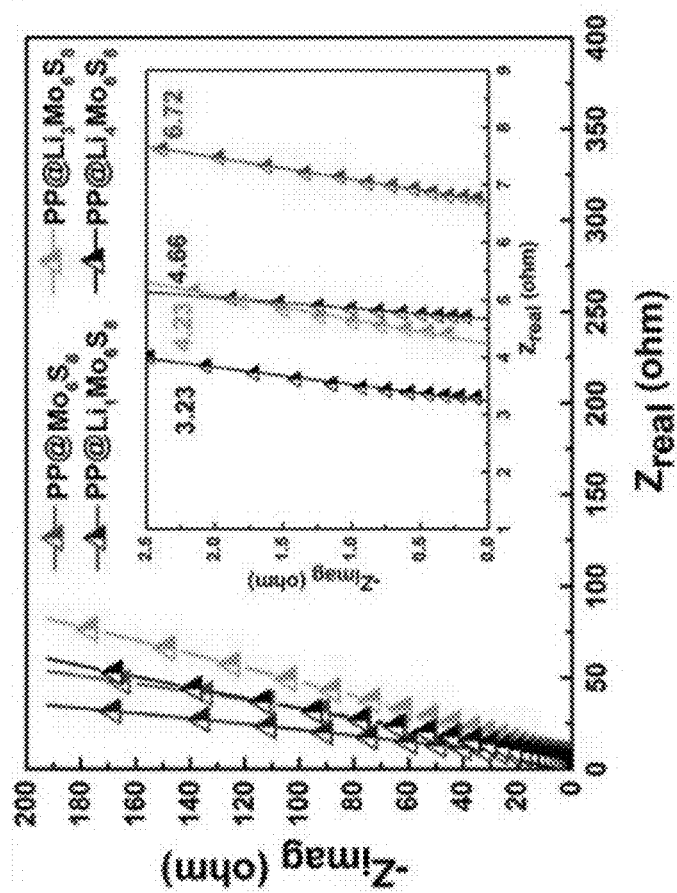
Figure 12:
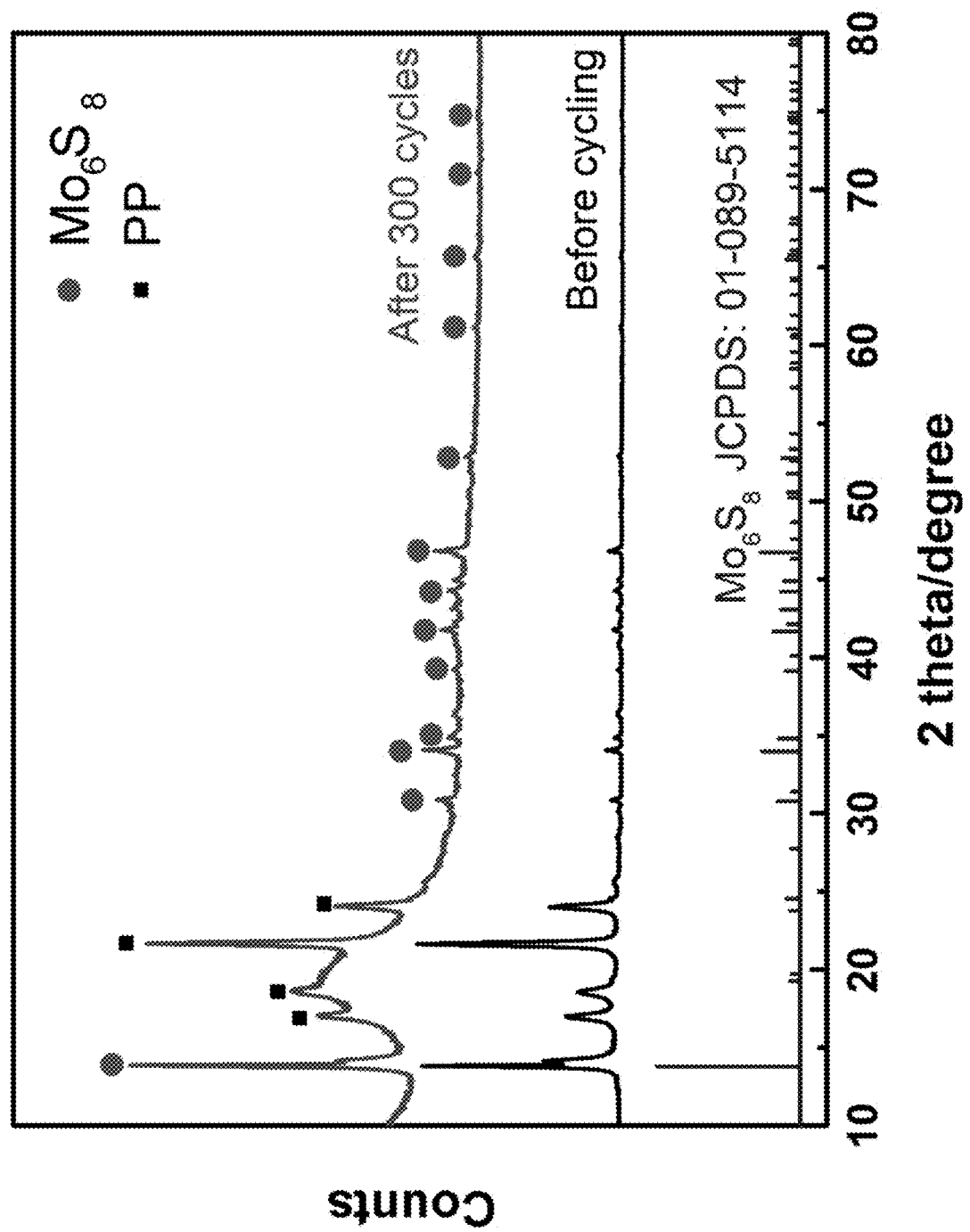
FIG. 12 shows XRD patterns of the PP@Li$_x$Mo$_6$S$_8$ before and after cycling for 300 cycles at fully charged state.

The XRD pattern of the PP@Li$_x$Mo$_6$S$_8$ after 300 cycles (FIG. 12) reveals that Mo$_6$S$_8$ maintains the rhombohedral phase well. HRTEM image (FIGS. 13A-13B) also illustrates the clear and identical lattice fringes as the pristine sample, indicating the good structural stability of Li$_x$Mo$_6$S$_8$ layer throughout the charge-discharge process over long cycles. Furthermore, the distribution of S is in accordance with that of Mo (FIG. 1E).

Enhanced Interaction Between Li$_x$Mo$_6$S$_8$ and LiPS after Lithium Intercalation Unlike conventional non-active materials serving as interlayers/combined barriers on separators 130, which have a given affinity for LiPS, the chemical composition of Li$_x$Mo$_6$S$_8$ undergoes continuous variation during charge-discharge process, thus the latter presents different chemical adsorption to LiPS with the change of voltage. To further understand its electrochemical evolution in Li—S batteries, CV was measured on the sulfur cathode, PP@Li$_x$Mo$_6$S$_8$, and Li anode cell. The CV characteristics in FIG. 2A clearly point to multiple redox reactions during the charge-discharge process and the highly reversible nature of the electrode. The representative cathodic peak at 2.43 V can be attributed to the lithiation of Mo$_6$S$_8$ to Li$_1$Mo$_6$S$_8$. The two representative cathodic peaks at ~2.3 V and 2.0 V are attributed to the lithiation of sulfur to soluble LiPS (Li$_2$S$_n$, 4≤n≤8) and insoluble short-chain Li$_2$S$_2$/Li$_2$S, respectively. The unrecognized cathodic peaks of Li$_3$Mo$_6$S$_8$ and Li$_4$Mo$_6$S$_8$ may result from the overlap with redox peaks of sulfur.

Figure 2C:
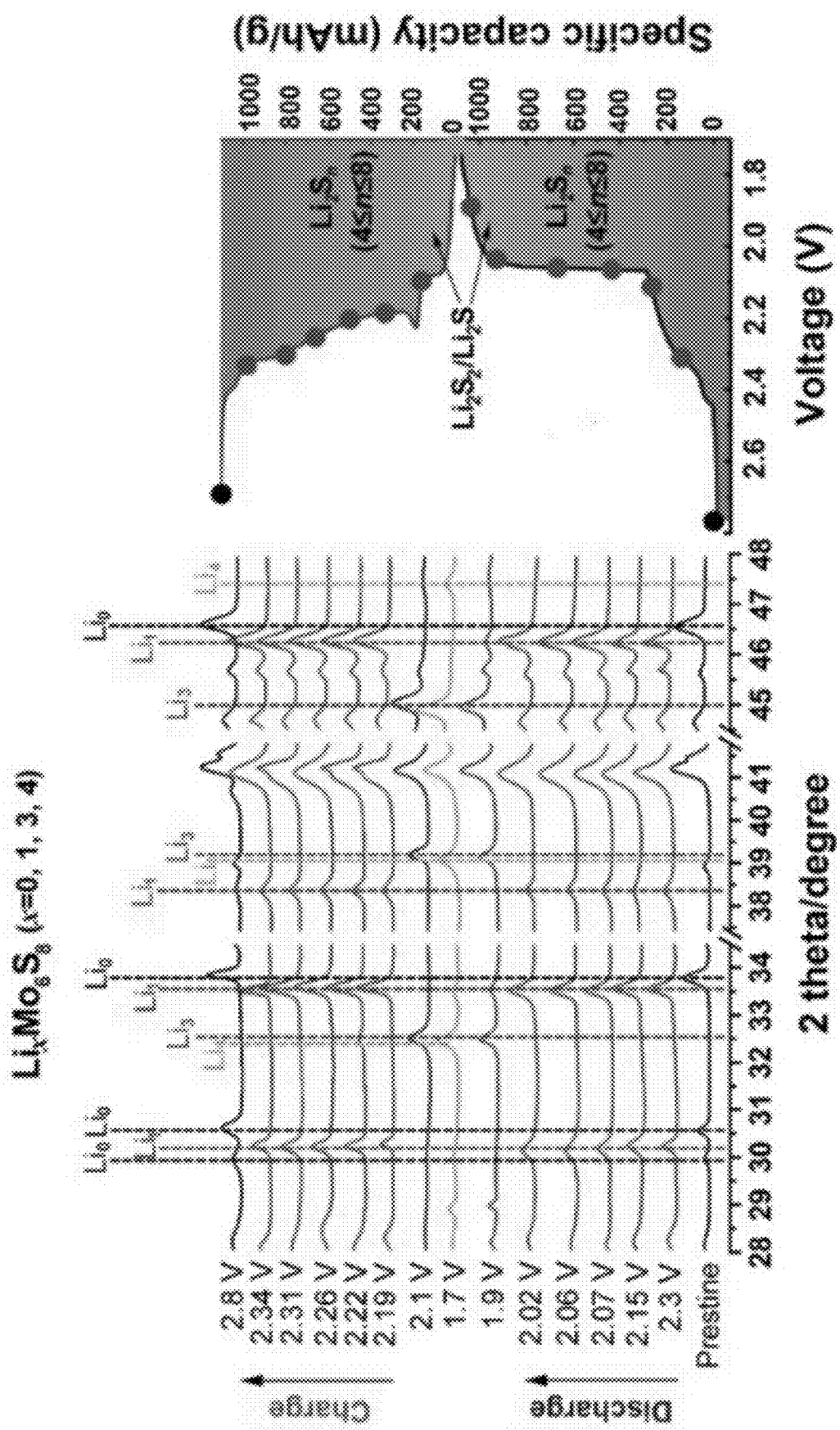

To gain more insight into the phase evolution of Li$_x$Mo$_6$S$_8$ during battery operations, in-situ XRD analysis was performed during the charge-discharge process in the sulfur cathode 110, PP@Li$_x$Mo$_6$S$_8$, and Li anode 120. As shown in FIG. 2C, in the initial stage, the pristine sample only contains rhombohedral Mo$_6$S$_8$. It is noted that no obvious peak associated with sulfur can be identified because of its much lower intensity compared to Mo$_6$S$_8$. When the cell 100 is initially discharged to 2.3 V, three characteristic peaks located at 30.7°, 33.9° and 46.7° shift towards lower angles indicating an increase in the lattice constants after Li intercalation, corresponding to rhombohedral Li$_1$Mo$_6$S$_8$(JCPDS: 081-0858). Discharging further from 2.3 V to 2.0 V, rhombohedral Li$_1$Mo$_6$S$_8$ is the dominant phase accompanying the continuous reduction of sulfur to soluble high-order LiPS (Li$_2$S$_n$, 4≤n≤8) and partially insoluble low-order Li$_2$S$_2$/Li$_2$S. When the cell 100 is further discharged to 1.9 V and 1.7 V, the characteristic peaks continue to shift to lower angles implying the emergence of Li$_3$Mo$_6$S$_8$(JCPDS: 81-0859) and Li$_4$Mo$_6$S$_8$(JCPDS: 81-0860) corresponding to the full conversion from LiPS to solid Li$_2$S. During charging, all the phase evolution is reversible.

The in-situ XRD and CV results reveal that the transition from S$_8$ to LiPS occurs after the formation of Li$_1$Mo$_6$S$_8$ and along with the transformation of Li$_1$Mo$_6$S$_8$ to Li$_3$Mo$_6$S$_8$. Therefore, the adsorption of LiPS predominately originates from the interactions between Li$_1$Mo$_6$S$_8$/Li$_3$Mo$_6$S$_8$ and LiPS. In order to further observe such interactions, the polysulfide adsorption experiment is designed by the visual discrimination of the color changes of the Li$_2$S$_4$ solution with the same amount of adsorbent materials (C, Mo$_6$S$_8$, Li$_1$Mo$_6$S$_8$, Li$_3$Mo$_6$S), as shown in the inset of FIG. 2B. The ability of Mo$_6$S$_8$ to adsorb Li$_2$S$_4$ reveals the strong interaction between metal sulfides and LiPS, whereas the carbon-Li$_2$S$_4$ solution remains almost the same as the blank Li$_2$S$_4$, indicative of weak interaction. However, it is intriguing to note that the Li$_1$Mo$_6$S$_8$ and Li$_3$Mo$_6$S$_8$ show even much stronger adsorption of LiPS, which is reflected by the almost transparent solution after exposure. Such strong adsorption capability of LiPS by Li$_1$Mo$_6$S$_8$ and Li$_3$Mo$_6$S$_8$ can be further verified by ex-situ ultraviolet-visible (UV-vis) spectroscopy measurements. FIG. 2B clearly demonstrates the much higher absorbance of Li$_1$Mo$_6$S$_8$—Li$_2$S$_4$ and Li$_3$Mo$_6$S—Li$_2$S$_4$ solutions than Mo$_6$S$_8$—Li$_2$S$_4$ in the characteristic adsorption regions of Li$_2$S$_4$ at ~410 nm and ~615 nm.

Electrochemical Performance of the Exemplary Interlayer 140

Figure 3B:
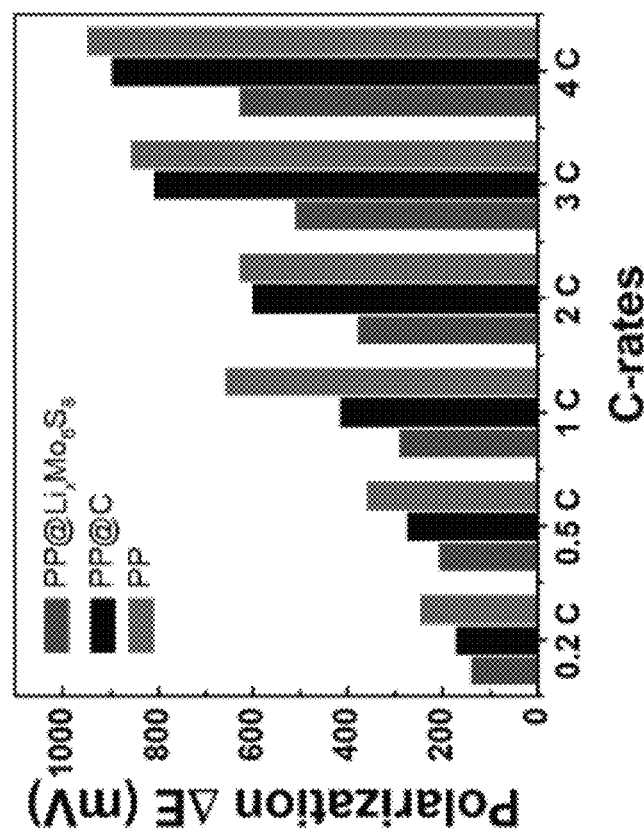
FIGS. 3A-3F illustrate electrochemical and rate performance of Li—S batteries.
Figure 3A:
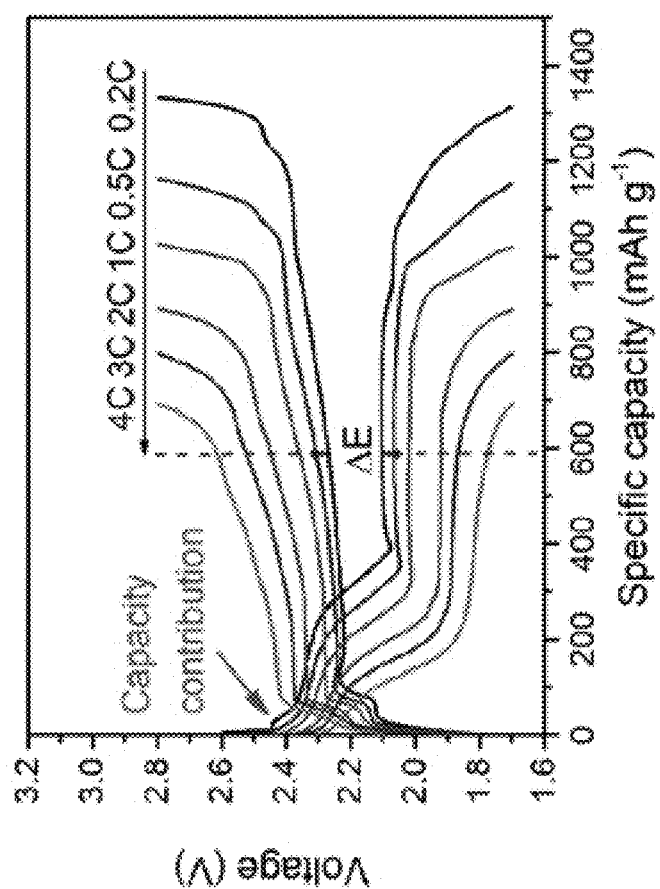
Figure 3C:
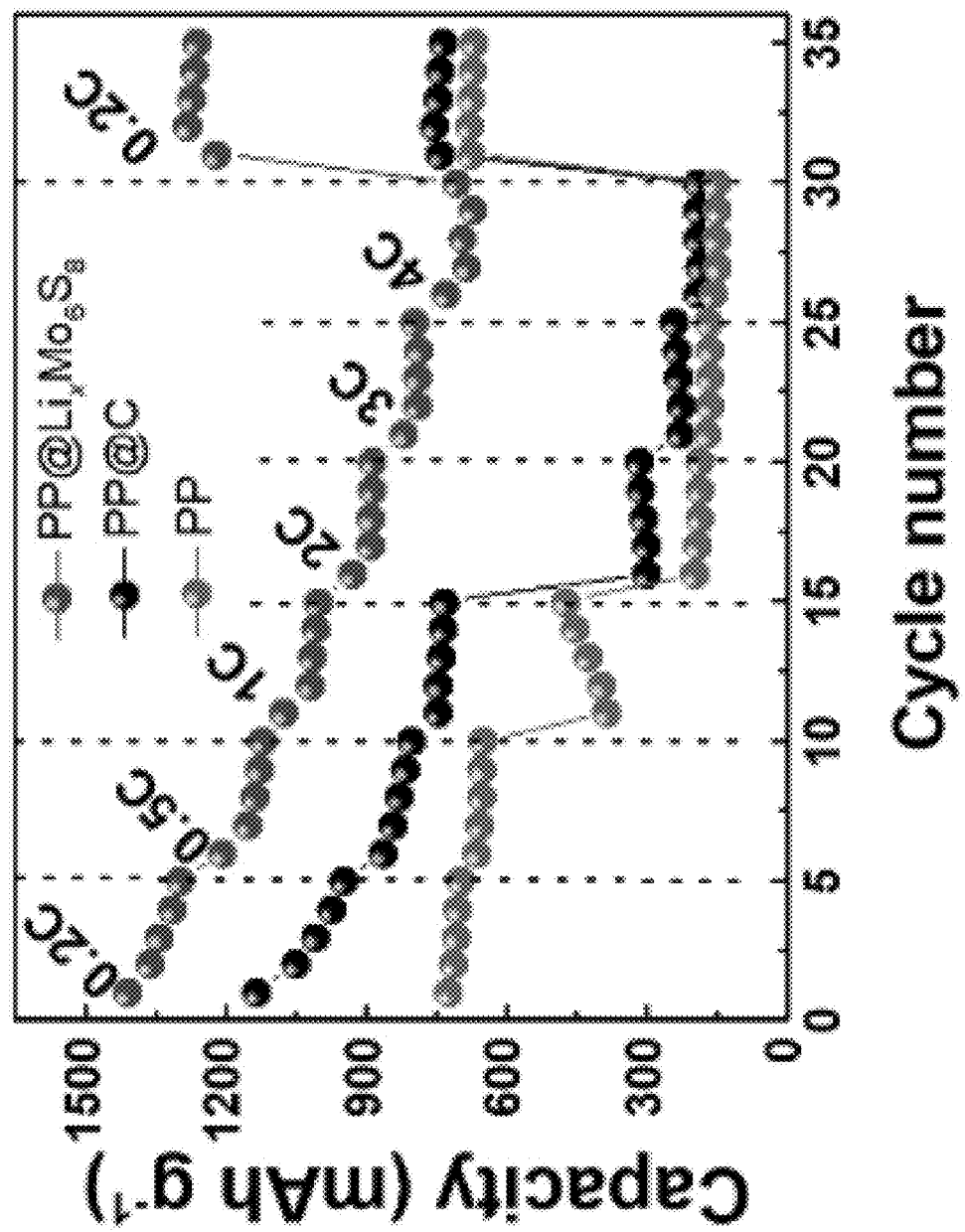
Figures 14A, 14B:
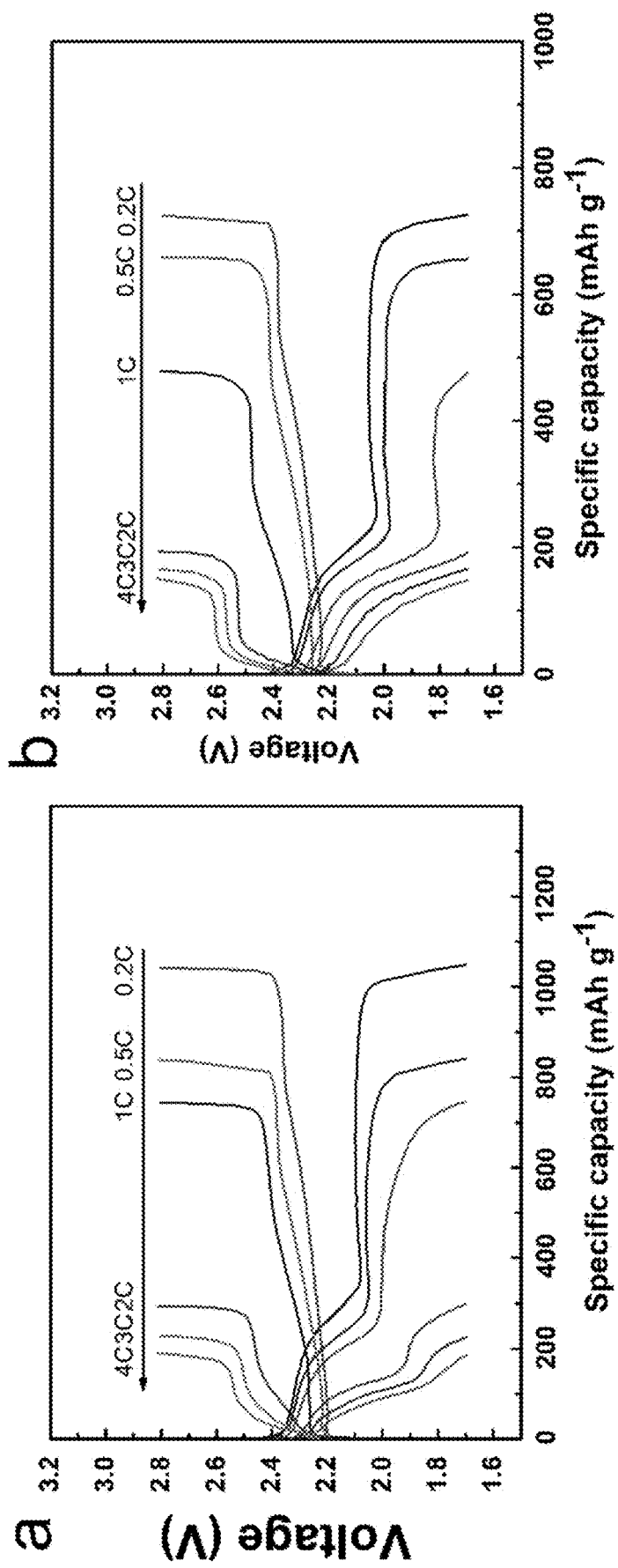
FIGS. 14A and 14B show voltage profiles at various C-rates of the battery with the PP@C and pristine PP separators, respectively.
Figure 15D:
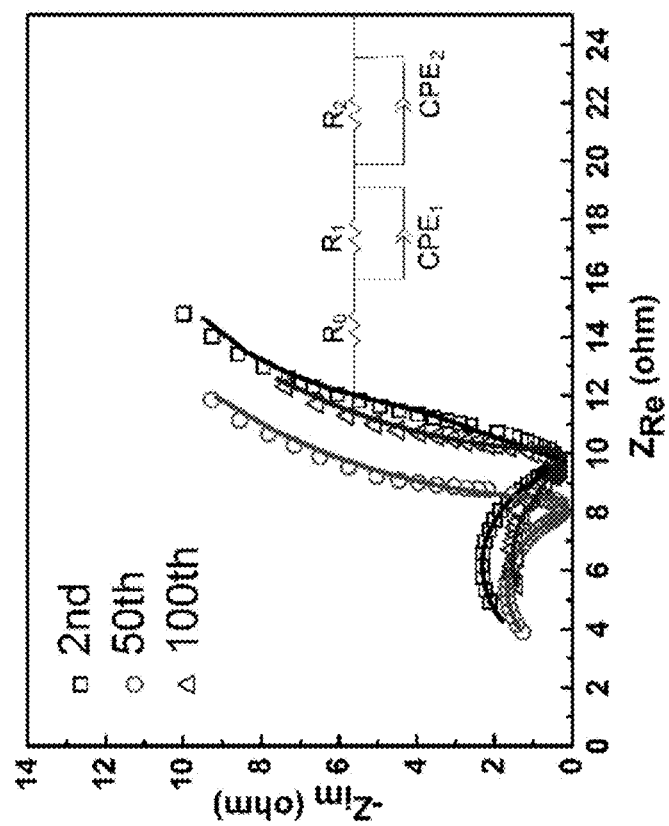
FIGS. 15C and 15D illustrate the electrochemical impedance spectra of the Li—S cells over the 2$^{nd}$, 50$^{th}$ and 100$^{th}$ cycles using the PP@Li$_x$Mo$_6$S$_8$ at fully charged states and fully discharged states, respectively.
Figure 15C:
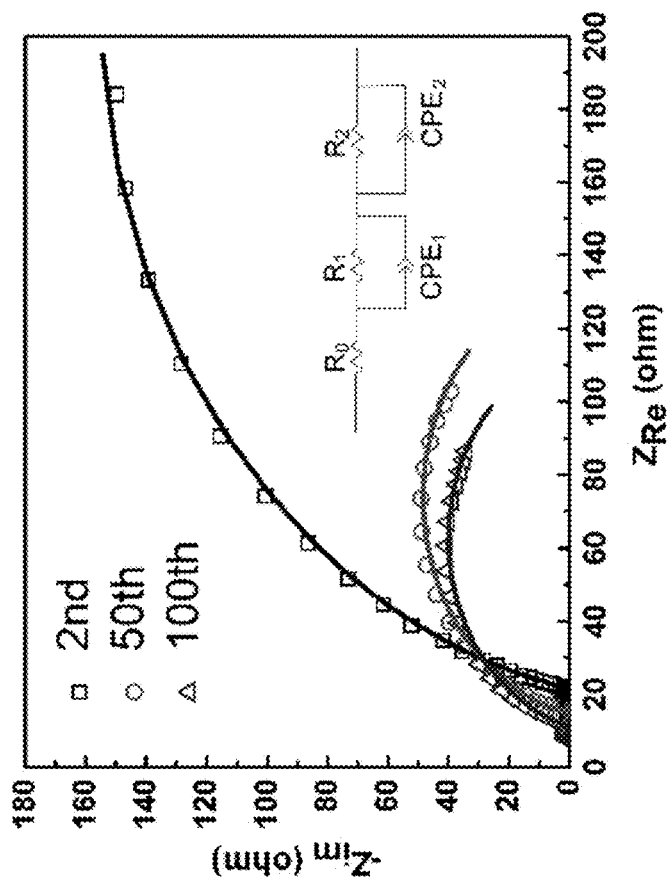

An exemplary Li—S battery 100 with the PP@Li$_x$Mo$_6$S$_8$ and a conventional Li—S battery with PP@C and/or pristine PP were evaluated at different current densities. By comparing with the PP@C and PP (FIGS. 14A-14B), the battery 100 with PP@Li$_x$Mo$_6$S$_8$ exhibits voltage profiles with obvious extra charge/discharge plateaus between 2.4 V-2.5 V in addition to the characteristic plateaus of sulfur (FIG. 3A), suggesting the additional capacity contribution from Mo$_6$S$_8$↔Li$_1$Mo$_6$S$_8$. More importantly, even at higher rates of 3 C and 4 C, the battery 100 with the PP@Li$_x$Mo$_6$S$_8$ still maintains long and flat discharge plateaus, while those with PP@C and PP have much larger polarization and much lower discharge capacities (FIGS. 14A-14B). Such faster redox reaction kinetics by employing PP@Li$_x$Mo$_6$S$_8$ compared to the PP@C and PP can be further illustrated by the calculated polarization at various C-rates (FIG. 3B). Although the PP@C exhibits smaller polarization than the pristine PP separator, its rate performance is still very poor especially at higher rates. Remarkably, the battery 100 with the PP@Li$_x$Mo$_6$S$_8$ exhibits excellent rate performance, delivering high reversible capacities of 1,409 mAh·g$^{-1}$ (0.2 C), 1,206 mAh·g$^{-1}$ (0.5 C), 1,074 mAh·g$^{-1}$ (1 C), 935 mAh·g$^{-1}$ (2 C), 819 mAh·g$^{-1}$ (3 C) and 728 mAh·g$^{-1}$ (4 C) (FIG. 3C). This proves that the interlayer 140 is favorable to improve the kinetics of sulfur electrode 110, whose effect is highly dependent on the material. Mo$_6$S$_8$ is obviously much better than carbon due to its unique properties of strong interaction with LiPS and good ionic/electronic conductivities.

Figure 3E:
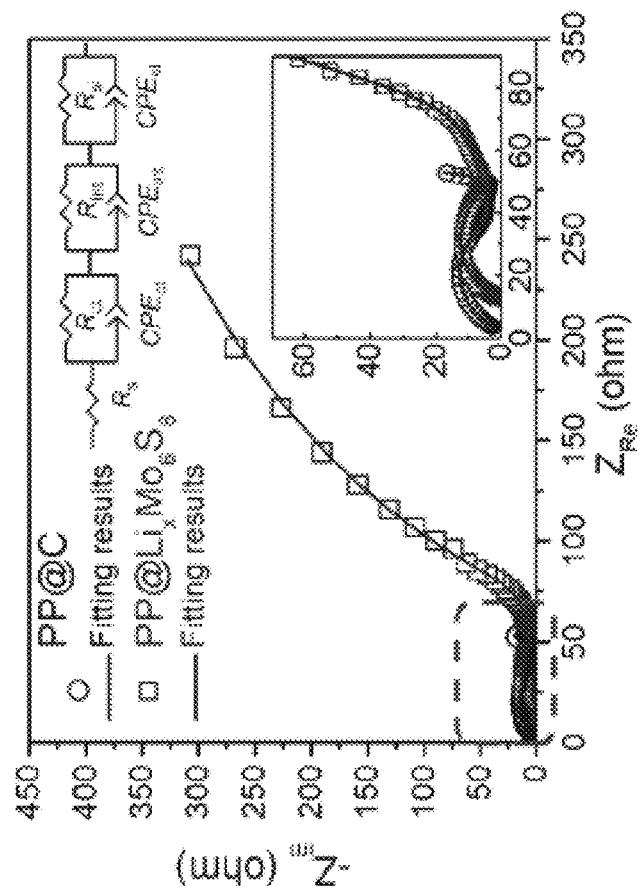
Figure 3D:
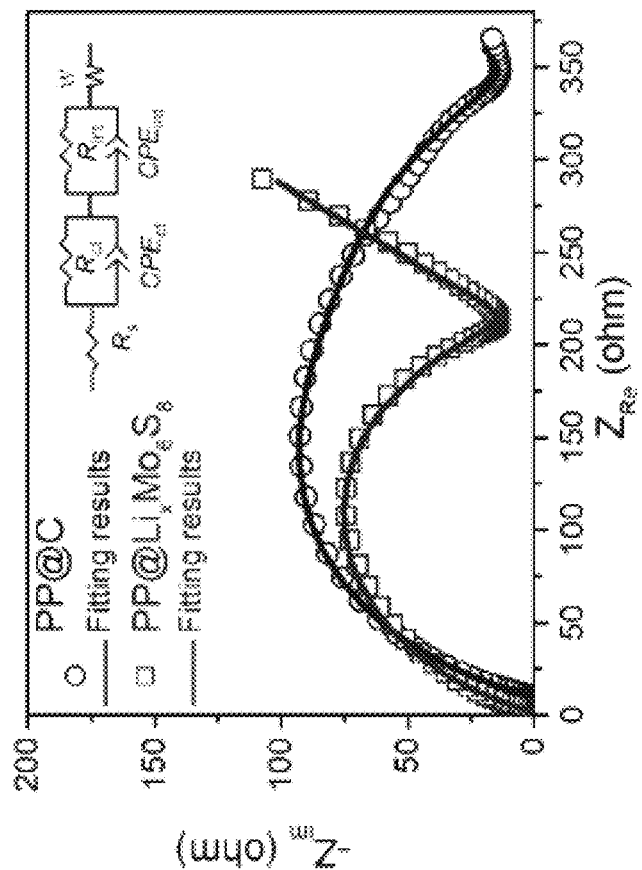
Figure 3F:
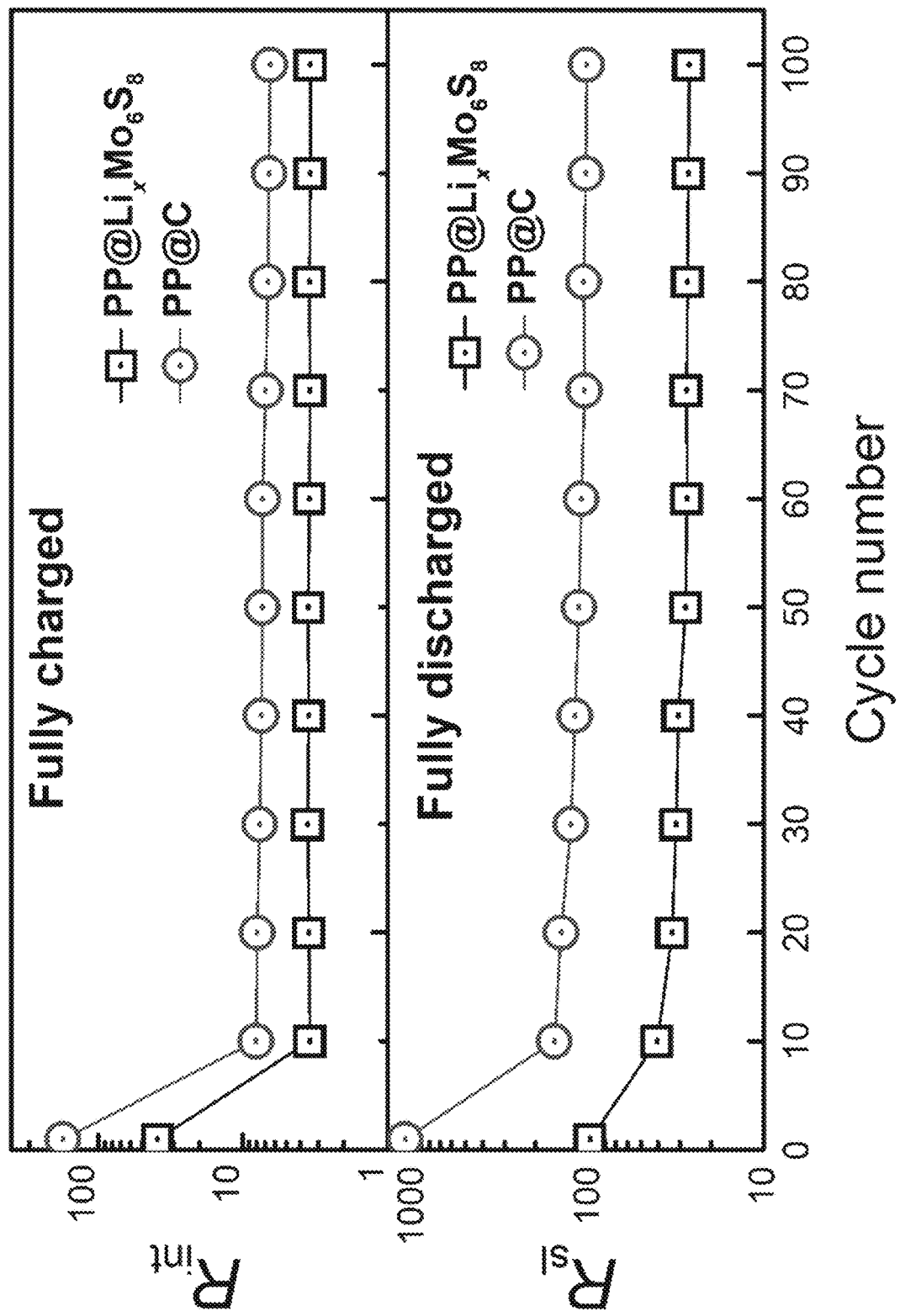

The effect of different interlayers on the electrochemical kinetics at the battery level was investigated by EIS to further elucidate the mechanism of the enhanced kinetics. The Nyquist plots can be fitted to an equivalent circuit consisting of an ohmic resistance of the electrolyte solution ($R_s$) with one or more resistance//constant phase elements (R//CPE) and a Warburg element (W). The Nyquist plots of batteries using the PP@Li$_x$Mo$_6$S$_8$ and PP@C before cycling are shown in FIG. 3D. Excellent fitting results can be achieved when employing the equivalent circuit in FIG. 3D (inset), indicating two semicircles in the high-frequency region: a charge-transfer resistance $R_{ct}$ and an interface contact resistance between the coating layer and cathode $R_{int}$. The value of $R_{int}$ from the battery using the PP@Li$_x$Mo$_6$S$_8$ (38.7Ω) is much smaller than that from the battery using the PP@C (175Ω), implying a much faster lithium ion diffusion between the Li$_x$Mo$_6$S$_8$ layer and the sulfur cathode (Table. 3). After discharging to 1.7 V for the initial cycle, the conversion of the LiPS to the solid Li$_2$S film on the cathode surface results in large interface contact resistance $R_{sl}$ (FIG. 3E). Notably, the $R_{sl}$ from the battery using the PP@Li$_x$Mo$_6$S$_8$ (97.9Ω) is one order of magnitude smaller than that from the cell using the PP@C (1106Ω). Such smaller resistances can be further confirmed by monitoring the EIS plots for long cycles (FIG. 3F and FIG. 3B).

Figure 4A:
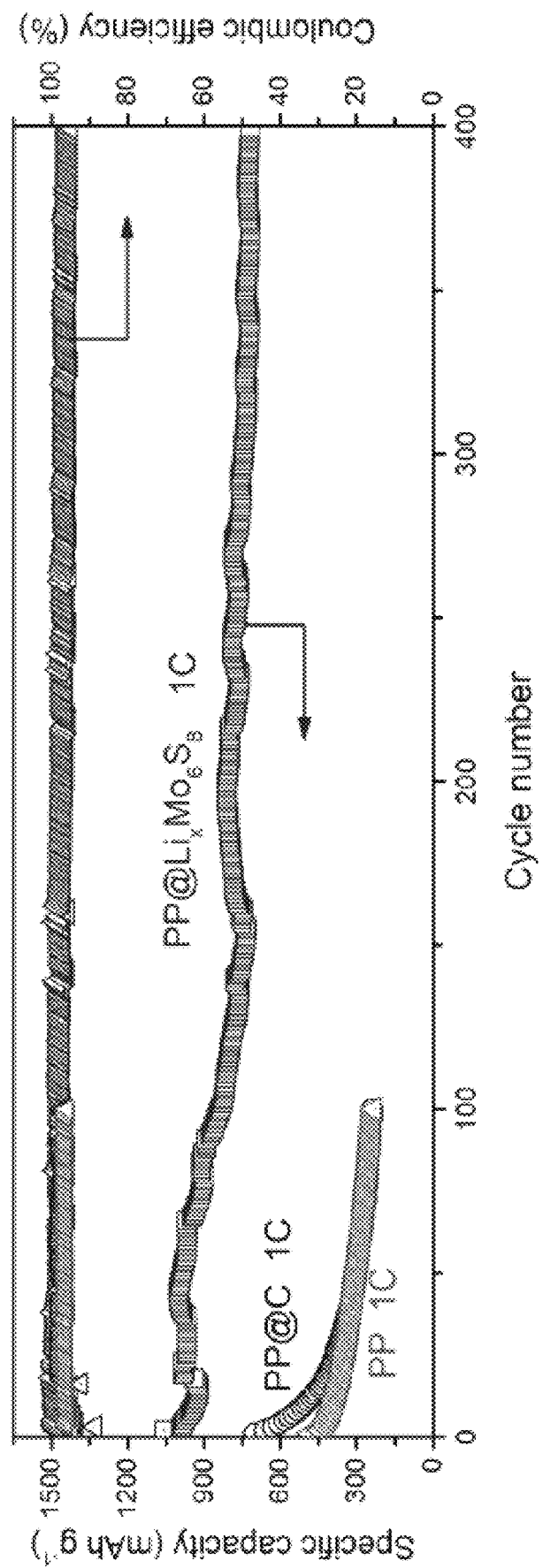
FIGS. 4A-4B illustrate cycling performance and volumetric energy density of Li—S batteries.

To evaluate long-term cycling performance, batteries with PP@Li$_x$Mo$_6$S$_8$, PP@C and pristine PP were tested by galvanostatic charge-discharge measurement. Notably, the battery 100 using PP@Li$_x$Mo$_6$S$_8$ delivers the highest initial capacities of 1056 mAh·g$^{-1}$ and exhibits excellent long-term cycling stability with capacity retention of 69% at 1 C after 400 cycles (FIG. 4A), demonstrating that the PP@Li$_x$Mo$_6$S$_8$ not only effectively confines LiPS inside the cathode but also "reactivates" it during long-term cycling. In comparison, batteries with PP@C and PP separator show not only much lower capacities but also poor cycling stability (FIG. 4A).

Figure 16:
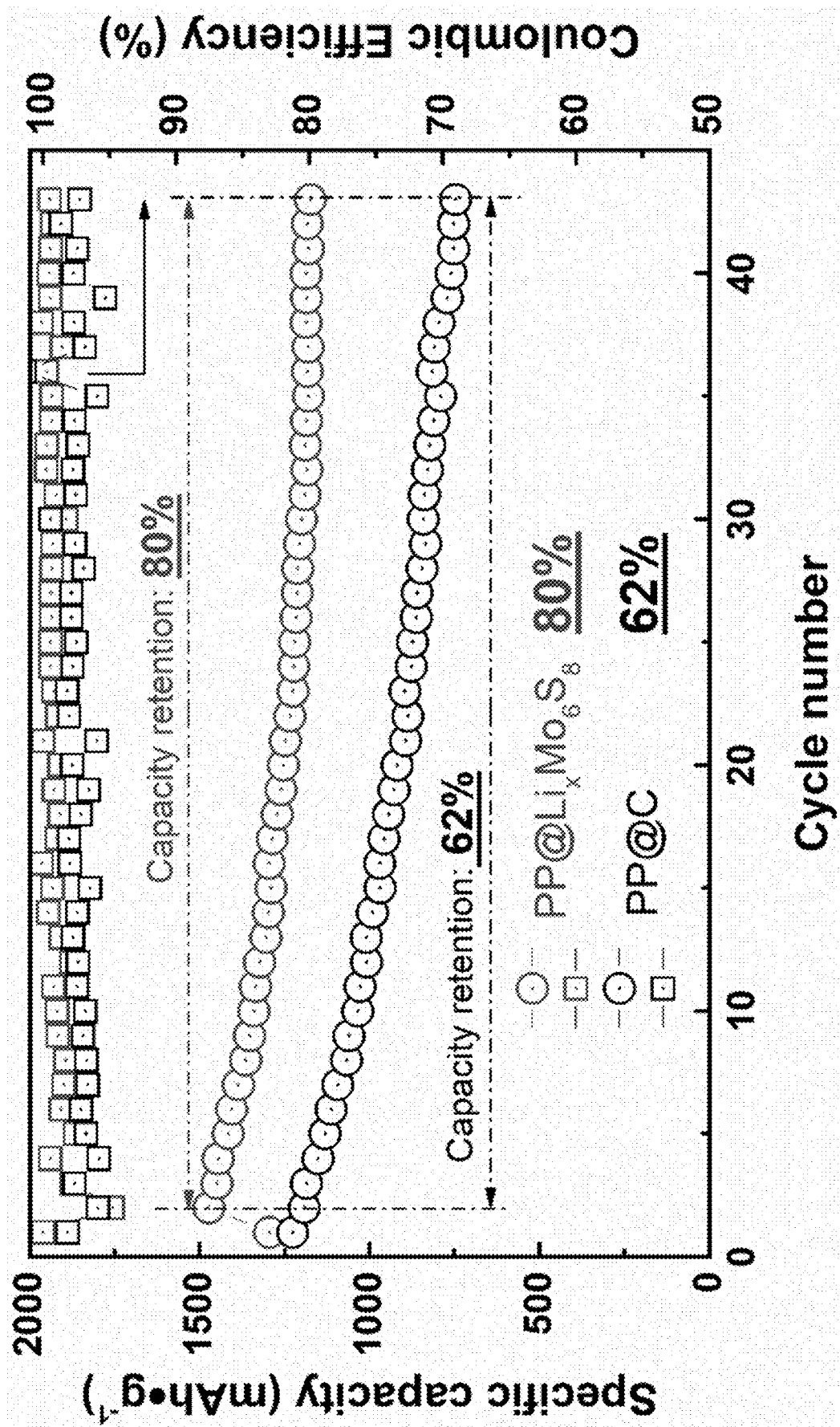
FIG. 16 shows cycling performances of Li—S batteries using the PP@Li$_x$Mo$_6$S$_8$ and the PP@C at 0.1 C. For the battery using the PP@Li$_x$Mo$_6$S$_8$, the initial specific capacity was measured to be 1471 mAh·g$^{-1}$, followed by a high capacity retention of 80%. In contrast, the battery using the PP@C only exhibited a lower capacity of 1226 mAh·g$^{-1}$ with a much poorer retention of 62%. Furthermore, the battery with the PP@C has lower Coulombic efficiency (CE) than that with the PP@Li$_x$Mo$_6$S$_8$. The results about cycling performance and CE indicate that the Li$_x$Mo$_6$S$_8$ coating is effective in suppressing the shutting effect even cycled at low rate.
Figure 17:
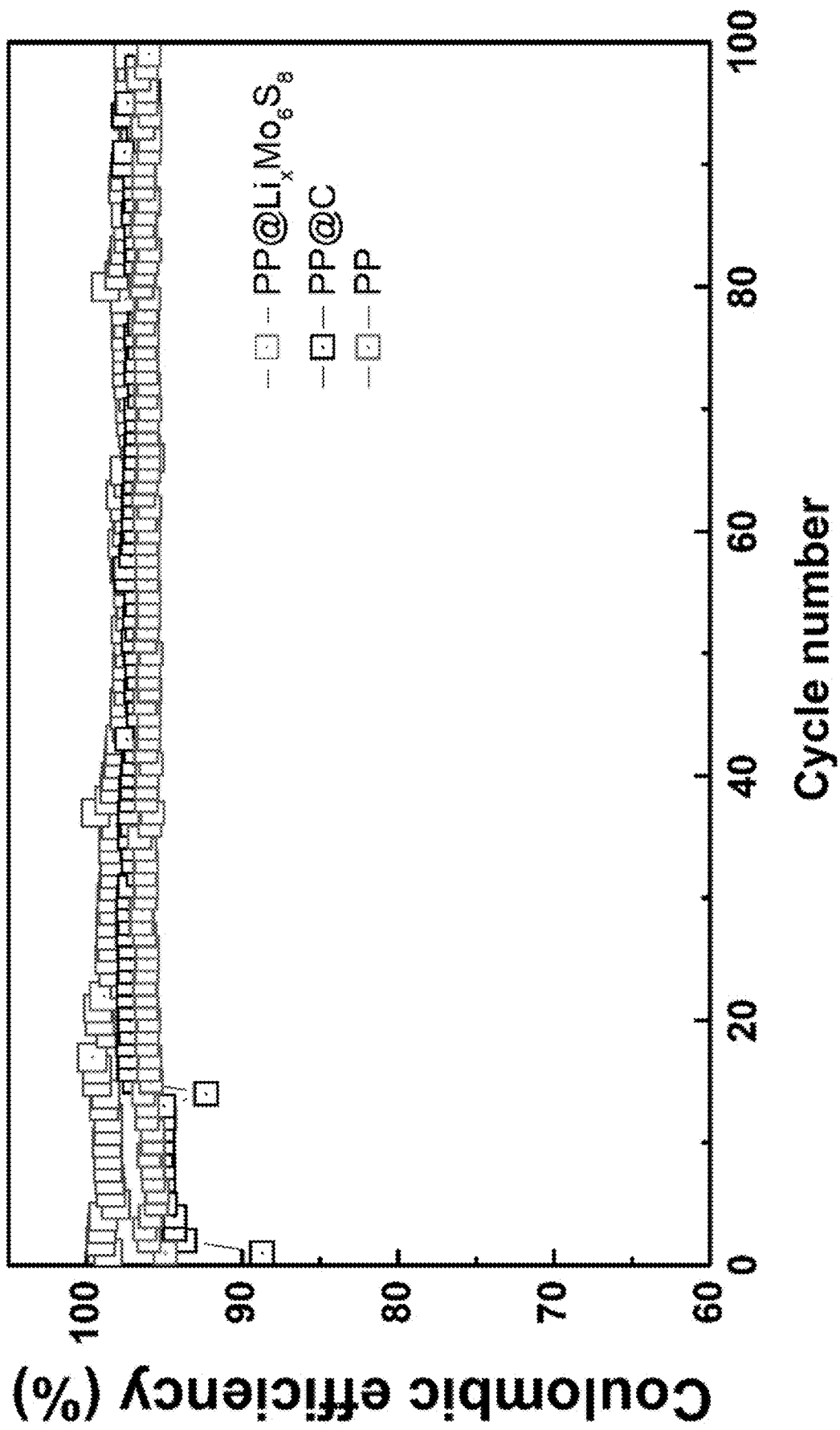
FIG. 17 shows Coulombic efficiency of batteries with the PP@Li$_x$Mo$_6$S$_8$, PP@C and pristine PP separators.
Figure 20:
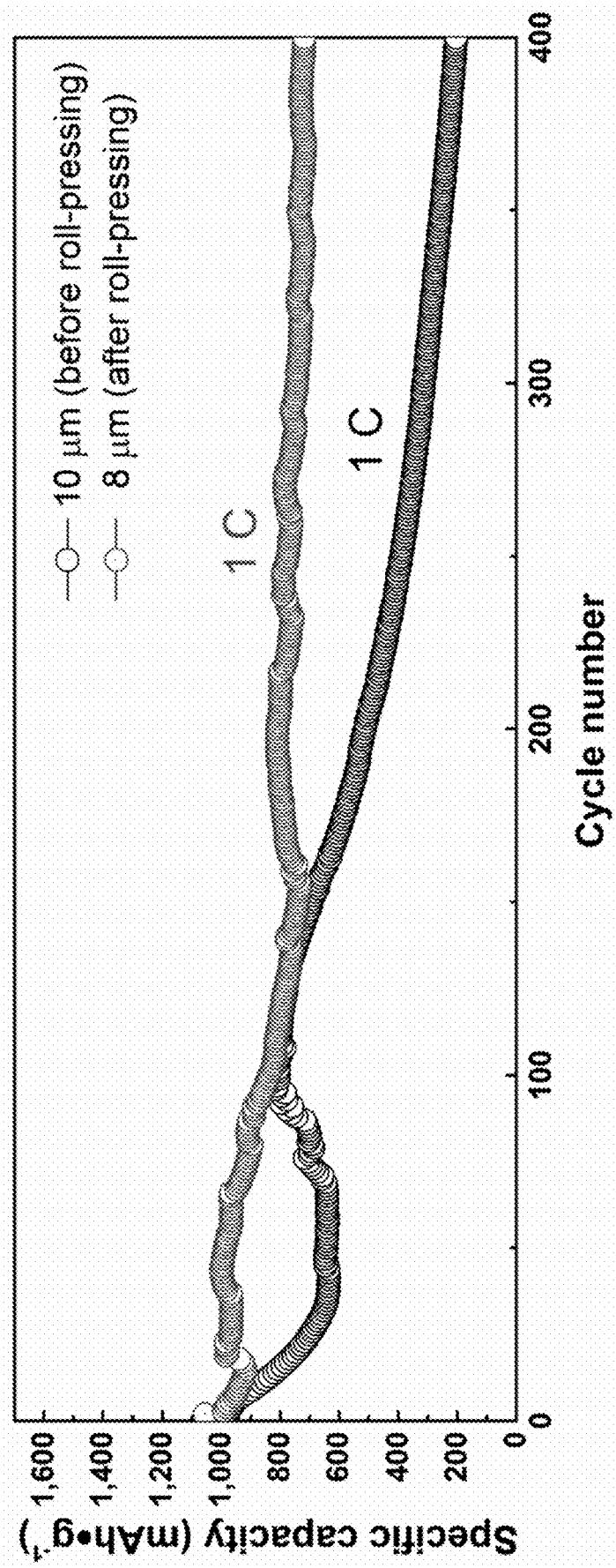
FIG. 20 shows cycling performance of Li—S batteries at 1 C with $Mo_6S_8$ interlayer before and after rolling. In the experiments, the slurry was cast onto one side of a Celgard PP separator with a doctor blade followed by roll-pressing to obtain a denser coating layer which is beneficial to the volumetric energy density. The cycling stability of the batteries can be affected by the thickness and porosity of the $Mo_6S_8$ layer. Before and after rolling, the thicknesses of the $Mo_6S_8$ layer are 10 μm and 8 μm, respectively, corresponding to a 20% decrement in porosity. The batteries with the PP@$Li_xMo_6S_8$ before and after rolling were measured at 1 C over 400 cycles. Although their initial capacities are similar, the battery with 10 μm $Mo_6S_8$ layer exhibits a severe capacity decay after about 150 cycles while the battery with 8 μm $Mo_6S_8$ layer can achieve a high capacity retention. Therefore, a denser $Mo_6S_8$ layer can improve the long-term cycling performance. The less free volume in the denser structure for LiPS diffusion can be helpful to achieve a more stable status as solid-state electrolyte to block the LiPS.
Figure 21:
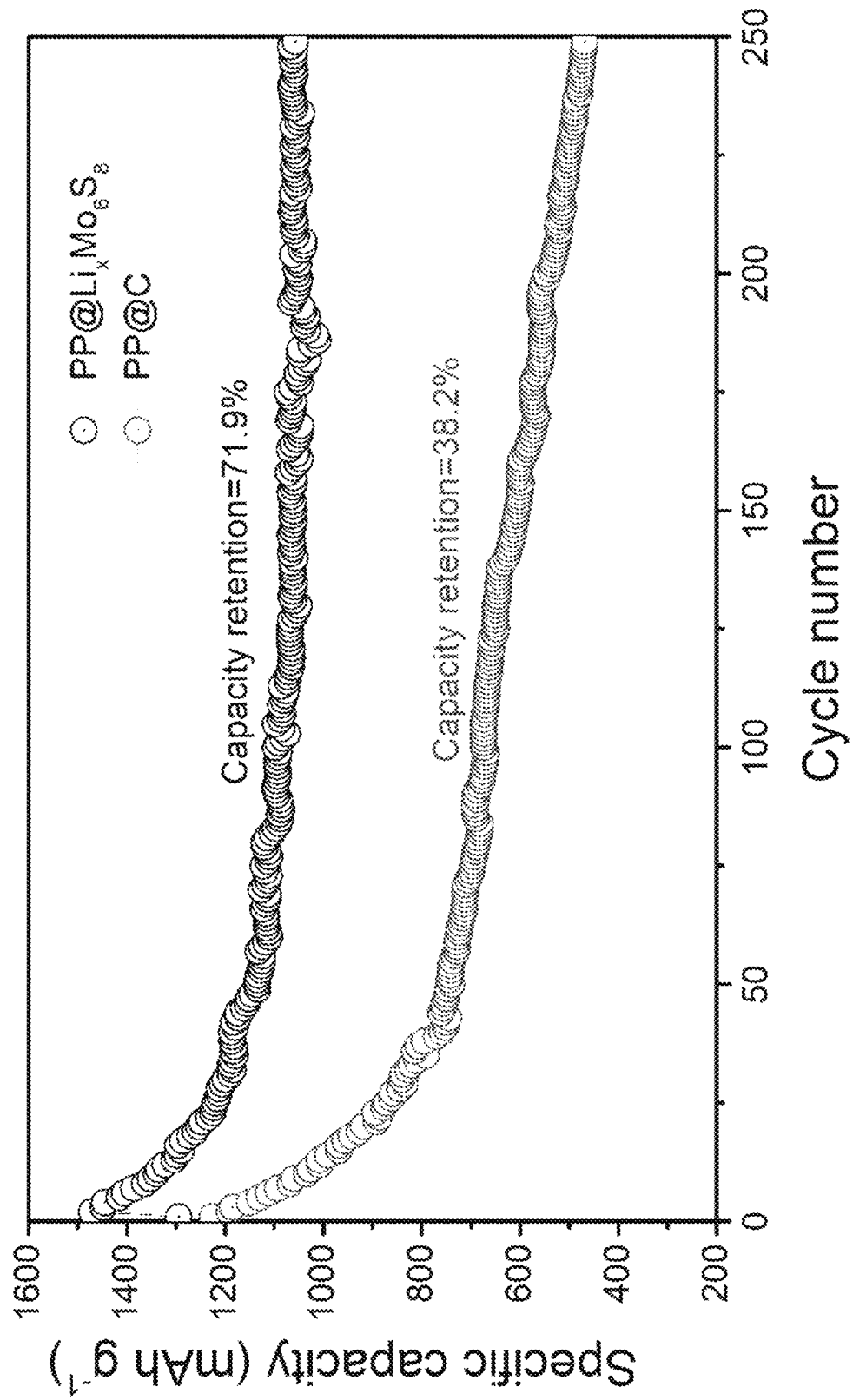
FIG. 21 shows cycling performances of Li—S batteries using the PP@$Li_xMo_6S_8$ and the PP@C at 0.1 C over 250 cycles.
Figure 22:
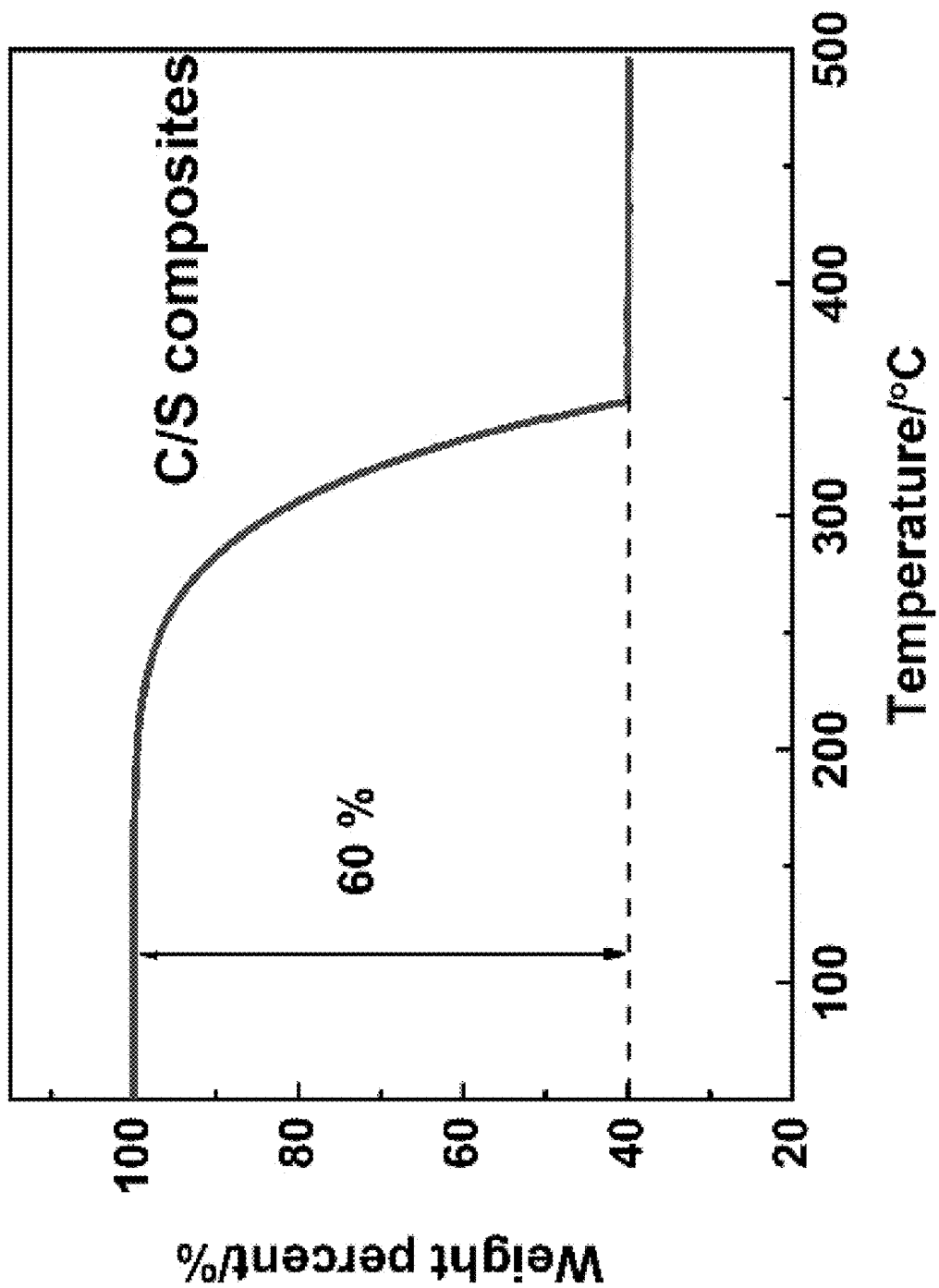
FIG. 22 shows thermogravimetric analysis (TGA) from room temperature to 500° C. at a heating rate of 10° C. $min^{-1}$ under $N_2$ atmosphere to determine the sulfur content.

The effective alleviation of the shuttling effect by the Li$_x$Mo$_6$S$_8$ interlayer 140 can also be verified by low-rate cycling data (0.1 C, FIG. 16). A denser Mo$_6$S$_8$ layer is beneficial for long-term cycling stability, which is also preferable for improving the volumetric energy density (FIG. 20). The low C-rates cycling test, which is very challenging for Li—S batteries, was also conducted to demonstrate the effect of PP@Li$_x$Mo$_6$S$_8$ on cycle life (FIG. 21). The battery 100 using the PP@Li$_x$Mo$_6$S$_8$ exhibits a high capacity retention of 71.9% over 250 cycles, compared to the much poorer retention of only 38.2% for the battery using the PP@C. Furthermore, the Coulombic efficiency (CE) with PP@LiMo$_6$S$_8$, PP@C and PP at 1 C are shown in FIG. 17. The battery with blank PP has the lowest CE while that with PP@Li$_x$Mo$_6$S$_8$ exhibits the highest CE up to 99.6%, indicating that the Li$_x$Mo$_6$S$_8$ coating is effective in suppressing the SRM shuttling effect and has improved cycling stability. The PP@C shows only slightly higher CE than bare PP.

Figure 4B:
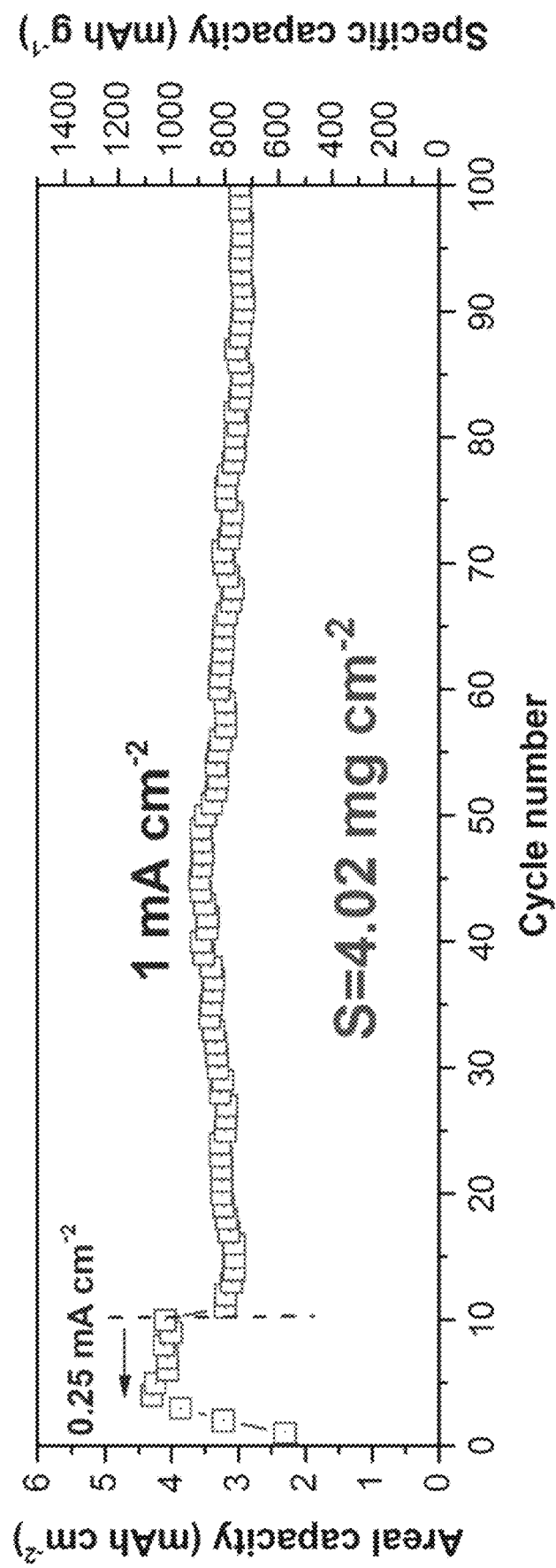

In order to further demonstrate the efficacy of PP@Li$_x$Mo$_6$S$_8$, a high sulfur loading electrode (>4.0 mg·cm$^{-2}$) was evaluated. As shown in FIG. 4B, upon cycling at 0.25 mA·cm$^2$, a discharge capacity of 4.3 mAh·cm$^{-2}$ is obtained after the initial activation, corresponding to a specific capacity of 1,070 mAh·g$^{-1}$. As the current density increased to 1 mA·cm$^{-2}$, the areal capacity can be stabilized at above 2.9 mAh·cm$^{-2}$ over 100 cycles with extremely high capacity retention of 93.1%, indicating that the Li$_x$Mo$_6$S$_8$ interlayer is an effective approach for Li—S batteries to improve cycling stability at an industrial-level sulfur loading.

Improved Volumetric Energy Density Using Li$_x$Mo$_6$S$_8$

Although Li—S batteries are known for very promising gravimetric energy density ($E_g$), their volumetric energy density ($E_v$) is not competitive with LIBs, owing to the high electrode porosity of most sulfur cathodes, which can hinder their potential applications. Calendering (i.e. pressurized rolling) may be applied to LIB cathodes to decrease the electrode porosity and increase $E_v$, but this technique is usually not applicable for Li—S cathodes, because a denser sulfur electrode usually leads to poor rate performance and larger polarization.

Figures 4C, 4D:
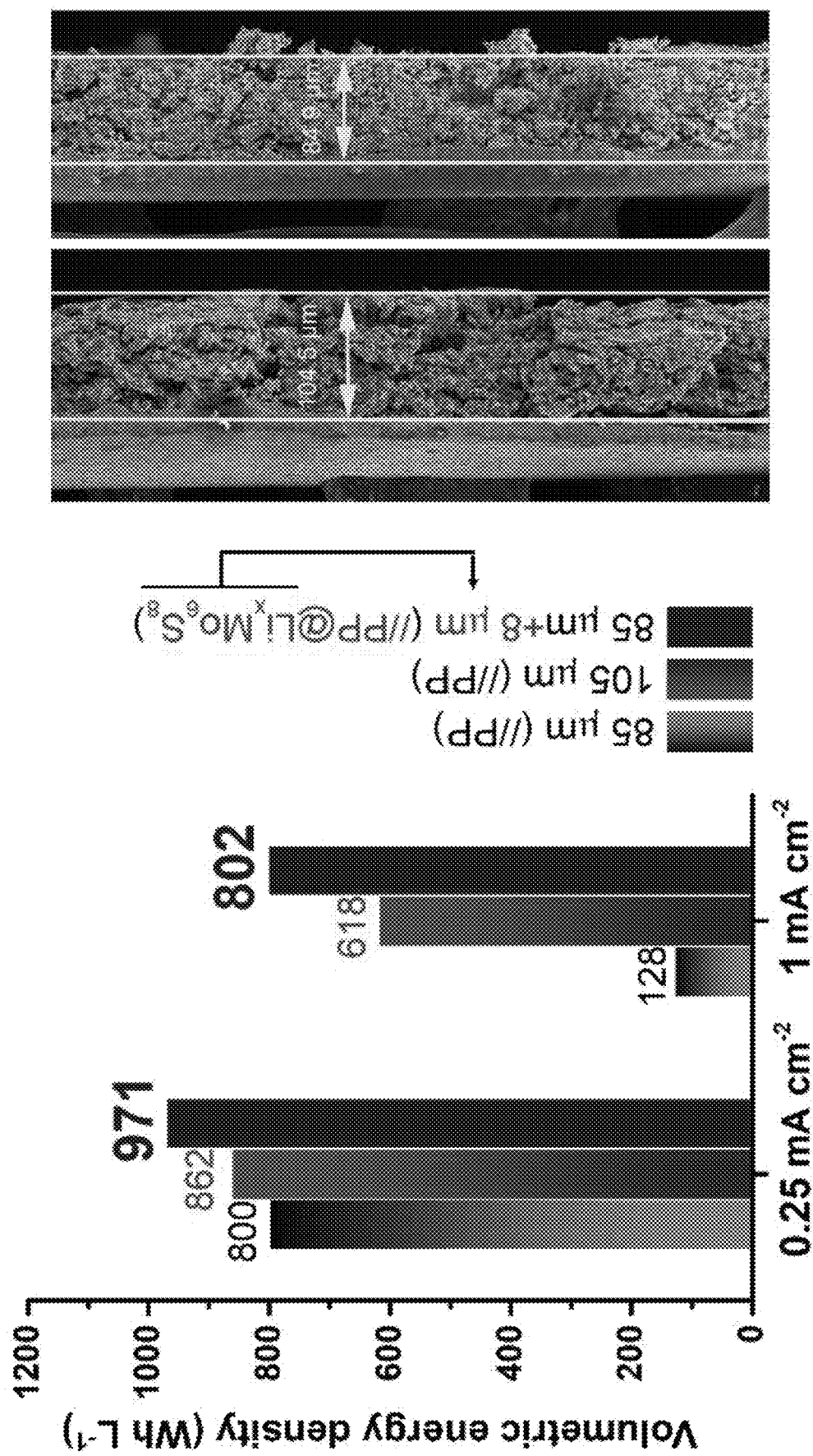
FIGS. 4C-4E show the thicknesses, areal capacities, and volumetric energy densities (E$_V$) of different cathodes paired with the pristine PP separator and the PP@Li$_x$Mo$_6$S$_8$.
Figure 4E:
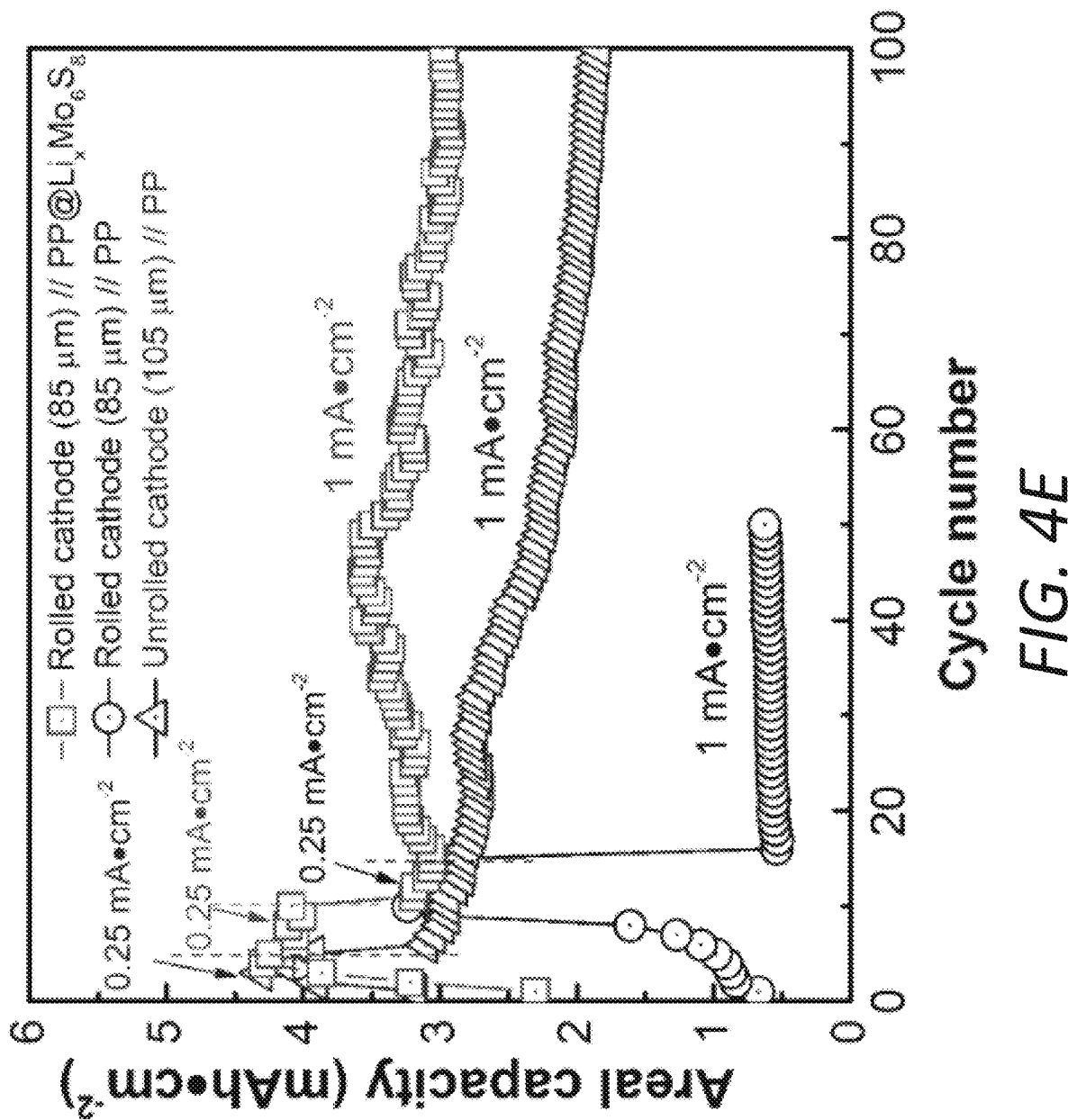

In the approach described herein, after rolling, the thickness of our high-loading C/S electrode decreased significantly from 105 μm to 85 μm (FIG. 4D). Therefore, compared with traditional Li—S batteries constructed with the unrolled 105 μm cathode and the PP separator, the increase in thickness resulting from the introduction of Mo$_6$S$_8$ interlayer 140 (8 μm) can be easily offset by the decrease in electrode thickness (20 μm). With just the PP separator 130, the 85 μm thick denser electrode shows very poor rate capability (areal capacity <1 mAh·cm$^{-2}$ at 1 mA·cm$^{-2}$, FIG. 4E). In contrast, the 85 μm denser electrode paired with PP@Li$_x$Mo$_6$S$_8$ exhibits very high capacity, >3 mAh·cm$^{-2}$ at 1 mA·cm$^{-2}$, suggesting that the Li$_x$Mo$_6$S$_8$ interlayer 140 is very good at improving the rate capability and facilitating the redox kinetics of the denser S cathode 110.

As shown in FIG. 4C, the Ev was calculated for 85 μm cathode//PP, 105 μm cathode//PP and 85 μm cathode//PP@Li$_x$Mo$_6$S$_8$. For the 85 μm electrode, $E_v$ with PP@Li$_x$Mo$_6$S$_8$ is ~1.21× and ~5× that with PP at 0.25 and 1 mA·cm$^{-2}$, respectively. Furthermore, $E_v$ for the 85 μm cathode//PP@Li$_x$Mo$_6$S$_8$ is ~13% and ~30% higher than for the 105 μm cathode//PP at 0.25 and 1 mA·cm$^{-2}$, respectively. Cycling performance is also greatly improved by employing PP@Li$_x$Mo$_6$S$_8$.

The Mechanism for the Improved Performance

Figure 5:
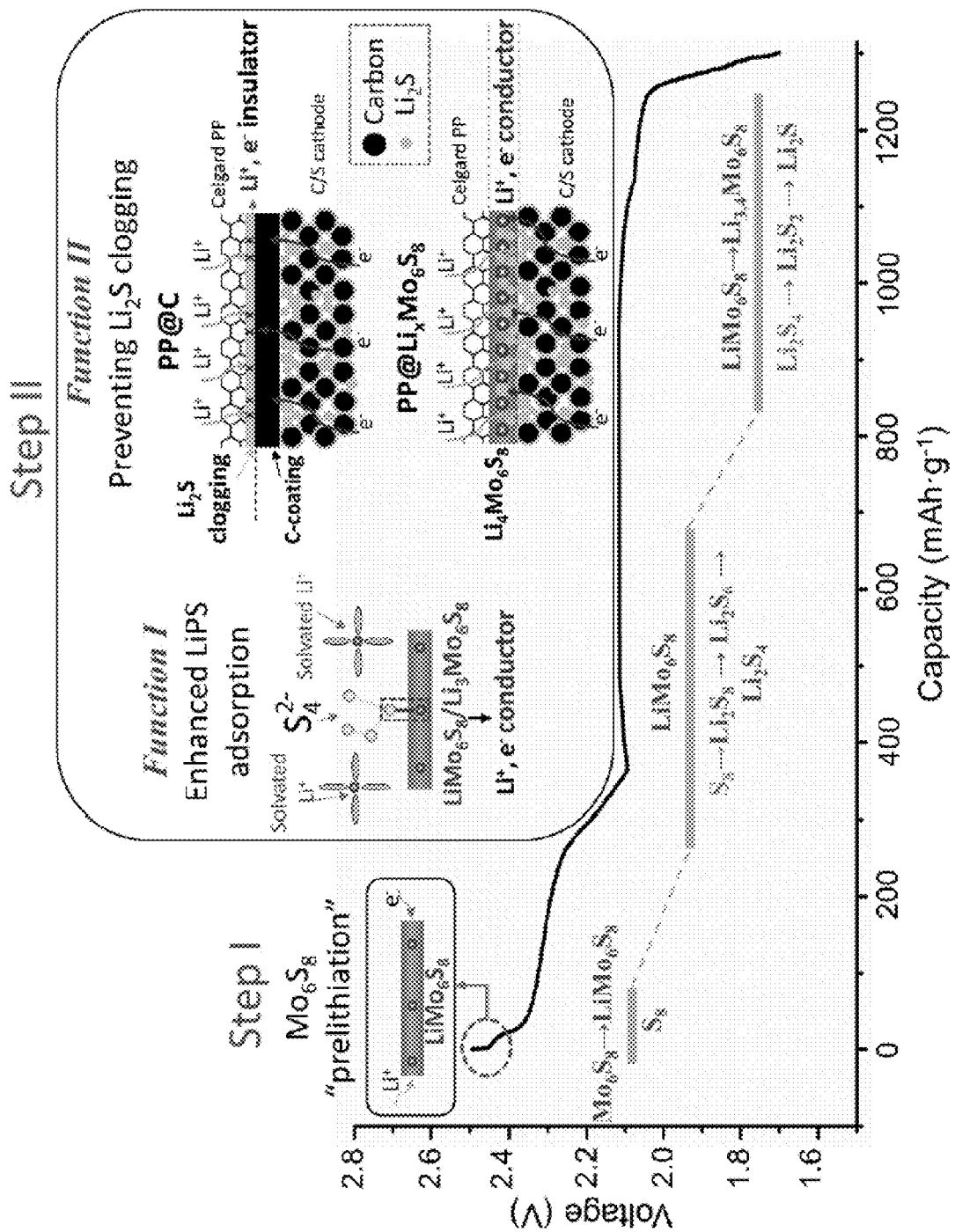
FIG. 5 illustrates the mechanism for the improved cycling stability and high rate capability of the Li—S cell by employing the PP@Li$_x$Mo$_6$S$_8$.

The mechanism of the electrochemically-active Li$_x$Mo$_6$S$_8$ interlayer 140 to significantly increase the cycling stability and rate capability of Li—S battery 100 is described by a "two-step" mechanism (FIG. 5). "Step I" is the pre-lithiation step (>2.4 V). During this step, Mo$_6$S$_8$ is transformed to Li$_x$Mo$_6$S$_8$ (x=1) prior to the reduction of sulfur. Subsequently, the lithiated Mo$_6$S$_8$ exhibits two unique functions in "Step II"—the post-lithiation step.

Function I: the enhanced LiPS adsorption: long-chain LiPS forms in the presence of LiMo$_6$S$_8$. Consequently, the shuttle effect stemming from the soluble LiPS can be greatly suppressed by the enhanced interaction between LiPS and LiMo$_6$S$_8$ giving rise to the superior long-term cycling stability. To address the fundamental mechanism of such enhanced affinity for LiPS, first-principles simulations were performed. Most of the previous modeling studies constructed oversimplified molecule-on-slab adsorption configurations. Without taking the LiPS dissolution in electrolyte into account, it would probably result in overestimating the binding energies. In fact, solvation plays a very important role of triggering the ionization of LiPS into solvated Li$^+$ (electrolyte) cations and S$_n^{2-}$ (electrolyte) anion (FIG. 5). Therefore, the actual structure of LiPS in electrolytes could be LiS$_n^-$/S$_n^{2-}$ and solvated Li$^+$. Herein, Li$_2$S$_4$ is employed as the representative LiPS.

Figure 7A:
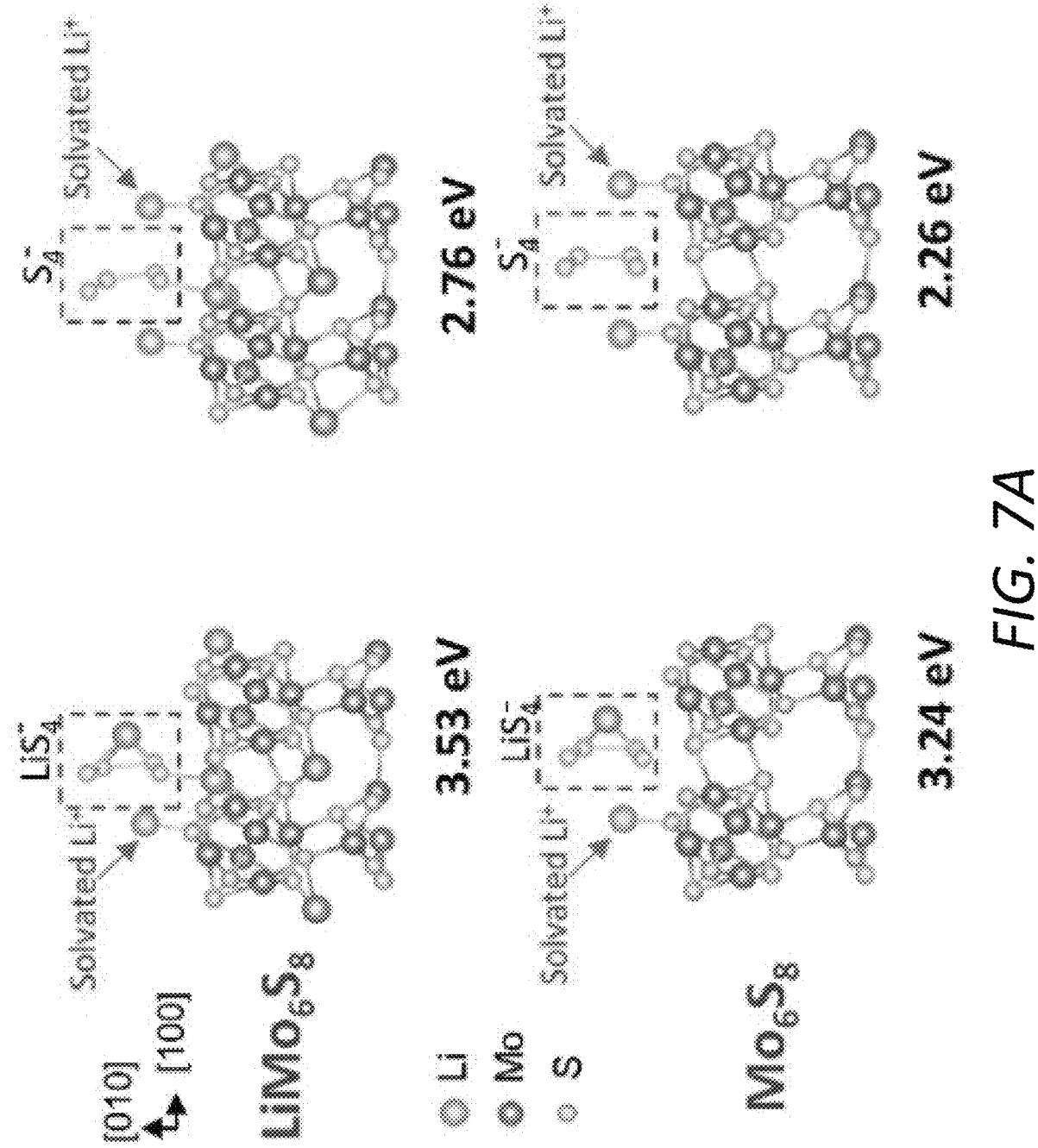
FIG. 7A shows the relaxed structure of LiS$_4^-$ and S$_4^{2-}$ after the step-wise ionization absorbed upon Mo$_6$S$_8$ (100) and LiMo$_6$S$_8$ (100).
Figure 7B:
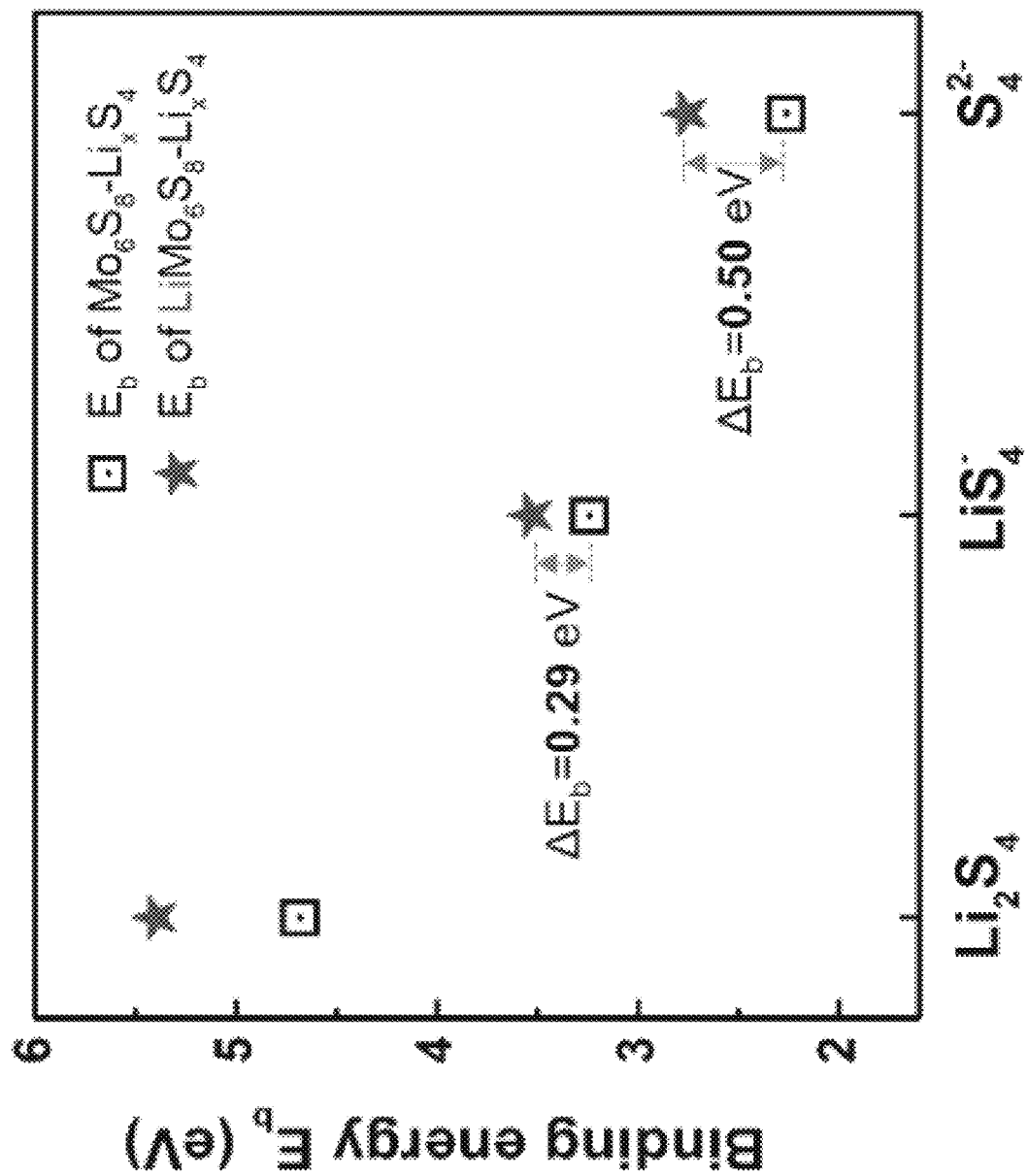
FIG. 7B shows the comparison of different binding energies between LiPS and Mo$_6$S$_8$/LiMo$_6$S$_8$ before and after the step-wise ionization.

FIG. 7A illustrates the adsorption configurations for LiS$_4^-$ and S$_4^{2-}$ on Mo$_6$S$_8$ and LiMo$_6$S$_8$ surfaces, respectively. The adsorptive interaction is dominated by the bond formed between Li and S. Therefore, during the step-wise ionization of $Li_2S_4$ its binding strength with the substrate tends to drop with fewer Li atoms in $Li_2S_4$. However, compared to pristine $Mo_6S_8$, the $LiMo_6S_8$ with additional $Li_{(LiMo_6S_8)}$—$S_{(LiS_4^-/S_4^{2-})}$ bond demonstrates a better anchoring capability, which is reflected not only by the higher binding energy but also the smaller decrement in binding energy during the step-wise ionization (FIG. 7B). In the ether-based electrolyte DOL-DME, the interaction between Li cation and polysulfide anion weakens with the increase of polysulfide chain length and consequently obvious decrement in the anchoring capability of the substrates, especially for those mainly via polar-polar Li—S interaction. From simulation results, the prelithiated substrate has the advantage of stronger LiPS adsorption capability over the unlithiated one in the real LiPS-electrolyte system via additional Li—S binding.

Figure 6A:
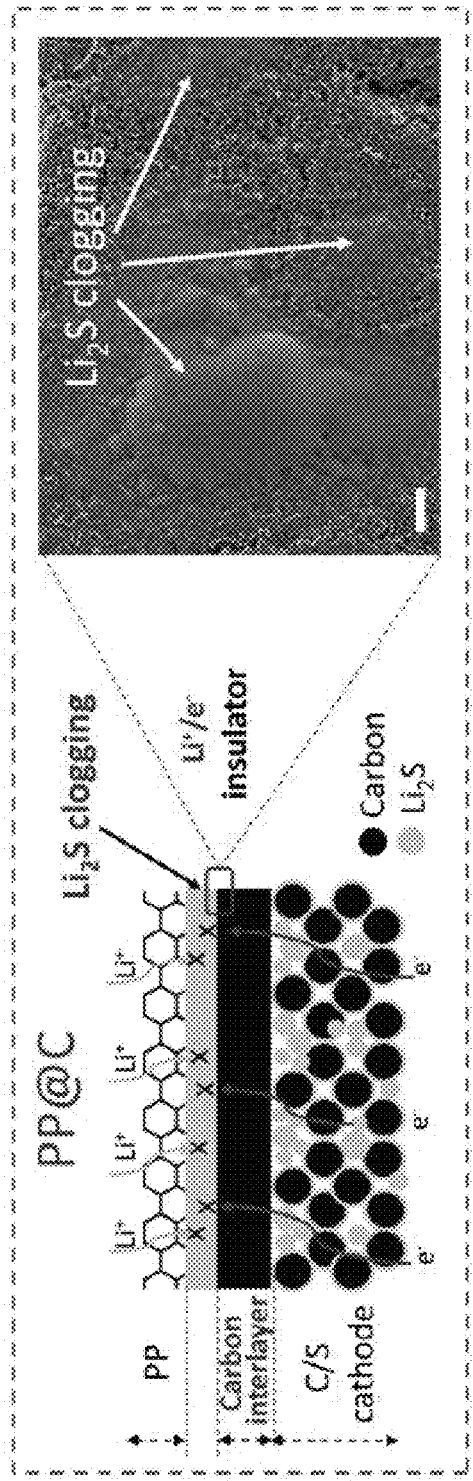
FIGS. 6A and 6B show the interlayers and their respective SEM images.
Figure 6B:
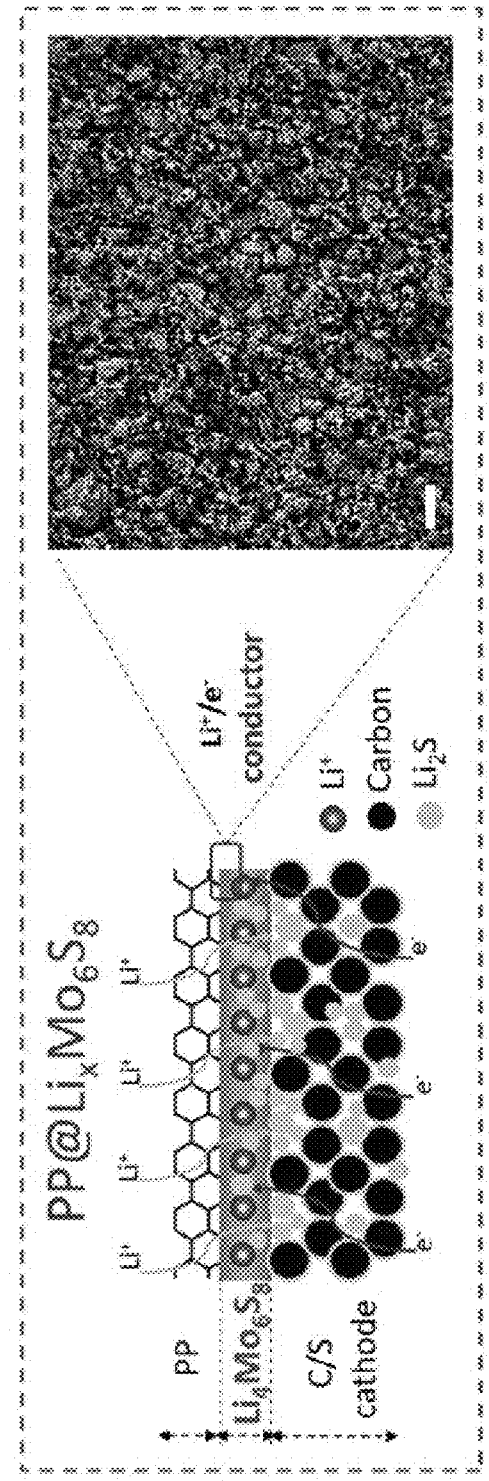
Figure 18A:
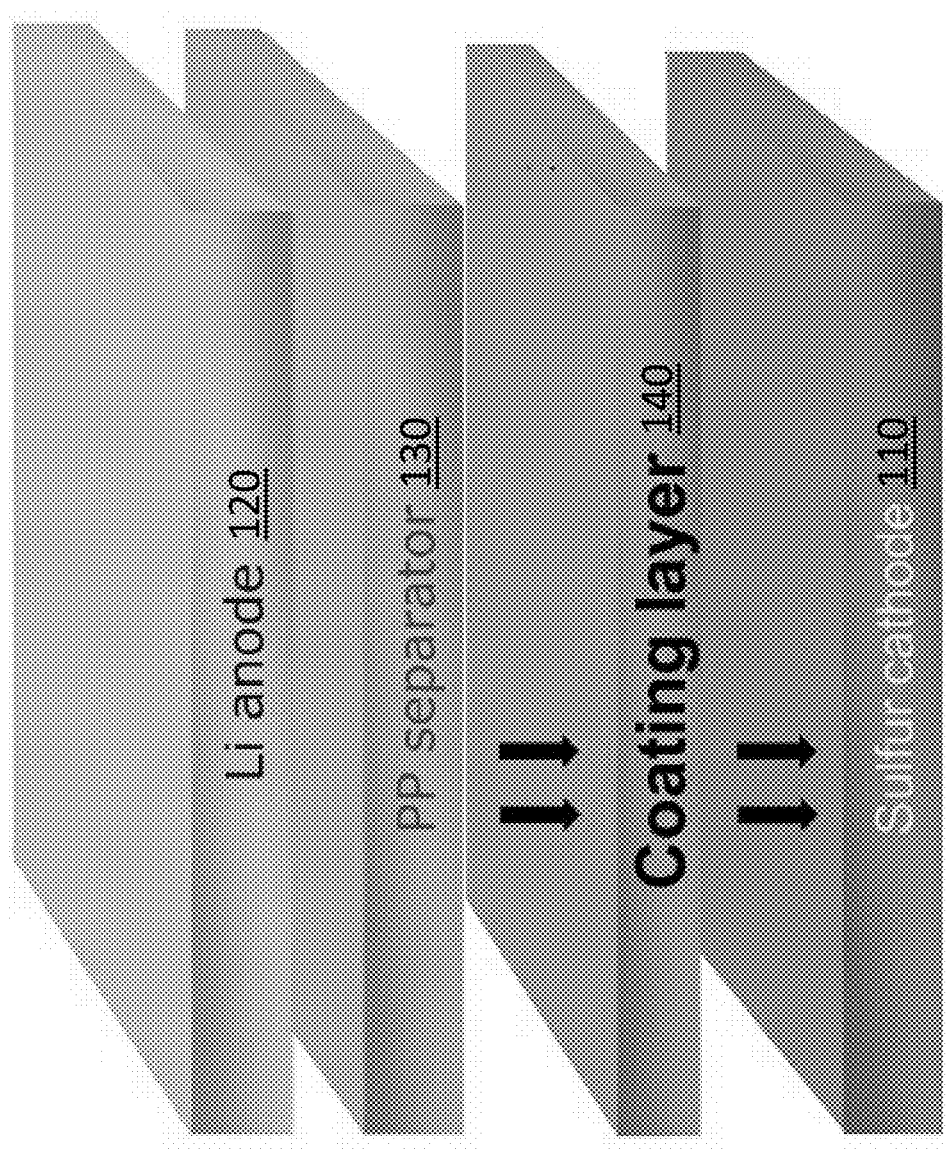
FIG. 18A shows a schematic diagram of the different locations of the surfaces for SEM observations.
Figures 18B, 18C:
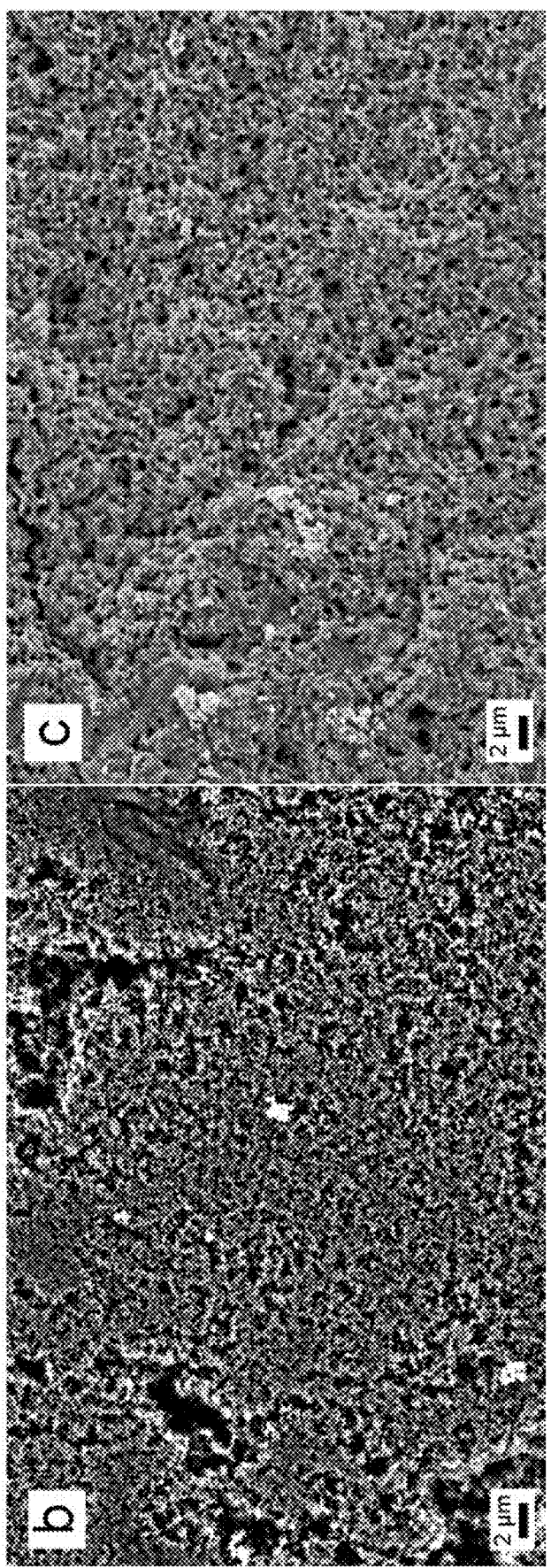
FIGS. 18B and 18C are SEM figures of the cathode surfaces of batteries using the PP@C and PP@Li$_x$Mo$_6$S$_8$, respectively.
Figures 19A, 19B:
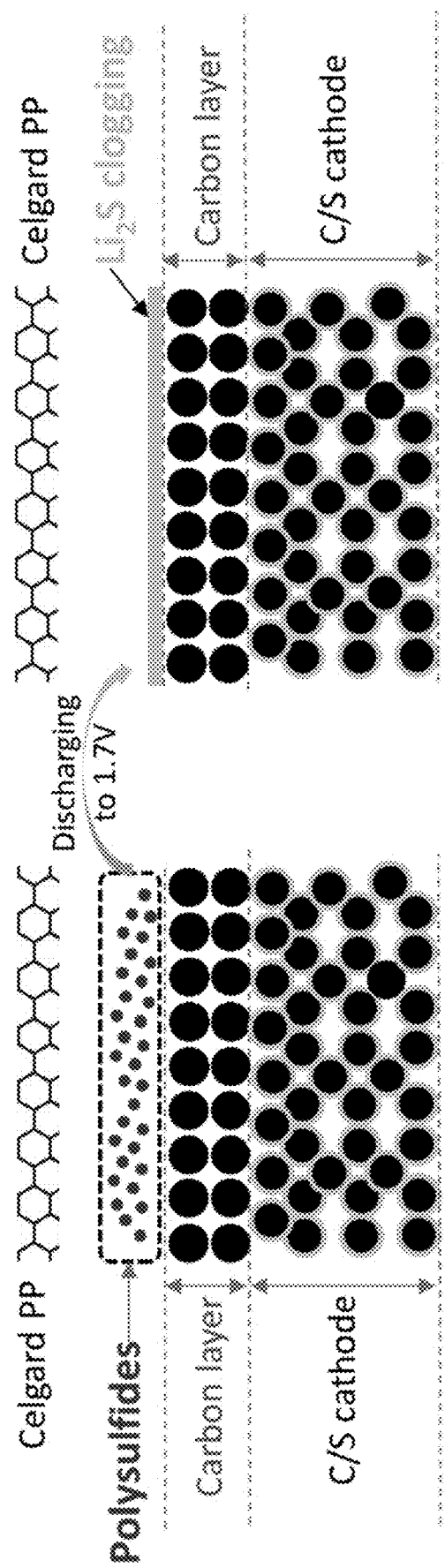
FIGS. 19A and 19B show schematic diagram of the location of Li$_2$S clogging layer for the battery using the PP@C. In battery constructed with carbon/sulfur (C/S) cathode and PP@C, the cathode surface actually directly contacts with the carbon interlayer which can be regarded as a part of cathode. Upon discharging, the $Li_2S$ on the interface between the cathode surface and carbon interlayer cannot totally cut off all electron pathways in between. So this is not $Li_2S$ clogging. However, due to the weak interaction between the carbon and the LiPS, the LiPS can diffuse out of the carbon layer (FIG. 19A), which can form $Li_2S$ clogging on the interface between the carbon interlayer and the separator upon discharging (FIG. 19B). This insulating $Li_2S$ layer, with no conductive agents in between, blocks electron and Li pathways and tie up active Sulfur, which is detrimental to the rate performance and capacity.

Function II: preventing $Li_2S$ clogging: the greatly improved redox reaction kinetics could be attributed to another unique benefit of the PP@$Li_xMo_6S_8$-preventing $Li_2S$ clogging. Formation of $Li_2S$ clogging layer without conductive agents dispersed inside upon discharging is considered a critical reason leading to poor rate capability of Li—S batteries, a negative side effect of GSM. Although such "dead layer" at the cathode surface could be avoided via the carbon interlayer (FIG. 18A-18C), its formation cannot be avoided on the carbon interlayer/separator interface (FIGS. 6A and 19), leading to active material loss and poor rate performance. However, the $Li_xMo_6S_8$ interlayer successfully prevents the $Li_2S$ clogging both at the cathode surface (FIG. 18C) and the $Li_xMo_6S_8$/separator interface (FIG. 6B). Compared with the carbon interlayer, which only provides good electronic conductivity, the electrochemically-active $Mo_6S_8$ interlayer has not only high electronic conductivity but also intrinsically fast Li diffusion, which is able to offer a rigid, unperturbed Li and $e^-$ transporting network to "reactivate" the $Li_2S$ inside the $Li_4Mo_6S_8$ layer upon increasing voltage. Thus, a smothering $Li_2S$ clogging layer never gets to form, and the $Li_2S$ products of reduction always maintain the right porosity and access to electrocatalytic surface and free electrons and ions, minimizing irreversible capacity loss of the system.

Methods of Fabricating and Characterizing Interlayer Including $Mo_6S_8$

Preparation of $Mo_6S_8$: Chevrel phase Mo6S8 was fabricated by solid-state synthesis method. First, CuS (99% Sigma-Aldrich), Mo (99.99% Sigma-Aldrich), and $MoS_2$ (99% Sigma-Aldrich) were ground for 0.5 h, and then the mixtures were pressed into a pellet by a 14 mm-diameter mold and sealed in Swagelok stainless steel tube, which was gradually heated to 900° C. for 24 h at 2° C.·$min^{-1}$ in argon. Subsequently, the as-received $Cu_2Mo_6S_8$ precursors were added into a 6 M HCl solution for 12 h with oxygen bubbling to leach out Cu. After the reaction, the obtained Mo6S8 powder was centrifuged and washed with deionized water three times followed by drying at 60° C. overnight under vacuum.

Preparation of PP@$Mo_6S_8$: a slurry coating method using a doctor blade was employed to modify the PP separator. Typically, the slurry was prepared by mixing 80 wt % $Mo_6S_8$ powder, 10 wt % conductive carbon (Timcal Super C65 conductive carbon black) and 10 wt % polyvinylidene fluoride (PVDF) with N-methylpyrrolidinone (NMP, Sigma-Aldrich) for 12 hr. The slurry for PP@C as a control sample was prepared by mixing 80 wt % Super C65 and 20 wt % of PVDF with NMP for 12 hr. Subsequently, the homogeneous slurry was cast onto one side of a Celgard PP separator (25 µm thick) with a doctor blade followed by calendering/rolling. The coated separator was dried in an oven under vacuum for overnight at 60° C. Finally, the dried PP@$Mo_6S_8$ was punched into a disk with a diameter of 16 mm. The mass loading on the PP@$Mo_6S_8$ is ~0.4 mg·$cm^{-2}$ with a thickness of ~8 µm.

Preparation of sulfur electrodes: the mixture of conductive carbon (Super C65) and commercial sulfur powder with a weight ratio of 4:6 was sealed in a hydrothermal reactor under Ar protection and heated at 155° C. for 12 hr. After cooling down to room temperature, C/S composite was obtained. The slurry was fabricated by mixing 90 wt % of C/S composite and 10 wt % of PVDF with NMP for 24 hr. According to thermogravimetric analysis (TGA) measurements, the sulfur content of the C/S composite was approximately 60 wt % (FIG. 21), accounting for approximately 54 wt % of the electrode mixture. The sulfur mass loading is about 1.2~1.4 mg·$cm^{-2}$. For the preparation of electrodes with high sulfur loading >4 mg·$cm^{-2}$, C/S composite with styrene butadiene rubber (SBR) aqueous binder, and carboxymethyl cellulose (CMC) binder were dispersed in deionized water in a weight ratio of 9:0.5:0.5. The obtained slurry was dried at 60° C. in a vacuum oven for 12 h and then doctor-blade coated onto a carbon-coated aluminum foil. Finally, all the electrodes were rolled and cut into round disks.

LiPS adsorption study: $Mo_6S_8$ powders were pressed into 14 mm-diameter pellets. 2032 type coin cells were then assembled using $Mo_6S_8$ pellets as cathodes, Celgard separators and metal Li as anodes in the Ar-filled glove box. The electrolyte was 1 M lithium bis (trifluoromethanesulfonyl) imide (LiTFSI) in a 1, 3-dioxolane (DOL) and dimethoxyethane (DME) mixture (1:1, v/v) with 2 wt % $LiNO_3$. The cells were galvanostatically discharged to 2.3 V and 1.9 V at a current density of 0.2 mA $cm^{-2}$ using a Landt CT 2001A battery cycler to obtain electrochemical lithiated $Li_1Mo_6S_8$ and $Li_3Mo_6S_8$, respectively. Finally, the $Li_1Mo_6S_8$ and $Li_3Mo_6S_8$ products were collected by washing and drying the cathode materials after disassembling the coin cells in the glove box.

$Li_2S_4$ solutions were synthesized by reacting lithium sulfide ($Li_2S$) and elemental sulfur in the desired ratio in anhydrous dimethoxyethane (DME) solvent in an Ar-filled glovebox. For the LiPS adsorption study, $Mo_6S_8$, $Li_1Mo_6S_8$, $Li_3Mo_6S_8$ were added into glass vials. Subsequently, $Li_2S_4$ solutions were added. Two blank vials were also filled with the same blank $Li_2S_4$ solution and the $Li_2S_4$-Super C65 mixture as control samples, respectively. The adsorption ability of $Mo_6S_8$, $Li_1Mo_6S_8$, $Li_3Mo_6S_8$ and carbon on LiPS was qualitatively determined using a UV-Vis spectrometer (Perkin Elmer Lambda 1050 Spectrophotometer).

Characterization: The morphologies and microstructures were characterized by scanning electron microscope (Zeiss Merlin High-resolution SEM) with EDX and Transmission Electron Microscopy (TEM, JOEL 2010F). The sulfur content in the C/S composite was determined by Thermogravimetric analyses (TG-DSC, SDT Q600) under Nitrogen protection. Phase composition was characterized by X-ray diffraction (XRD, Panalytical_XPert). The PP@$Mo_6S_8$ after cycling (at charged state) was washed with black electrolytes for 3 times for XRD test. In-situ XRD was performed using a Rigaku Smartlab XRD system coupled with a specialized battery cell to monitor the phase evolution of the $Mo_6S_8$ interlayer and the cathode during the first discharge and charge. The electrical conductivities were measured by a standard four-point-probe resistivity measurement system.

Electrochemical measurements: CR2032 type coin cells were assembled using PP@Mo$_6$S$_8$ and metal Li as an anode in the Ar-filled glove box. The electrolyte was 1 M lithium bis (trifluoromethanesulfonyl) imide (LiTFSI) in a 1, 3-dioxolane (DOL) and DME mixture (1:1, v/v) with 2 wt % LiNO$_3$. The cycling performances of the cells were measured by galvanostatic charge and discharge within the voltage window of 1.7 V-2.8 V versus Li/Li$^+$ at various C rates (1 C is defined as 1.672 mA·mg$^{-1}$) using a Landt CT 2001A battery cycler and Arbin Instruments. Cyclic voltammetry (CV) and electrochemical impedance spectroscopy (EIS) measurements were performed using an electrochemical workstation (Gamry Instruments, Reference 3000).

Table. 1 below shows comparison of battery performances described herein with previous work.

TABLE I

| | Coated materials/ separator | Weight (mg · cm$^{-2}$) | Thickness (μm) | Capacity contribution | LiPS adsorption | Li$_2$S clogging prevention |
|---|---|---|---|---|---|---|
| Batteries Employing Mo$_6$S$_8$ coating | Mo$_6$S$_8$ | 0.4 | ~8 | Yes | Enhanced LiPS adsorption during electrochemical process | Yes |
| Nat Energy 16094, 2016 | MOFs@GO | 0.3 | ~10 | No | Immutable LiPS adsorption | Not reported |
| EES, 7, 3381-3390, 2014 | Super P | 0.5 | 1 | No | Immutable LiPS adsorption | Not reported |
| AM, 27, 641-647, 2015 | Graphene | 1.3 | 30 | No | Immutable LiPS adsorption | Not reported |
| ACS Nano, 9, 3002, 2015 | GO | 0.12 | ~6 | No | Immutable LiPS adsorption | Not reported |
| AFM, 24, 5299, 2014 | Carbon | 0.2 | 20 | No | Immutable LiPS adsorption | Not reported |
| JMCA, 3, 15683, 2015 | Nafion membrane | 0.7 | — | No | Immutable LiPS adsorption | Not reported |
| AFM, 25, 5285, 2015 | Meso-C | 0.5 | 15-65 | No | Immutable LiPS adsorption | Not reported |
| AM, 26, 7352, 2014 | PEG@Micro-C | 0.15 | 8 | No | Immutable LiPS adsorption | Not reported |
| AM, 28, 9797, 2016 | Black-P | 0.4 | 0.7-1.4 | No | Immutable LiPS adsorption | Not reported |
| AM, 29, 1606817, 2017 | MoS$_2$ | — | ~0.4 | No | Immutable LiPS adsorption | Not reported |

Table 2 below shows Li diffusion coefficients of the PP@Li$_x$Mo$_6$S$_8$ and PP@C.

TABLE 2

| | D(α) (cm$^2$ · s$^{-1}$) | D(β) (cm$^2$ · s$^{-1}$) | D(γ) (cm$^2$ · s$^{-1}$) |
|---|---|---|---|
| PP@Li$_x$Mo$_6$S$_8$ | 1.68 × 10$^{-8}$ | 1.03 × 10$^{-8}$ | 1.09 × 10$^{-8}$ |
| PP@C | 1.03 × 10$^{-8}$ | 2.49 × 10$^{-9}$ | 5.15 × 10$^{-9}$ |

Table 3 below shows the summary of fitting parameters for various EIS plots of batteries using the PP@Li$_x$Mo$_6$S$_8$ and PP@C.

TABLE 3

| | | PP@Li$_x$Mo$_6$S$_8$ | PP@C |
|---|---|---|---|
| Before cycling | R$_s$ (Ω) | 2.09 | 10.0 |
| | R$_{ct}$ (Ω) | 168 | 160 |

TABLE 3-continued

| | | PP@Li$_x$Mo$_6$S$_8$ | PP@C |
|---|---|---|---|
| | R$_{int}$ (Ω) | 38.6 | 175 |
| 1$^{st}$ discharged state | R$_s$ (Ω) | 2.39 | 12.2 |
| | R$_{ct}$ (Ω) | 34.9 | 35.4 |
| | R$_{int}$ (Ω) | 13.7 | 34.3 |
| | R$_{sl}$ (Ω) | 97.9 | 1,106 |

First-Principles Calculations

Perdew-Burke-Ernzerhof exchange-correlational functional and the projector augmented wave method were used in the DFT simulations implemented by the Vienna Ab initio Simulation Package. The DFT-TS method was used to take into account the van der Waals interactions in any adsorption processes. A plane wave basis set with an energy cutoff of 500 eV was adopted to expand the electronic wavefunctions. The Brillouin zone integration was conducted on a 5×5×1 Monkhorst-Pack k-point mesh. Atomic coordinates in all structures were relaxed until the maximum residual force was below 0.02 eV·Å$^{-1}$.

Figures 13A, 13B:
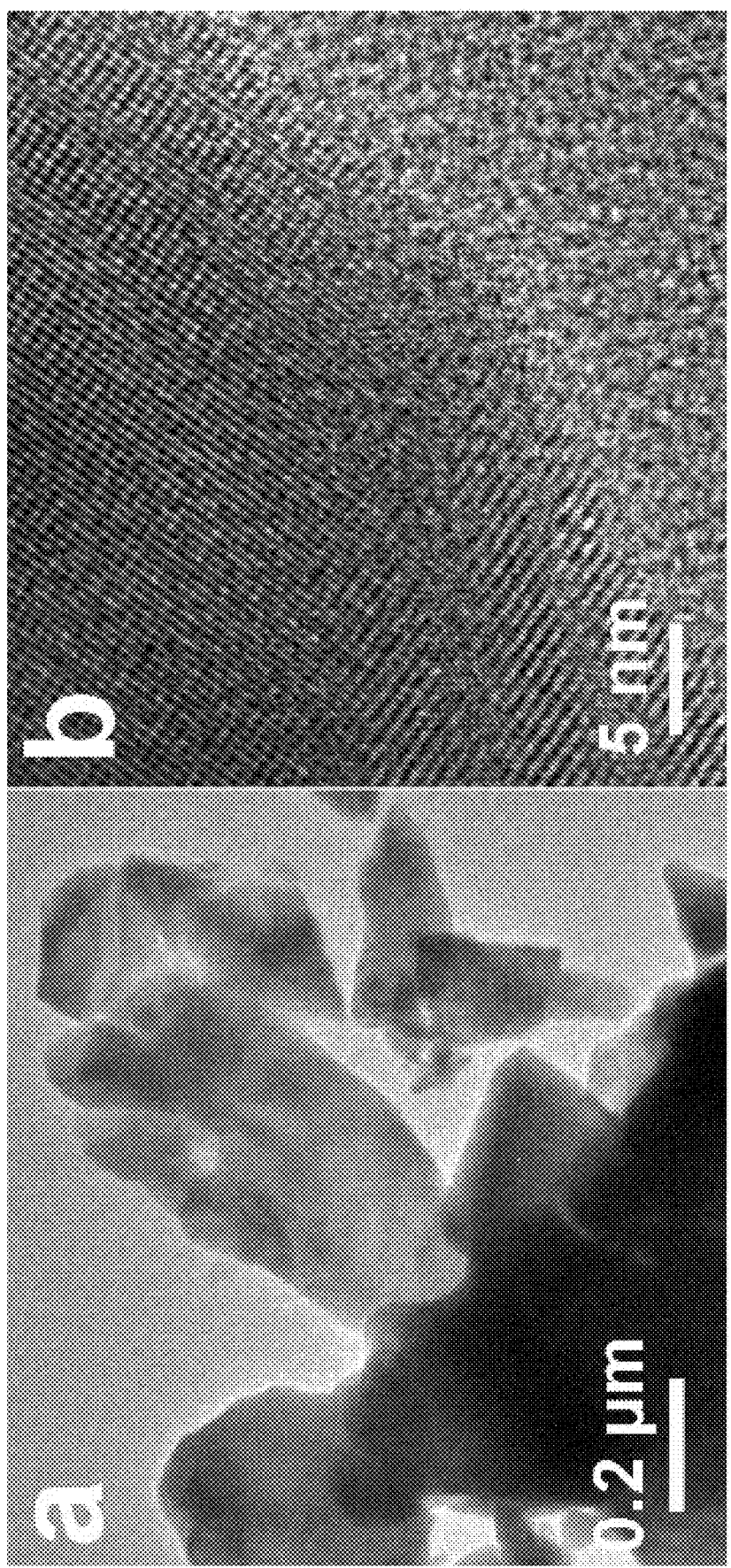
FIGS. 13A and 13B show TEM and HRTEM micrographs, respectively, of the Mo$_6$S$_8$ particles from the PP@Li$_x$Mo$_6$S$_8$ after cycling for 300 cycles at fully charged state.
Figures 23A, 23B:
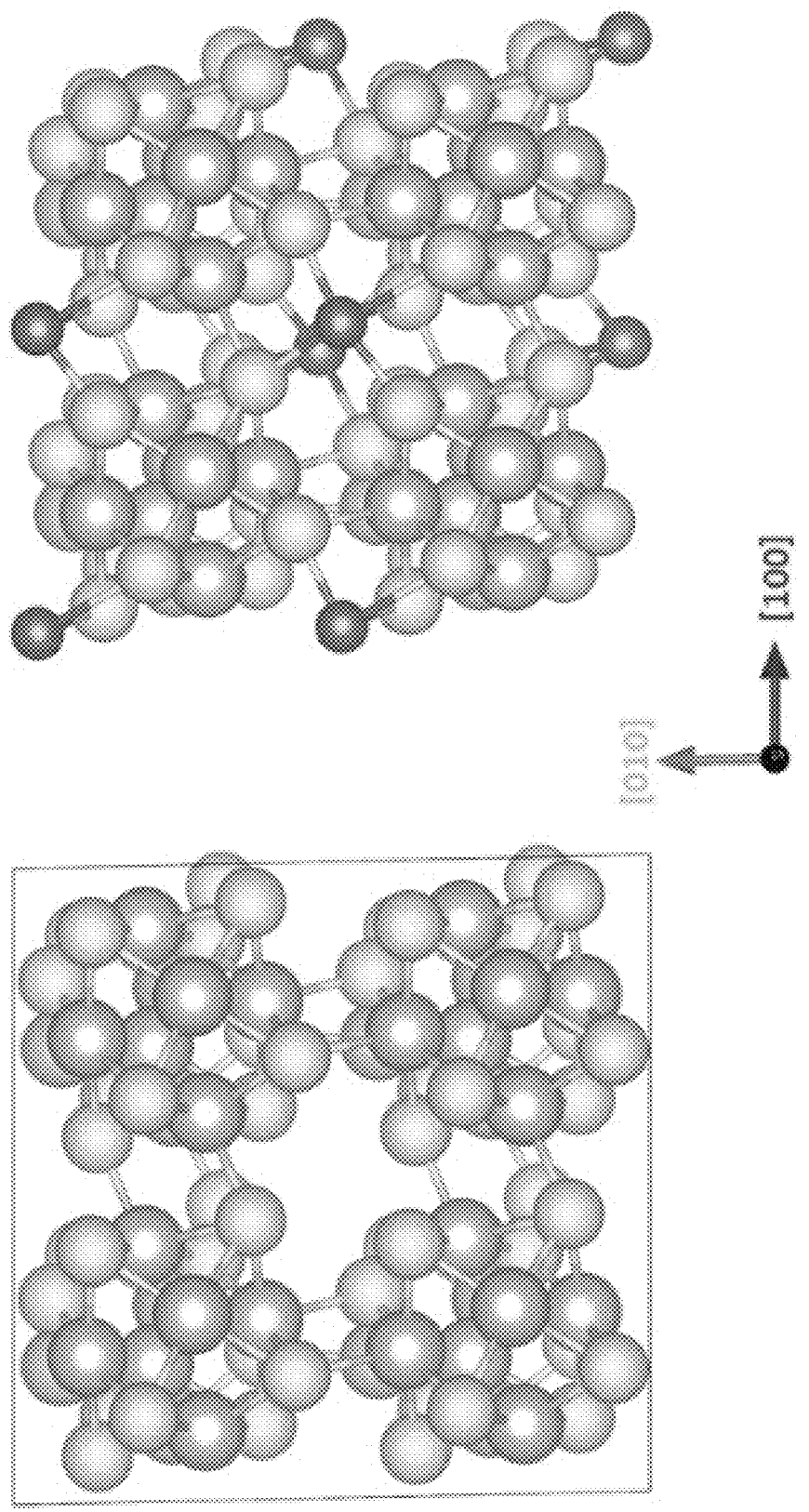
FIGS. 23A and 23B show optimized geometry of the configuration of pristine $Mo_6S_8$ and Li-intercalated $Mo_6S_8$ (Li$Mo_6S_8$), respectively.
Figure 24B:
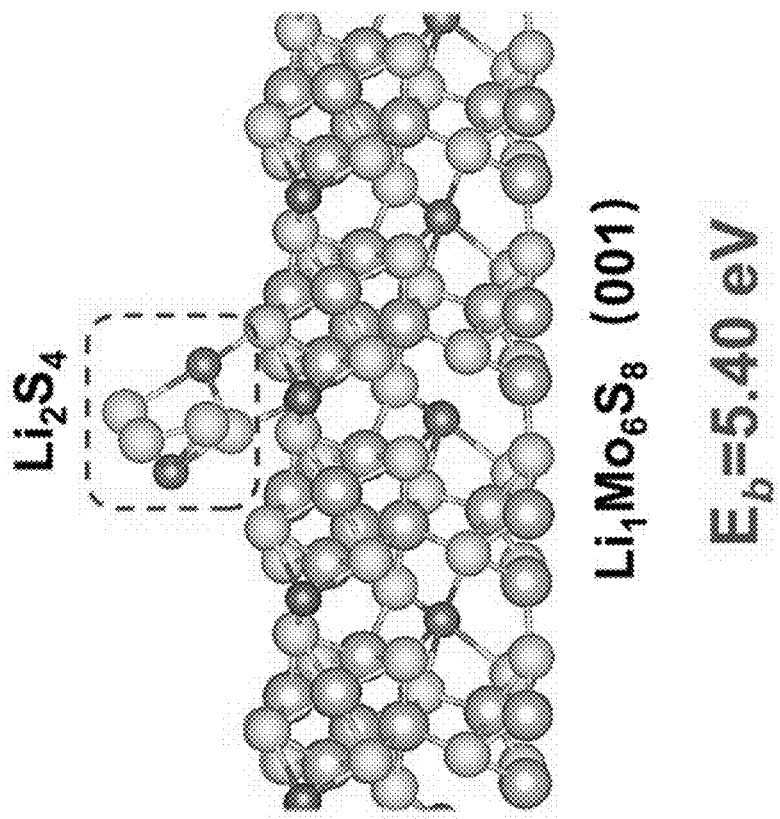
FIGS. 24A and 24B show relaxed structures of $Li_2S_4$ (without ionization) absorbed upon (100) $Mo_6S_8$ and Li$Mo_6S_8$, respectively.
Figure 24A:
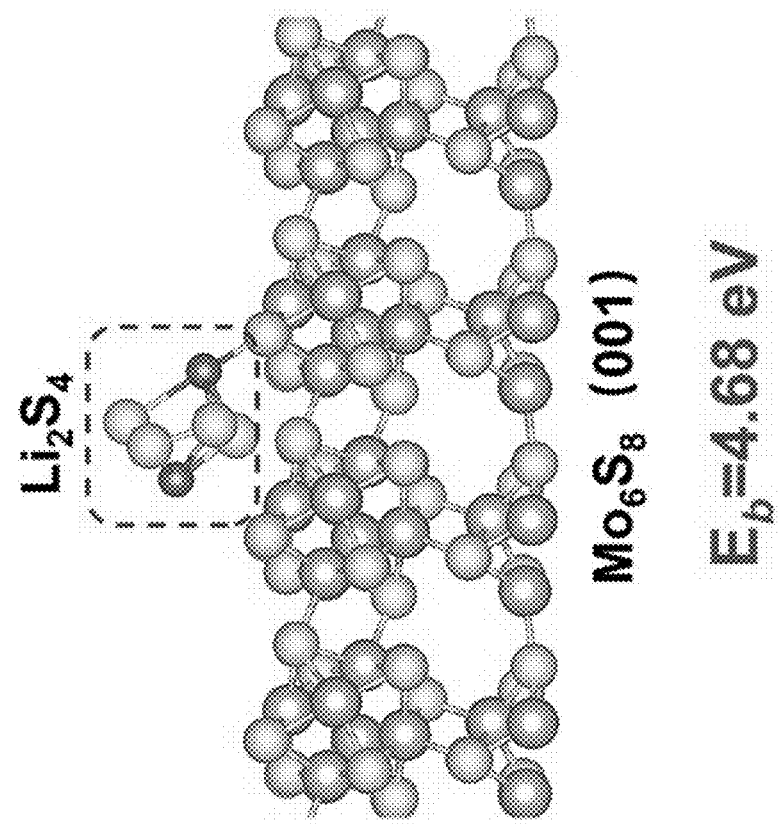

The Mo$_6$S$_8$ (001) surface has the lowest energy (24 meV·Å$^{-2}$) and has been determined as the most stable surface among other low Miller index planes. A slab of 1.5 Mo$_6$S$_8$ atomic layers (the bottom 0.5 layer frozen during optimization) was constructed to model the Mo$_6$S$_8$ (001) surface and a vacuum spacing larger than 10 Å was put on top of the slab to avoid interactions. The optimized bulk unit cell has a lattice constant of 6.50 Å that matches the experimental value very well. The optimized geometry of the configuration of the pristine Mo$_6$S$_8$ and the Li-intercalated Mo$_6$S$_8$ (LiMo$_6$S$_8$) is shown in FIGS. 23A and 23B. As shown in FIG. 3E and FIG. 13B, to simulate the Li$_1$Mo$_6$S$_8$ in the experiment, Li atoms are intercalated into the spacious sites surrounded by four $Mo_6S_8$ clusters, which is in agreement with typical metallic ion intercalation in Chevrel phase $Mo_6S_8$ determined by both experiment and computation.

The binding energy ($E_b$) is defined as the difference between the total energy of the $Li_2S_4$-adsorbed system ($E_{total}$), and the energy sum of isolated $Li_2S_4$ and a clean $Mo_6S_8$ surface (with or without Li intercalation), $$E_b = E_{Li_2S_4} + E_{surface} - E_{total} \quad (4)$$

A larger value indicates greater adsorbing ability.

Calculation of Lithium Ion Conductivity

The lithium ion conductivity was evaluated by electrochemical impedance spectroscopy (EIS) using an electrochemical workstation (Gamry Instruments, Reference 3000). PP@$Mo_6S_8$ separators at different discharged states were fabricated using Li metal as anode by electrochemical lithitation to 2.3 V (PP@$Li_1Mo_6S_8$), 1.9 V (PP@$Li_3Mo_6S_8$) and 1.7 V (PP@$Li_4Mo_6S_8$) and then washed with blank electrolytes thoroughly. EIS measurements were conducted on cells prepared by inserting the pristine PP separators, PP@C, PP@$Mo_6S_8$, PP@$Li_1Mo_6S_8$, PP@$Li_3Mo_6S_8$ and PP@$Li_4Mo_6S_8$ between two blocking stainless steel electrodes with the electrolyte. Ionic conductivities were calculated according to the following equation, $$\sigma = l/(R_b \cdot A) \quad (5)$$

where σ stands for ionic conductivity, l represents the distance between stainless steel electrode, A is the area of the electrode/electrolyte interface, and $R_b$ refers to the bulk resistance obtained from the intercept at the real axis in the Nyquist plot.

Calculation of the Lithium Ion Diffusion Coefficient

According to the CVs at various scanning rates in FIG. S4, the Li-ion diffusion coefficient ($D_{Li}^+$) could be calculated via the Randles-Sevick equation, $$I_p = 2.69 \times 10^5 n^{3/2} SD^{1/2} v^{1/2} C \quad (6)$$

where n is the number of electrons per reaction; S is the geometric area of the electrode; C is the concentration of Li in the electrolyte; $I_p$ is the current of the specific peak and v is the scanning rate. Therefore, the diffusion coefficients can be calculated using the slope of linear fitting line $I_p$ vs v. The $D_{Li}^+$ values are summarized in Table 2.

Contributions of $Li_xMo_6S_8$ to the Volumetric Energy Density (Ev)

$E_V$ of the cathode can be calculated by, $$E_V = \frac{A \cdot V}{T} \quad (7)$$

$E_V$: volumetric energy density (Wh·L$^{-1}$); A: areal capacity (mAh·cm$^{-2}$); V: average voltage (we assume 2.1 V for S and $Mo_6S_8$); T: The thickness (cm). The Ev of $Li_xMo_6S_8$ interlayer can be calculated, $$\frac{2.1V \times 120 \text{ mAh/g} \times 0.4 \text{ mg/cm}^2}{8 \text{ }\mu m} = 126 \text{ Wh·L}^{-1} \quad (8)$$

The calculated value is about 126 Wh·L$^{-1}$, of the same magnitude as the C/S cathode (see FIG. 4D), is superior to 0 Wh·L$^{-1}$ of a non-active interlayer. For the battery industry, even a 10% contribution is actually respectable, regardless of other improvements in cycling stability and rate performance.

Figure 25:
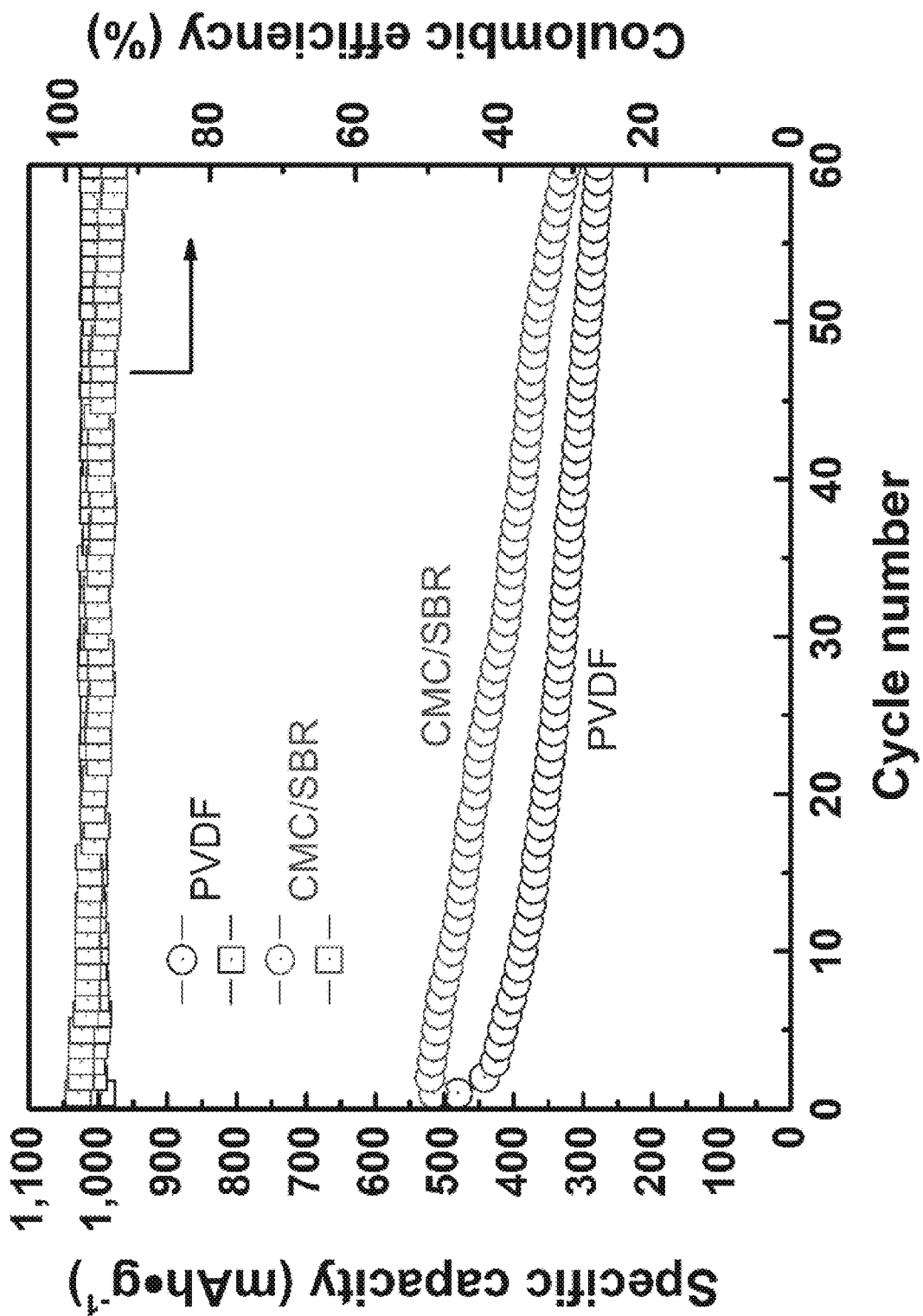
FIG. 25 shows cycling performance of Li—S batteries with PP separators at 1 C rate using CMC/SBR and PVDF as binders.

FIG. 25 shows cycling performance of Li—S batteries with PP separators at 1 C rate using CMC/SBR and PVDF as binders. PVDF is a popular binder for Li-ion batteries and Li—S batteries (usually for low sulfur loading). For electrodes with a high sulfur loading, however, aqueous binders like CMC/SBR can be advantageous. One reason is the lower viscosity of the CMC/SBR aqueous solution than the PVDF/NMP solution at the same weight percentage. The high viscosity of PVDF/NMP can make it difficult to obtain an electrode with a high sulfur loading. So the aqueous binder CMC/SBR is a useful binder system for high-loading Li—S. The cycling performance of batteries using PVDF and CMC/SBR as binders are compared in FIG. 25.

Figure 26:
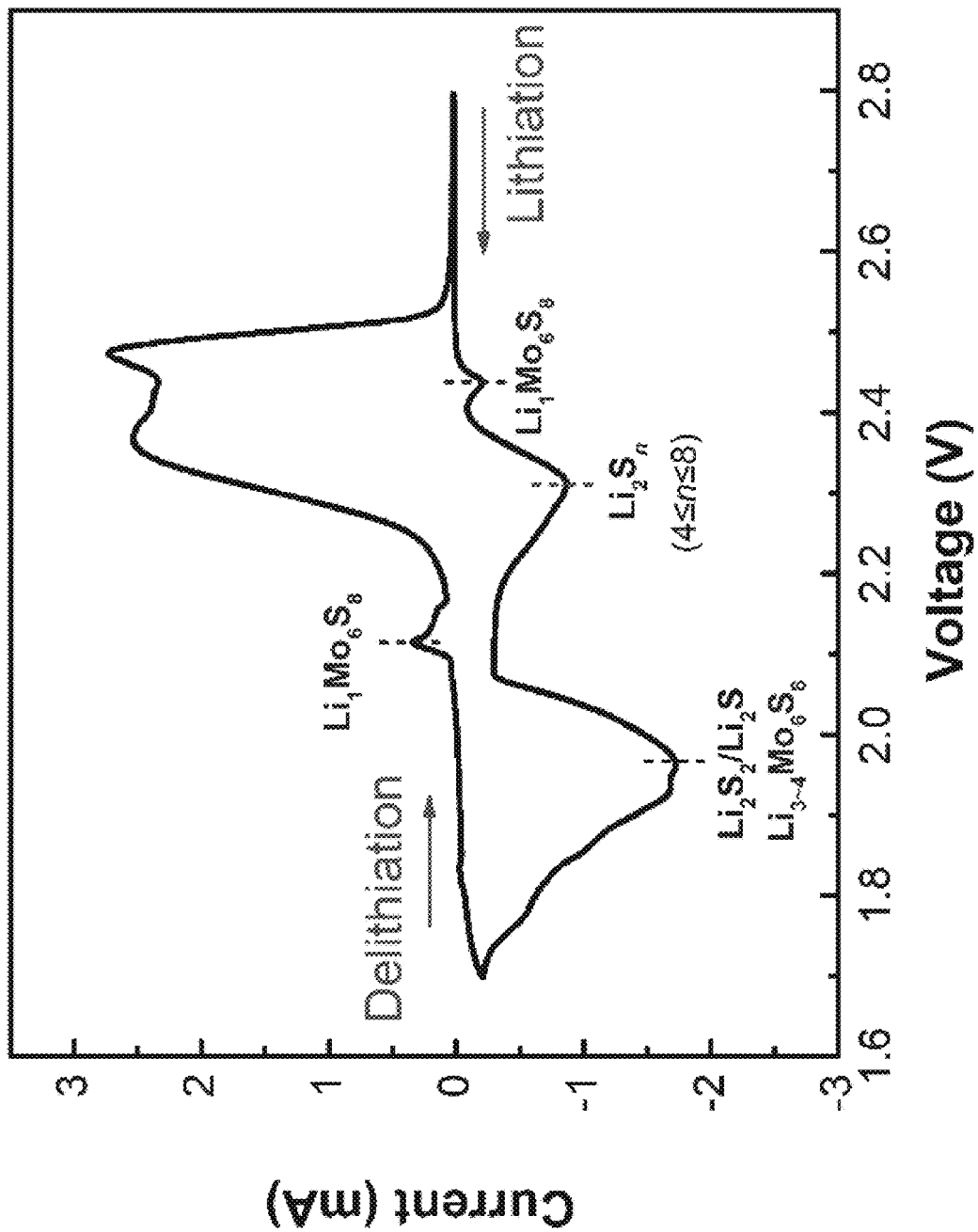
FIG. 26 shows CV plot for the battery with the PP@$Li_xMo_6S_8$ at 0.2 $mV \cdot s^{-1}$.

FIG. 26 shows CV plot for the battery with the PP@$Li_xMo_6S_8$ at 0.2 mV·s$^{-1}$. The CV plot in FIG. 26 shows a cathodic peak at 2.43 V corresponding to the lithiation of $Mo_6S_8$ to $LiMo_6S_8$, prior to the lithiation of $S_8$ to soluble LiPS ($Li_2Sn$, 4<n<8) at about 2.3 V. Later, the transition from $LiMo_6S_8$ to $Li_3Mo_6S_8$ occurs along with the conversion from $Li_2S_4$ (soluble) to $Li_2S_2/Li_2S$ (solid). Such process has also been revealed by in-situ XRD. Therefore, the adsorption of LiPS predominately originates from the interactions between $LiMo_6S_8$ (mainly)/$Li_3Mo_6S_8$ and LiPS. In order to clarify this more accurately, FIG. 5 considers both $LiMo_6S_8$ and $Li_3Mo_6S_8$ as the adsorption matrix and corresponding description in the main text.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An interlayer used in a lithium sulfur battery and disposed on a separator between a cathode and an anode of the lithium sulfur battery, the interlayer comprising:
   Chevrel-phase $Mo_6S_8$ having an area weight equal to or less than 1 $mg \cdot cm^{-2}$.

2. The interlayer of claim 1, in combination with the separator, wherein the separator comprises polypropylene.

3. The interlayer of claim 1, wherein the interlayer has a thickness ranging between 5 μm and 15 μm.

4. The interlayer of claim 1, further comprising:
   an inactive material; and
   a binder.

5. The interlayer of claim 4, wherein:
   the inactive material is conductive carbon; and
   the binder is polyvinylidene fluoride (PVDF).

6. The interlayer of claim 1, wherein the Chevrel-phase $Mo_6S_8$ has a concentration ranging between 70 wt % and 90 wt %.

7. A lithium sulfur battery, comprising:
   an anode;
   a cathode;
   electrolyte disposed between the anode and the cathode;
   a separator disposed between the cathode and the anode and disposed within the electrolyte; and
   the interlayer of claim 1 disposed on the separator.

8. The battery of claim 7, wherein the cathode comprises carbon, sulfur, and a first intercalation compound.

9. The battery of claim 8, wherein the first intercalation compound comprises Chevrel-phase $Mo_6S_8$.

10. A lithium sulfur battery, comprising:
    an anode;
    a cathode;
    electrolyte disposed between the anode and the cathode;
    a separator disposed between the cathode and the anode and disposed within the electrolyte; and
    an interlayer disposed on the separator, the interlayer comprising Chevrel-phase $Mo_6S_8$.

11. The lithium sulfur battery of claim 10, wherein:
    the cathode comprises carbon, sulfur, and a first intercalation compound.

12. The battery of claim 11, wherein the first intercalation compound comprises Chevrel-phase $Mo_6S_8$.

13. The battery of claim 12, wherein the cathode comprises:
    a conductive foil; and
    a slurry disposed on the conductive foil, the slurry comprising the carbon, the sulfur, and the $Mo_6S_8$.

14. The battery of claim 13, wherein for the slurry disposed on the conductive foil of the cathode:
    the sulfur has a loading equal to or greater than 10 $mg \cdot cm^{-2}$;
    $Mo_6S_8$ has a loading substantially equal to or greater than 10 $mg \cdot cm^{-2}$; and
    the carbon has a weight percentage equal to or less than 10 wt % in the slurry.

15. The battery of claim 10, wherein the separator comprises polypropylene.

16. The battery of claim 10, wherein:
    the interlayer has a thickness ranging between 5 μm and 15 μm.

17. The battery of claim 10, wherein the interlayer further comprises:

an inactive material; and a binder.

18. The battery of claim 17, wherein:

the inactive material is conductive carbon; and the binder is polyvinylidene fluoride (PVDF).

19. The battery of claim 17, wherein the inactive material of the interlayer has a concentration ranging between 5 wt % and 15 wt %.

20. The battery of claim 10, wherein the Chevrel-phase $Mo_6S_8$ of the interlayer has a concentration ranging between 70 wt % and 90 wt %.

21. A method of fabricating an interlayer for a lithium sulfur battery, the method comprising:

forming a slurry by mixing $Mo_6S_8$ powder, conductive carbon, and polyvinylidene fluoride (PVDF) with N-methylpyrrolidinone (NMP); and casting the slurry onto a separator to form the interlayer disposed on the separator, wherein the interlayer has an area weight equal to or less than 1 mg·cm$^{-2}$.

22. The method of claim 21, wherein the interlayer has a thickness ranging between 5 μm and 15 μm.

23. The method of claim 21, wherein the slurry comprises 80 wt % of the $Mo_6S_8$ powder, 10 wt % of the conductive carbon, and 10 wt % of the PVDF.

\* \* \* \* \*